(12) United States Patent
Tojo et al.

(10) Patent No.: US 9,714,356 B2
(45) Date of Patent: *Jul. 25, 2017

(54) BLACK INK COMPOSITION, INK SET, AND IMAGE FORMING METHOD

(71) Applicant: FUJIFILM CORPORATION, Minato-ku, Tokyo (JP)

(72) Inventors: Kaoru Tojo, Kanagawa (JP); Ryo Saito, Kanagawa (JP); Katsuto Sumi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 295 days.

This patent is subject to a terminal disclaimer.

(21) Appl. No.: 14/529,158

(22) Filed: Oct. 31, 2014

(65) Prior Publication Data

US 2015/0062238 A1    Mar. 5, 2015

Related U.S. Application Data

(63) Continuation of application No. 13/221,900, filed on Aug. 31, 2011, now abandoned.

(30) Foreign Application Priority Data

Sep. 28, 2010 (JP) .................................. 2010-217823

(51) Int. Cl.

| | | |
|---|---|---|
| *C09K 9/00* | (2006.01) | |
| *C09D 11/324* | (2014.01) | |
| *C09D 11/40* | (2014.01) | |
| *C09D 11/54* | (2014.01) | |
| *C08K 5/21* | (2006.01) | |
| *C08K 5/23* | (2006.01) | |
| *C08K 5/3417* | (2006.01) | |
| *C08K 5/3437* | (2006.01) | |
| *C09D 11/322* | (2014.01) | |
| *C09D 133/00* | (2006.01) | |
| *C08K 3/04* | (2006.01) | |

(52) U.S. Cl.
CPC .............. *C09D 11/324* (2013.01); *C08K 5/21* (2013.01); *C08K 5/23* (2013.01); *C08K 5/3417* (2013.01); *C08K 5/3437* (2013.01); *C09D 11/322* (2013.01); *C09D 11/40* (2013.01); *C09D 11/54* (2013.01); *C09D 133/00* (2013.01); *C08K 3/04* (2013.01)

(58) Field of Classification Search
CPC .... C09D 11/07; C09D 11/1322; C09D 11/101
See application file for complete search history.

(56) References Cited

U.S. PATENT DOCUMENTS

| | | | | |
|---|---|---|---|---|
| 6,726,758 | B2 * | 4/2004 | Sano ...................... | C09D 11/40 106/31.6 |
| 8,361,213 | B2 * | 1/2013 | Tojo ..................... | C09D 11/326 106/31.6 |
| 8,741,049 | B2 * | 6/2014 | Saito .................... | C09D 11/326 106/31.6 |
| 8,820,908 | B2 * | 9/2014 | Saito .................... | C09D 11/324 347/100 |
| 2009/0232989 | A1 * | 9/2009 | Tojo ..................... | C09D 11/326 427/256 |
| 2011/0074866 | A1 * | 3/2011 | Imamura .............. | C09D 11/322 347/21 |

* cited by examiner

*Primary Examiner* — Hannah Pak
(74) *Attorney, Agent, or Firm* — SOLARIS Intellectual Property Group, PLLC

(57) ABSTRACT

A black ink composition includes: carbon black and a water-insoluble resin that covers at least a part of the surface of the carbon black; a cyan pigment and a water-insoluble resin that covers at least a part of the surface of the cyan pigment; a magenta pigment and a water-insoluble resin that covers at least a part of the surface of the magenta pigment; water-insoluble resin particle; and water, wherein a content ratio of the carbon black is from 1.0 to 2.0% by mass with respect to the total mass of the composition, and a total amount of pigments is from 1.8 to 3.5% by mass with respect to the total mass of the composition. The black ink composition can be used in an ink set and an image forming method.

14 Claims, No Drawings

BLACK INK COMPOSITION, INK SET, AND IMAGE FORMING METHOD

CROSS-REFERENCE TO RELATED APPLICATIONS

This application is a continuation of, and claims the benefit of, prior U.S. application Ser. No. 13/221,900, filed on Aug. 31, 2011. Additionally, this application is based on, and claims priority under 35 USC 119 from, Japanese patent Application No. 2010-217823, filed on Sep. 28, 2010. The entire disclosures of the above-referenced applications are incorporated by reference herein.

BACKGROUND OF THE INVENTION

Technical Field

The present invention relates to a black ink composition containing carbon black, an ink set including the composition, and an image forming method.

Description of the Related Art

Inkjet recording methods allow recording of high-quality images on various recording media by ejecting droplets of inks from a number of nozzles provided at an inkjet head. Therefore, inkjet recording methods are widely used.

Pigments are widely used as a coloring agent, which is a component of an ink. In inks, pigments are used in a state of being dispersed in a medium such as water. When pigments are used in the dispersed state, important factors include the diameter of the dispersed particles, stability after dispersing, size uniformity, ejectability from ejection nozzles, and image density. Various studies are carried out on techniques for improving such factors.

Further, in some cases, recording on plain sheet provides only insufficient quality in terms of rubbing resistance of the formed image (fixability), resolution, and the like, as well as image density. There is a tendency for the insufficiency in quality to become more conspicuous when the inkjet recording speed is increased. Specifically, compatibility with high-speed recording in a single-pass manner rather than a shuttle-scan manner is requested in terms of the rubbing resistance and resolution of the formed image. In the single-pass recording, recording can be carried out by a single head operation.

Meanwhile, in addition to the image density, generation of unevenness in image has to be considered from the viewpoint of image quality because unevenness in image, such as streak-shaped unevenness, may be generated when an image is recorded on plain paper or the like. The generation of unevenness is significant when high-speed inkjet recording is carried out. Specifically, streak-shaped unevenness is more likely to be generated in an image when the image is recorded at high speeds in a single-pass manner, which enables recording with one operation of a head, as compared to a shuttle-scan manner. The unevenness is particularly remarkable when an image of an intermediate tone of black (i.e., gray tone) is formed.

When high-speed recording is carried out in a single-pass manner, an inkjet head having a width that is equal to the width of a recording medium is used. However, in such a case, unevenness in hue tends to be generated in the width direction owing to a variation in ejection amounts of ink along the width direction. The unevenness in hue is particularly significant when an image of intermediate tone of black (i.e., gray tone), which is achromatic, is formed.

Among pigments used in inks for inkjet recording, carbon black is widely used as a black pigment. A technique in which a pigment other than carbon black, such as a cyan pigment, is used together with carbon black (hereinafter abbreviated to CB) is also known.

Specifically, a pigment dispersion aqueous recording liquid is disclosed in, for example, Japanese Patent Application Laid-Open (JP-A) No. 2004-285344. This pigment dispersion aqueous recording liquid contains carbon black (CB) and a pigment other than CB, such as a cyan pigment, together with a urethane resin. Further, an aqueous ink for inkjet recording that contains polymer particles containing carbon black is disclosed in, for example, JP-A No. 2009-144007.

Regarding an ink containing carbon black (CB), a neutral black ink or black ink set which contains carbon black as well as a cyan pigment and a magenta pigment is disclosed (see, for example, Japanese Patent Application Laid-Open (JP-A) No. 2005-213505, or JP-A No. 2003-55592), which enables improvements in tone of an yellowish or brownish image, and provides excellent color reproducibility.

Furthermore, a black ink is disclosed (see, for example, JP-A No. 2009-132766), which contains a dispersion of surface-treated black pigments capable of being dispersed in water even in the absence of a dispersant, a magenta pigment-containing polymer particle dispersion, a cyan pigment-containing polymer particle dispersion, a yellow pigment-containing polymer particle dispersion, and resin emulsion. It is disclosed that the black ink is excellent in glossiness of image, ejection property, and the like.

On the other hand, a pigment, being hard powder, has a problem in that the pigment may easily damage a nozzle surface when an ink is wiped off for maintenance of a nozzle for ejecting the ink. In particular, when carbon black, from among various pigments, is contained in an ink, the ink tends to damage a nozzle surface as compared with a case in which a color ink containing an organic pigment is used.

SUMMARY OF THE INVENTION

Techniques of using carbon black in combination with a pigment other than a black pigment, such as a cyan pigment or magenta pigment, have been proposed, such as the techniques described in the pieces of related art described above. However, when carbon black is simply mixed with a pigment of another color, it is only expected that color reproducibility is improved to a certain degree, and it is difficult to prevent streak-shaped unevenness, unevenness in hue, and the like, which are generated in high-speed recording in single-pass manner.

Use of an ink containing carbon black tends to exacerbate nozzle damage, as compared to cases in which inks containing other organic pigments are used. The nozzle damage may be suppressed by decreasing the content ratio of carbon black. However, a simple reduction in the content ratio of carbon black may make it impossible to obtain a desired black density, may shift the color obtained when, for example, a gray tone is desired, and may provide only a yellowish hue.

When the amounts of ink components, such as polymer particles, other than pigment are increased, the proportion of carbon black in an image is relatively decreased, as a result of which the shielding ratio is decreased, and a change in hue such as yellow tinge tends to occur. Accordingly, it has not been possible to obtain a desired black color or an intermediate tone, such as gray, with less yellow tinge, while alleviating streak-shaped unevenness in an image and improving maintenance properties.

The present invention has been made in view of the above, and provides a black ink composition and an ink set, each of which enables provision of an image having black color with less yellow tinge or an intermediate tone (for example, gray) with less yellow tinge, and suppresses streak-shaped unevenness in an image, unevenness in hue in an image, and generation of nozzle damage during maintenance. The present invention further provides an image forming method by which generation of streak-shaped unevenness and generation of unevenness in hue are prevented, and an image of black color or an intermediate tone (for example, gray) with less yellow tinge can be obtained, while controlling damage to a nozzle surface at a low level.

Aspects of the invention include the following.

<1> A black ink composition, comprising:
carbon black and a first water-insoluble resin that covers at least a part of a surface of the carbon black;
a cyan pigment and a second water-insoluble resin that covers at least a part of a surface the cyan pigment;
a magenta pigment and a third water-insoluble resin that covers at least a part of a surface of the magenta pigment;
water-insoluble resin particles; and
water,
wherein a content ratio of the carbon black is from 1.0 to 2.0% by mass with respect to a total mass of the composition, and a total amount of pigments is from 1.8 to 3.5% by mass with respect to the total mass of the composition.

<2> The black ink composition according to <1>, wherein a content of the water-insoluble resin particles is larger than a total amount of pigments, at least a part of surfaces of which are coated with water-insoluble resins, and the water-insoluble resins that cover the at least a part of surfaces of the pigments.

<3> The black ink composition according to <2>, wherein a ratio of the content of the water-insoluble resin particles to the total amount of pigments, at least a part of surfaces of which are coated with water-insoluble resins, and the water-insoluble resins that cover the at least a part of surfaces of the pigments, is more than 1.0 but not more than 4.0.

<4> The black ink composition according to <1>, wherein the water-insoluble resin particles comprise self-dispersing polymer particles.

<5> The black ink composition according to <1>, wherein the water-insoluble resin particles have a Tg of 100° C. or higher.

<6> The black ink composition according to <1>, further comprising a solid humectant.

<7> The black ink composition according to <6>, wherein the humectant is selected from urea, a urea derivative, or a mixture thereof.

<8> The black ink composition according to <1>, further comprising a yellow pigment and a fourth water-insoluble resin that covers at least a part of a surface of the yellow pigment.

<9> An ink set, comprising:
the black ink composition according to <1>; and
a treatment liquid comprising an aggregation component which is capable of causing formation of an aggregate when contacting the black ink composition.

<10> An image forming method, comprising:
applying the black ink composition according to <1> to a recording medium by an inkjet method; and
applying a treatment liquid to the recording medium, the treatment liquid comprising an aggregation component which is capable of causing formation of an aggregate when contacting the black ink composition.

<11> The image forming method according to <10>, wherein the applying of the black ink composition comprises applying the black ink composition by a piezoelectric inkjet method.

<12> The image forming method according to <11>, further comprising heating an image formed through the applying of the black ink composition and the applying of the treatment liquid, to fix the image on the recording medium.

According to the invention, a black ink composition and ink set are provided, each of which enables provision of an image having black color with less yellow tinge or an intermediate tone (for example, gray) with less yellow tinge, and suppresses streak-shaped unevenness in an image, unevenness in hue in an image, and generation of nozzle damage during maintenance.

Furthermore, according to the invention, an image forming method is provided by which generation of streak-shaped unevenness and generation of unevenness in hue are prevented, and an image of black color or an intermediate tone (for example, gray) with less yellow tinge can be obtained, while controlling damage to a nozzle surface at a low level.

DETAILED DESCRIPTION OF THE INVENTION

Hereinbelow, a black ink composition of the invention, and an ink set including the black composition and an image forming method in which the black ink composition is used are described in detail.

As used herein, the scope of "maintenance" includes maintaining a recording head that ejects an inkjet recording ink composition and the ejection performance thereof in an initial state or in a state close to the initial state, and further encompasses having the recording head serviced and maintained in a better state by cleaning the recording head.

<Black Ink Composition>

A black ink composition of the invention (which may be referred to as "ink composition" hereinbelow) is an aqueous composition including at least:
carbon black and a first water-insoluble resin that covers at least a part of the surface of the carbon black;
a cyan pigment and a second water-insoluble resin that covers at least a part of the surface of the cyan pigment;
a magenta pigment and a third water-insoluble resin that covers at least a part of the surface of the magenta pigment;
water-insoluble resin particles; and
water,
and in which the content ratio of the carbon black (excluding the first water-insoluble resin, the same applies hereinafter) is from 1.0% by mass to 2.0% by mass with respect to the total amount of the composition, and the total amount of pigments (excluding coating resins such as the water-insoluble resins, the same applies hereinafter) is from 1.8% by mass to 3.5% by mass with respect to the total amount of the composition.

The black ink composition of the invention may further include other components such as an organic solvent or a surfactant, if necessary.

In the invention, the black ink composition, which includes carbon black (which may be abbreviated to "CB") as a black colorant for forming a black ink, has a configuration in which:
the ink composition includes a cyan pigment and a magenta pigment together with the CB;

at least a part of the surfaces of the particles of each of the CB, cyan pigment, and magenta pigment is coated with a water-insoluble resin;

the content ratio of the carbon black, which has high tendency to damage the surface of a head nozzle, is decreased, and resin particles, which have low tendency to damage the surface of a head nozzle, are included; and the amounts of pigments (excluding coating resins such as water-insoluble resins) are adjusted such that the total mass of pigments is at a certain ratio relative to the total amount of the ink.

Due to this configuration, generation of damage to the head nozzle surface during maintenance is regulated to be low, and when, for example, a black image or an image of an intermediate tone such as gray is formed at a high speed in a single-pass manner, generation of streak-shaped unevenness or hue unevenness in an image is prevented, and an achromatic image in which a change in color from a black or intermediate tone image is suppressed can be obtained.

When, as described above, the amount of carbon black (CB) contained in the ink composition is decreased in order to prevent generation of streak-shaped unevenness and damage to the surface of a head nozzle, but is still capable of maintaining a black density and the color reproducibility of an achromatic color, and the ink composition further includes a resin-coated cyan pigment and a resin-coated magenta pigment in amounts such that the total pigment amount falls within a certain range, a color change (yellowing) caused by the decrease in the CB amount and generation of striped-shape unevenness in an image are prevented, and damage to the surface of a head nozzle, which tends to occur when the head nozzle is wiped during maintenance, is prevented. The hue unevenness caused during printing in a single-pass manner is caused by slight fluctuation in ejection from an inkjet head, and may be prevented by adjusting the CB amount and the total amount of pigments to be within the respective specific ranges such that a change in the ejection amount (i.e., image dot ratio) does not lead to a change in hue. Furthermore, generation of damage on a nozzle surface is further suppressed by coating the CB, the cyan pigment, and the magenta pigment with at least one water-insoluble resin and including water-insoluble resin particles, in addition to reducing the amount of CB.

(Resin-Coated Carbon Black)

The black ink composition of the invention includes at least one carbon black at least a part of the surface of which is coated with a water-insoluble resin (which may be referred to as "resin-coated CB" or "resin-coated carbon black" hereinbelow). The resin-coated CB is a particle obtained by coating a part or all of the particle surface of carbon black (CB) with a water-insoluble resin, and is included in a dispersed state in the ink composition.

—Carbon Black—

Examples of carbon blacks include a carbon black produced by a known method such as a contact method, a furnace method, or a thermal method. Specific examples thereof include furnace black, thermal lamp black, acetylene black, and channel black.

Specific examples of carbon blacks include, but are not limited to, RAVEN 7000, RAVEN 5750, RAVEN 5250, RAVEN 5000 ULTRA II, RAVEN 3500, RAVEN 2000, RAVEN 1500, RAVEN 1250, RAVEN 1200, RAVEN 1190 ULTRA II, RAVEN 1170, RAVEN 1255, RAVEN 1080, RAVEN 1060, RAVEN 700 (all of which are trade names, manufactured by Columbian Chemicals Company), REGAL 1400R, REGAL 1330R, REGAL 1660R, MOGUL L, BLACK PEARLS L, MONARCH 700, MONARCH 800, MONARCH 880, MONARCH 900, MONARCH 1000, MONARCH 1100, MONARCH 1300, MONARCH 1400 (all of which are trade names, manufactured by Cabot Corporation), COLOR BLACK FW1, COLOR BLACK FW2, COLOR BLACK FW2V, COLOR BLACK 18, COLOR BLACK FW200, COLOR BLACK S150, COLOR BLACK S160, COLOR BLACK S170, PRINTEX 35, PRINTEX U, PRINTEX V, PRINTEX 140U, PRINTEX 140V, SPECIAL BLACK 6, SPECIAL BLACK 5, SPECIAL BLACK 4A, SPECIAL BLACK 4 (all of which are trade names, manufactured by Evonik-Degussa GmbH), and No. 25, No. 33, No. 40, No. 45, No. 47, No. 52, No. 900, No. 2200B, No. 2300, MCF-88, MA600, MA7, MA8, MA100 (all of which are trade names, manufactured by Mitsubishi Chemical Corporation).

—Water-Insoluble Resin—

Examples of the water-insoluble resin with which the carbon black (CB) is coated include [1] a polymer including a repeating unit (a) represented by the following Formula (1) and a repeating unit (b) having an ionic group, and [2] a polymer including a structural unit derived from a salt-forming-group-containing monomer (c) and at least one structural unit derived from a styrenic macromonomer (d) and/or a hydrophobic monomer (e).

As used herein, "insoluble" means that, when a polymer is mixed with an aqueous medium at 25° C., the amount of polymer that dissolves in the aqueous medium is 10% by mass or less with respect to the total amount of polymer mixed with the aqueous medium.

[1] Polymer Containing Repeating Unit (a) Represented by Formula (1) and Repeating Unit (b) Having Ionic Group The polymer contains at least one repeating unit represented by Formula (1) and at least one repeating unit having an ionic group, and may further contain, if necessary, another structural unit such as a hydrophobic repeating unit other than the repeating unit represented by Formula (1) or a hydrophilic repeating unit having a non-ionic functional group.

<Repeating Unit (a) Represented by Formula (1)>

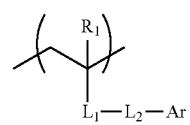

Formula (1)

In Formula (1), $R_1$ represents a hydrogen atom, a methyl group, or a halogen atom; $L_1$ represents *—COO—, *—OCO—, *—CONR$_2$—, *—O—, or a substituted or unsubstituted phenylene group, $R_2$ represents a hydrogen atom or an alkyl group having from 1 to 10 carbon atoms, and "*" shown in the group represented by $L_1$ indicates a position at which $L_1$ is connected to the main chain; $L_2$ represents a single bond or a divalent linking group; and Ar represents a monovalent aromatic ring group derived from an aromatic ring.

In Formula (1), $R_1$ represents a hydrogen atom, a methyl group, or a halogen atom, and preferably represents a methyl group.

$L_1$ represents *—COO—, *—OCO—, *—CONR$_2$—, *—O—, or a substituted or unsubstituted phenylene group. When $L_1$ represents a phenylene group, the phenylene group is preferably an unsubstituted phenylene group. $R_2$ represents a hydrogen atom or an alkyl group having from 1 to 10 carbon atoms.

$L_2$ represents a single bond or a divalent linking group. The divalent linking group is preferably a linking group having from 1 to 30 carbon atoms, more preferably a linking group having from 1 to 25 carbon atoms, even more preferably a linking group having from 1 to 20 carbon atoms, and particularly preferably a linking group having from 1 to 15 carbon atoms.

In particular, examples of most preferable linking groups include an alkyleneoxy group having from 1 to 25 carbon atoms (more preferably, having from 1 to 10 carbon atoms), an imino group (—NH—), a sulfamoyl group, a divalent linking group containing an alkylene group, such as an alkylene group having from 1 to 20 carbon atoms (more preferably, having from 1 to 15 carbon atoms) or an ethylene oxide group [—(CH$_2$CH$_2$O)$_n$—, n=1 to 6], and a group obtained by combining two or more types of linking group selected from the above.

Ar represents a monovalent group derived from an aromatic ring.

The aromatic ring of the monovalent group represented by Ar is not particularly limited, and examples thereof include a benzene ring, a condensed aromatic ring having 8 or more carbon atoms, an aromatic ring having a hetero ring condensed thereto, and an aromatic ring obtained by condensing at least two benzene rings.

The term "condensed aromatic ring having 8 or more carbon atoms" described above refers to an aromatic ring which has 8 or more carbon atoms, and of which rings are composed of two or more benzene rings condensed with each other, or of at least one type of aromatic ring and at least one alicyclic hydrocarbon condensed with the at least one type of aromatic ring. Specific examples thereof include naphthalene, anthracene, fluorene, phenathrene, and acenaphthene.

The term "aromatic ring condensed with a heterocycle" described above refers to a compound that includes at least one aromatic compound free of a heteroatom (preferably, a benzene ring) and at least one heteroatom-containing cyclic compound condensed with the at least one aromatic compound. Here, the heteroatom-containing cyclic compound is preferably a 5-membered ring or a 6-membered ring. The heteroatom is preferably a nitrogen atom, an oxygen atom, or a sulfur atom. The heteroatom-containing cyclic compound may have plural heteroatoms. In this case, the heteroatoms may be the same as or different from each other.

Specific examples of hetero ring having an aromatic ring condensed thereto include phthalimide, acridone, carbazole, benzoxazole, and benzothiazole.

Specific examples of a monomer for forming a repeating unit represented by Formula (1) may include vinyl monomers such as (meth)acrylates, (meth)acrylamides, styrenes, and vinyl esters.

In the present invention, a hydrophobic structural unit having an aromatic ring bonded to an atom in the main chain via a linking group has a structure in which an aromatic ring is bonded to an atom in the main chain of the water-insoluble resin via a linking group, and does not directly binds to an atom in the main chain of the water-insoluble resin. There-fore, a suitable distance is maintained between the hydrophobic aromatic ring and a hydrophilic structural unit, and thus, an interaction between the water-insoluble resin and the pigment is enhanced, resulting in strong adsorption and further improvement of the dispersibility.

Specific examples of a monomer for forming a repeating unit represented by Formula (1) include, but are not limited to, the following monomers.

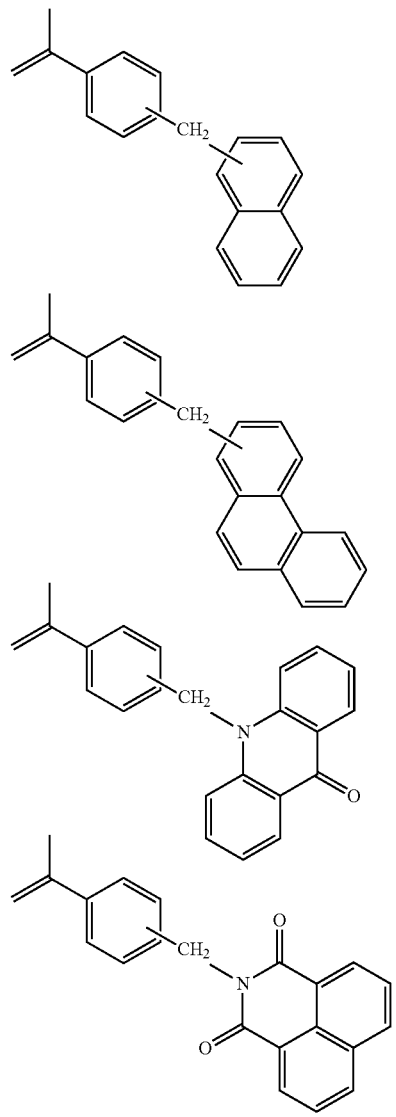

M-25/M-27 (m, p-position substitution products) M-28/M-29 (m, p-position substitution products)

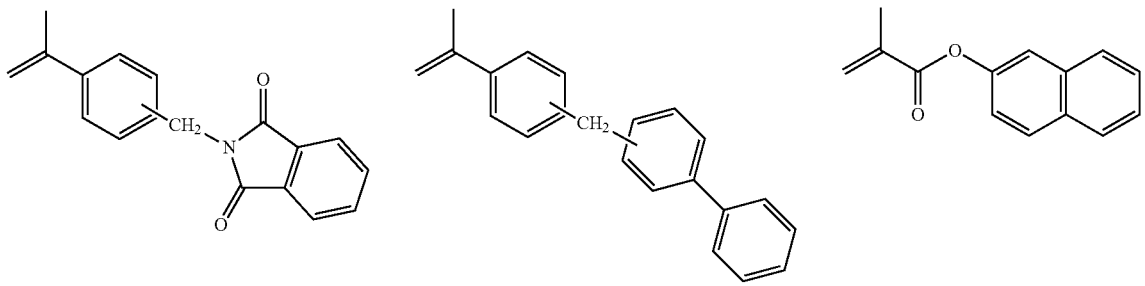

-continued
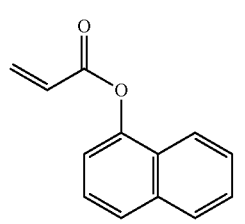
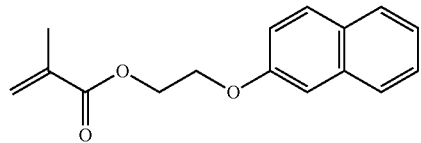
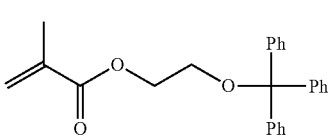
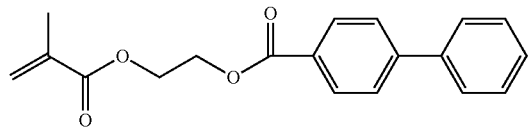
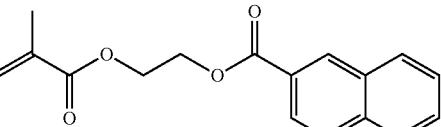
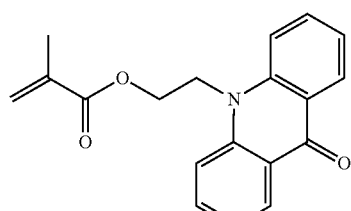
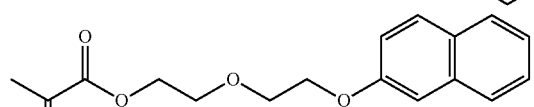
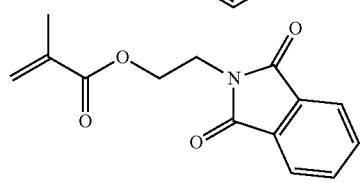
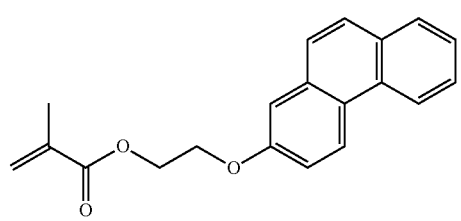
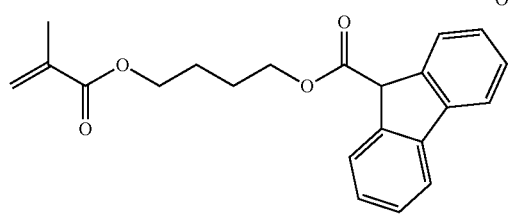
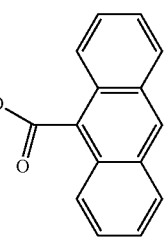
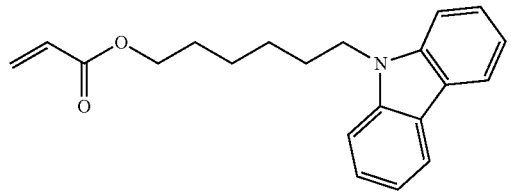
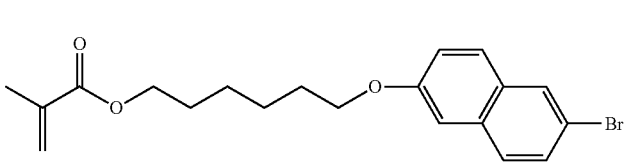
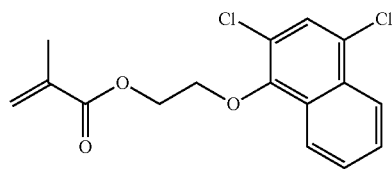
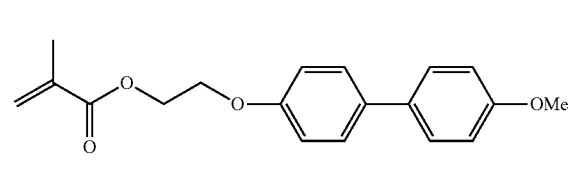
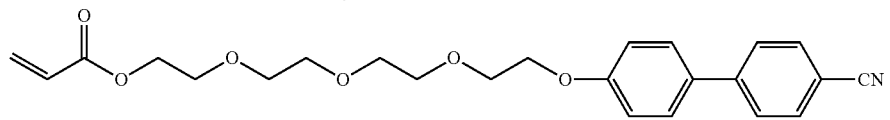

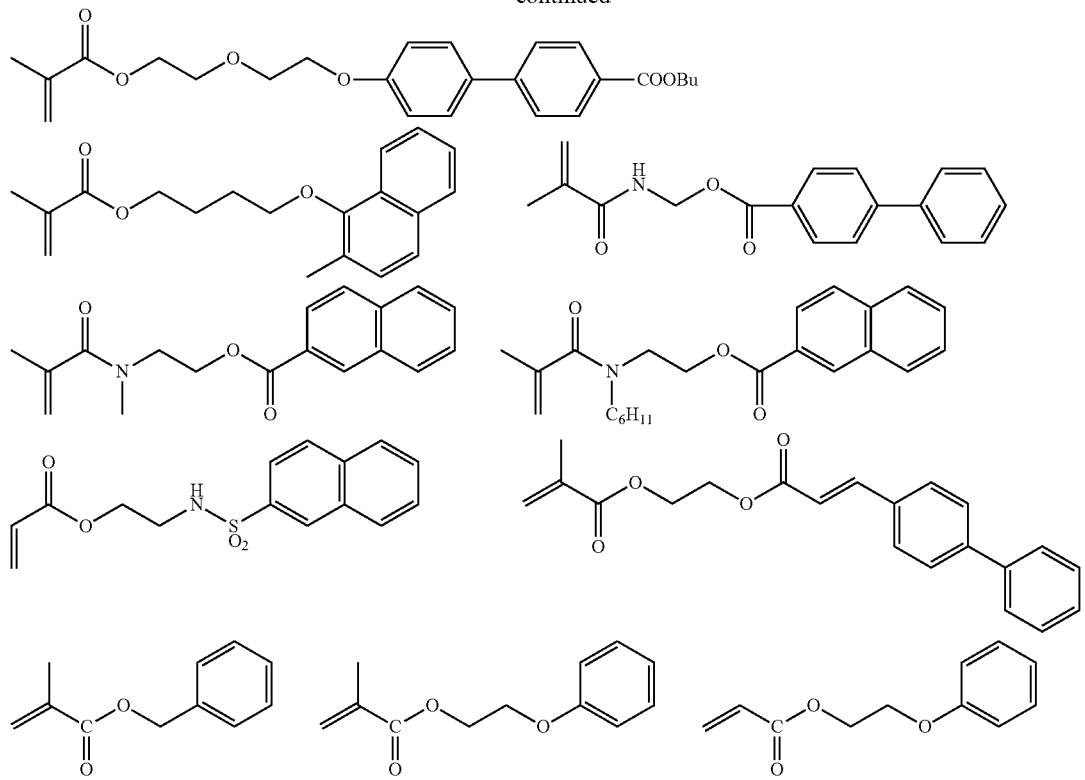

Ar in the repeating unit (a) represented by Formula (1) is preferably a monovalent group derived from benzyl (meth)acrylate, phenoxyethyl acrylate, phenoxyethyl methacrylate, acridone, or phthalimide, from the viewpoint of the dispersion stability of the coated pigment.

The repeating units may be used singly, or in combination of two or more thereof.

The content ratio of the repeating unit represented by Formula (1) in a polymer is preferably from 5 to 25% by mass, and more preferably from 10 to 18% by mass, with respect to the total mass of the polymer. When the content ratio is 5% by mass or higher, generation of image defects such as white spots may be significantly prevented. When the content ratio is 25% by mass or less, problems in production suitability which may be caused by decrease in solubility of the polymer in a polymerization reaction solution (e.g., methyl ethyl ketone) hardly arise.

<Other Hydrophobic Repeating Unit>

The polymer [1] preferably further contains, as a hydrophobic structural unit, a hydrophobic repeating unit other than the repeating unit represented by Formula (1). Examples of a hydrophobic repeating unit other than the repeating unit represented by Formula (1) include a structural unit derived from a vinyl monomer such as a (meth)acrylate-containing compound, a (meth)acrylamide-containing compound, a styrenic compound, or a vinyl ester, each of which is not a hydrophilic structural unit (for example, each of which has no hydrophilic functional group); and a hydrophobic structural unit having an aromatic ring which is bonded to an atom of the main chain thereof via a linking group. The structural units may be used alone, or in combination of two or more thereof. As a result of the incorporation of a repeating unit having properties that are intermediate between the properties of a repeating unit represented by Formula (1) and the properties of the hydrophilic repeating unit described below, the dispersion properties and the dispersion stability of the resultant pigment dispersion can further be improved.

Examples of the (meth)acrylate-containing compound include alkyl (meth)acrylates such as methyl (meth)acrylate, ethyl (meth)acrylate, butyl (meth)acrylate, isobutyl (meth)acrylate, and hexyl (meth)acrylate. In particular, an alkyl (meth)acrylate having an alkyl moiety having from 1 to 5 carbon atoms is preferable. Specifically, examples of preferable (meth)acrylates include methyl(meth)acrylate, ethyl (meth)acrylate, and butyl (meth)acrylate, and methyl (meth)acrylate and ethyl (meth)acrylate are particularly preferable.

Examples of the (meth)acrylamide-containing compound include N-cyclohexyl (meth)acrylamide, N-(2-methoxyethyl)(meth)acrylamide, N,N-diallyl (meth)acrylamide, and N-allyl (meth)acrylamide.

Examples of the styrenic compound include styrene, methylstyrene, dimethylstyrene, trimethylstyrene, ethylstyrene, isopropylstyrene, n-butylstyrene, tert-butylstyrene, methoxystyrene, butoxystyrene, acetoxystyrene, chlorostyrene, dichlorostyrene, bromostyrene, chloromethyl styrene, hydroxystyrene protected with a group (e.g., t-Boc) capable of deprotection using an acidic substance, hydrosystyrene, methyl vinylbenzoate, α-methylstyrene, and vinylnaphthalene. Among these, styrene and α-methylstyrene are preferable.

Examples of vinyl esters include vinyl acetate, vinyl chloroacetate, vinyl propionate, vinyl butyrate, vinyl methoxyacetate, and vinyl benzoate. Among these, vinyl acetate is preferable.

<Repeating Unit (b) Having Ionic Group>

Examples of repeating units having an ionic group include a repeating unit derived from a monomer having an ionic group such as a carboxyl group, a sulfo group, or a phosphonate group. More specifically, the monomer having an ionic group may be a vinyl monomer having an ionic functional group, such as (meth)acrylic acid, a (meth)acrylate-containing compound, a (meth)acrylamide-containing compound, or a vinyl ester. The repeating unit having an ionic group can be introduced into the polymer by, for example, polymerization of a corresponding monomer or introduction of an ionic group into the polymer chain after polymerization.

From among the above repeating units having an ionic group, a repeating unit derived from acrylic acid or a repeating unit derived from methacrylic acid is preferable. Polymer [1] preferably includes a structural unit derived from acrylic acid or a structural unit derived from methacrylic acid or both.

It is preferable that the content of the repeating unit (b) having an ionic group in polymer [1] is 15% by mass or lower with respect to the entire mass of the polymer, and that the repeating units having an ionic group in polymer [1] include a structural unit (repeating unit) derived from (meth) acrylic acid.

When the content of the repeating unit (b) having an ionic group is 15% by mass or lower with respect to the entire mass of the polymer, excellent dispersion stability can be realized. In particular, the ratio of repeating units (b) having an ionic group is more preferably from 5% by mass to 15% by mass, and still more preferably from 7% by mass to 13% by mass, relative to the entire mass of the polymer, from the viewpoint of dispersion stability.

The polymer [1] is capable of being stably present in an aqueous ink composition, and mitigates adhesion and deposition of aggregates onto an inkjet head or the like, and has excellent properties with respect to the removability of adhered aggregates. From these viewpoints, the polymer [1] may further contain a hydrophobic structural unit other than the repeating unit represented by Formula (1) and/or a hydrophilic structural unit other than the repeating unit (b) having an ionic group.

<Hydrophilic Structural Unit>

The hydrophilic structural unit other than the repeating unit (b) having an ionic group may be, for example, a repeating unit derived from a monomer having a nonionic hydrophilic group, examples of which include a vinyl monomer having a nonionic hydrophilic group such as a (meth) acrylate-containing compound having a nonionic hydrophilic functional group, a (meth)acrylamide-containing compound having a nonionic hydrophilic functional group, or a vinyl ester having a nonionic hydrophilic functional group.

Examples of the nonionic hydrophilic functional group include a hydroxyl group, an amino group, an amido group of which the nitrogen atom is unsubstituted, and an alkylene oxide such as polyethylene oxide or polypropylene oxide, which are described below.

The monomer for forming a hydrophilic repeating unit having a nonionic hydrophilic group is not particularly limited, as long as the monomer has a functional group capable of forming a polymer, such as an ethylenic unsaturated double bond, and a nonionic hydrophilic functional group. The monomer for forming a hydrophilic repeating unit having a nonionic hydrophilic group may be selected from known monomers. Preferable examples thereof include hydroxyethyl (meth)acrylate, hydroxybutyl (meth)acrylate, (meth)acrylamide, aminoethyl acrylate, aminopropyl acrylate, and a (meth)acrylate that contains an alkylene oxide polymer.

The hydrophilic repeating unit having a nonionic hydrophilic group can be formed by, for example, polymerization of a corresponding monomer or introduction of a nonionic hydrophilic functional group into the polymer chain after polymerization.

The hydrophilic repeating unit having a nonionic hydrophilic group is more preferably a hydrophilic structural unit having an alkylene oxide structure. The alkylene portion of the alkylene oxide structure is preferably an alkylene having from 1 to 6 carbon atoms, more preferably an alkylene having from 2 to 6 carbon atoms, and particularly preferably an alkylene having from 2 to 4 carbon atoms, from the viewpoint of hydrophilicity. The polymerization degree of the alkylene oxide structure is preferably from 1 to 120, more preferably from 1 to 60, and particularly preferably from 1 to 30.

It is also preferable that the hydrophilic repeating unit having a nonionic hydrophilic group is a hydrophilic repeating unit containing a hydroxyl group. The number of hydroxyl groups in the repeating unit is not particularly limited, and is preferably from 1 to 4, more preferably from 1 to 3, and particularly preferably from 1 to 2, from the viewpoints of the hydrophilicity of the water-insoluble resin and the compatibility with solvent or other monomers at the time of polymerization.

A suitable ratio between hydrophilic repeating units and hydrophobic repeating units (including a repeated structure represented by the above Formula (1)) in polymer [1] depends on the strength of the hydrophilicity/hydrophobicity of the individual repeating units. In polymer [1], the ratio of hydrophilic repeating units is preferably 15% by mass or lower relative to the entire mass of the water-insoluble resin (polymer [1]). Here, the ratio of hydrophobic repeating units is preferably higher than 80% by mass relative to the entire mass of the water-insoluble resin, and more preferably 85% by mass or higher relative to the entire mass of the water-insoluble resin.

When the content of hydrophilic repeating units is 15% by mass or less, the amount of components that singly dissolves in an aqueous medium is suppressed, various performances such as dispersing of pigment is excellent, and favorable ink ejection properties are achieved at the time of inkjet recording.

The content ratio of hydrophilic repeating units is preferably from more than 0% by mass to 15% by mass, more preferably from 2 to 15% by mass, still more preferably from 5 to 15% by mass, and particularly preferably from 8 to 12% by mass, relative to the entire mass of the water-insoluble resin.

The content of aromatic rings in the water-insoluble resin is preferably 27% by mass or lower, more preferably 25% by mass or lower, and still more preferably 20% by mass or lower, with respect to the entire mass of the water-insoluble resin. In particular, the content of aromatic rings in the water-insoluble resin is further preferably from 15 to 20% by mass, and still further preferably from 17 to 20% by mass, with respect to the entire mass of the water-insoluble resin. A content ratio of aromatic rings within the above range provides improved resistance against rubbing.

Specific examples of polymer [1] include, but are not limited to, those described below. Here, "Mw" represents weight average molecular weight.

Phenoxyethyl acrylate/methyl methacrylate/acrylic acid copolymer (50/45/5 [mass %])

Phenoxyethyl acrylate/benzyl methacrylate/isobutyl methacrylate/methacrylic acid copolymer (30/35/29/6 [mass %])

Phenoxyethyl methacrylate/isobutyl methacrylate/methacrylic acid copolymer (50/44/6 [mass %])
Phenoxyethyl acrylate/methyl methacrylate/ethyl acrylate/acrylic acid copolymer (30/55/10/5 [mass %])
Benzyl methacrylate/methyl methacrylate/methacrylic acid copolymer (60/30/10 [mass %])
(M-25/M-27) mixture/ethyl methacrylate/methacrylic acid copolymer (15/75/10 [molar ratio], Mw: 49,400, acid value: 65.2 mgKOH/g)
(M-25)/ethyl methacrylate/methacrylic acid copolymer (18/69/13 [molar ratio], Mw: 41,600, acid value: 84.7 mgKOH/g)
(M-28/M-29) mixture/ethyl methacrylate/methacrylic acid copolymer (15/85/10 [molar ratio], Mw: 38,600, acid value: 65.2 mgKOH/g)
(M-28)/ethyl methacrylate/methacrylic acid copolymer (20/73/7 [molar ratio], Mw: 45,300, acid value: 45.6 mgKOH/g)

[2] Polymer Containing Structural Unit Derived from Salt-Forming Group-Containing Monomer (c), Structural Unit Derived from Styrene Macromer (d), and/or Structural Unit Derived from Hydrophobic Monomer (e)

Polymer [2] is a water-insoluble polymer that is preferable from the viewpoint of imparting ejection stability and cleanability. Polymer [2] is more preferably a water-insoluble graft polymer containing a structural unit derived from the styrenic macromer (d). It is preferable that the water-insoluble graft polymer has, at a main chain thereof, a polymer including a structural unit derived from the salt-forming-group-containing monomer (c) and a structural unit derived from the hydrophobic monomer (e), and has, at a side chain thereof, a structural unit derived from the styrenic macromer (d). The water-insoluble polymer is preferably a water-insoluble vinyl polymer obtained by copolymerization of a monomer mixture including the salt-forming-group-containing monomer (c) (hereinafter sometimes referred to as "(c) component"), the styrenic macromer (d) (hereinafter sometimes referred to as "(d) component"), and/or the hydrophobic monomer (e) (hereinafter sometimes referred to as "(e) component"). This monomer mixture is hereinafter sometimes referred to as "monomer mixture".

(Salt-forming-group-containing Monomer (c))

The salt-forming-group-containing monomer (c) is used with a view to, for example, increasing the dispersion stability of the dispersion obtained. Examples of the salt-forming group include a carboxyl group, a sulfonic acid group, a phosphoric acid group, an amino group, and an ammonium group. Examples of the (c) component include cationic monomers and anionic monomers, specific examples of which include those described in column 7, line 24 to column 8, line 29 on page 5 of JP-A No. 9-286939.

Representative examples of the cationic monomers include unsaturated amino group-containing monomers and unsaturated ammonium salt-containing monomers. From among these monomers, N,N-dimethylaminoethyl (meth)acrylate or N—(N',N'-dimethylaminopropyl)(meth)acrylamide is preferable.

Representative examples of the anionic monomers include unsaturated carboxylic acid monomers, unsaturated sulfonic acid monomers, and unsaturated phosphoric acid monomers.

Examples of unsaturated carboxylic acid monomers include acrylic acid, methacrylic acid, crotonic acid, itaconic acid, maleic acid, fumaric acid, citraconic acid, and 2-methacryloyloxymethyl succinic acid.

Examples of unsaturated sulfonic acid monomers include styrenesulfonic acid, 2-acrylamide-2-methylpropanesulfonic acid, 3-sulfopropyl (meth)acrylate, and bis-(3-sulfopropyl)-itaconate.

Examples of unsaturated phosphoric acid monomers include vinyl phosphonic acid, vinyl phosphate, bis(methacryloxyethyl)phosphate, diphenyl-2-acryloyloxyethyl phosphate, diphenyl-2-methacryloyloxyethyl phosphate, and dibutyl-2-acryloyloxyethyl phosphate.

Among the anionic monomers, an unsaturated carboxylic acid monomer is preferable, and acrylic acid or methacrylic acid is more preferable, from the viewpoints of dispersion stability, ejection property, and the like.

(Styrenic Macromer (d))

The styrenic macromer (d) (hereinafter sometimes simply referred to as "macromer") is used with a view to increasing the affinity for a colorant (particularly, a pigment), thereby increasing the dispersion stability of water-insoluble polymer particles containing a pigment. The styrenic macromer (d) may be, for example, a macromer that is a monomer having a number average molecular weight of from 500 to 100,000, more preferably from 1,000 to 10,000, and having a polymerizable functional group, such as an unsaturated group, at one terminal thereof. The macromer as the (d) component is preferably capable of forming a hydrophobic graft chain, from the viewpoint of increasing the affinity for a pigment.

The number-average molecular weight of the (d) component may be obtained by gel permeation chromatography in which polystyrene is used as a standard substance, and tetrahydrofuran containing 50 mmol/L of acetic acid is used as a solvent.

The term "styrenic macromer" refers to a macromer including a structural unit derived from a styrene-containing monomer such as styrene, α-methylstyrene, or vinyltoluene. From among styrene-containing monomers, styrene is preferable. The styrenic macromer may be, for example, a styrene homopolymer having a polymerizable functional group at one terminal thereof, or a copolymer of styrene and at least one other monomer wherein the copolymer has a polymerizable functional group at one terminal thereof. The polymerizable functional group that is present at one terminal of the macromer is preferably an acryloyloxy group or a methacryloyloxy group. A water-insoluble graft polymer including a structural unit derived from a styrenic macromer can be obtained by copolymerization using the styrenic macromer as a copolymerization component.

The content of structural units derived from styrenic monomers in the styrene macromer is preferably 60% by mass or higher, more preferably 70% by mass or higher, and particularly preferably 90% by mass or higher, from the viewpoint of pigment dispersion property.

The styrene macromer may be a commercially-available product, examples of which include AS-6, AS-6S, AN-6, AN-6S, HS-6, and HS-6S (all of which are trade names, manufactured by Toa Gosei Co., Ltd.).

(Hydrophobic Monomer (e))

A hydrophobic monomer (e) may be used from the viewpoints of, for example, improving the dispersion stability of the water-resistant colorant and reducing the amount of free polymers. Examples thereof include an alkyl(meth)acrylate, an alkyl(meth)acrylamide, an aromatic-ring-containing monomer (a monomer that includes an aromatic ring), and a monomer capable of forming a repeating unit represented by the Formula (1)-A or (2) below and compounds thereof.

Examples of the alkyl (meth)acrylate include (meth)acrylic esters having an alkyl group having from 1 to 22 carbon atoms, such as methyl (meth)acrylate, ethyl (meth)acrylate, (iso)propyl (meth)acrylate, (iso or tertiary-)butyl (meth)acrylate, (iso)amyl (meth)acrylate, cyclohexyl (meth)acrylate, 2-ethylhexyl (meth)acrylate, (iso)octyl (meth)acrylate, (iso)decyl (meth)acrylate, (iso)dodecyl (meth)acrylate, and (iso)stearyl (meth)acrylate.

Examples of the alkyl (meth)acrylamide include (meth)acrylamides having an alkyl group having from 1 to 22 carbon atoms, such as methyl (meth)acrylamide, dimethyl (meth)acrylamide, diethyl (meth)acrylamide, dibutyl (meth)acrylamide, t-butyl (meth)acrylamide, octyl (meth)acrylamide, and dodecyl (meth)acrylamide.

Examples of the aromatic-ring-containing monomer include styrenic monomers such as styrene, 2-methylstyrene, and vinyltoluene; aryl esters of (meth)acrylic acid such as benzyl (meth)acrylate and phenoxyethyl (meth)acrylate, and vinyl monomers having an aromatic hydrocarbon group having from 6 to 22 carbon atoms, such as ethyl vinyl benzene, 4-vinyl biphenyl, 1,1-diphenylethylene, vinyl naphthalene, and chlorostyrene.

The expression "(iso or tertiary-)" as used herein means iso- or tertiary- or normal-. The expression "(iso)" as used herein means iso- or normal-. Furthermore, the scope of "(meth)acrylate" includes both of acrylate and methacrylate.

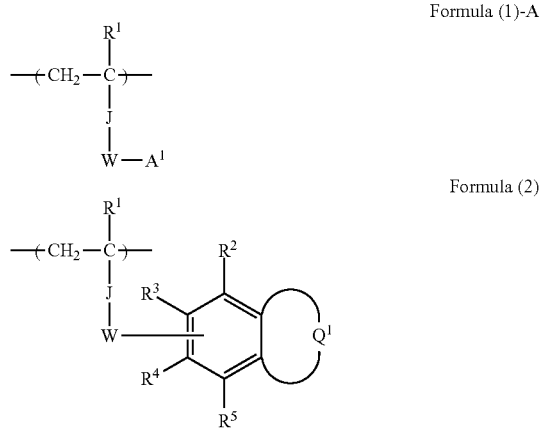

Formula (1)-A

Formula (2)

In Formula (1)-A or (2), $R^1$ represents a hydrogen atom or a substituent. One of $R^2$ to $R^5$ represents a single bond connected to W, and the others of $R^2$ to $R^5$ each independently represent a hydrogen atom or a substituent. J represents *—CO—, *—COO—, *—CONR$^{10}$—, *—OCO—, a methylene group, a phenylene group, or *—$C_6H_4CO$—. $R^{10}$ represents a hydrogen atom, an alkyl group, an aryl group, or an aralkyl group. W represents a single bond or a divalent linking group. $A^1$ represents a heterocyclic group. $Q^1$ represents an atomic group necessary for forming a ring together with the carbon atoms. The * sign represents a site connected to the main chain.

Examples of substituents that $R^1$ to $R^5$ may represent include monovalent substituents. Examples of the monovalent substituents (hereinafter, referred to as substituent Z) include an alkyl group, a cycloalkyl group, an alkenyl group, an alkynyl group, an aryl group, an amino group, an alkoxy group, an aryloxy group, a heterocyclyloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a sulfamoyl group, a carbamoyl group, an alkylthio group, an arylthio group, a heterocyclylthio group, a sulfonyl group, a sulfinyl group, a ureido group, a phosphoric acid amide group, a hydroxyl group, a mercapto group, a halogen atom, a cyano group, a sulfo group, a carboxyl group, an oxo group, a nitro group, a hydroxamic acid group, a sulfino group, a hydrazino group, an imino group, a heterocyclic group, a silyl group, and a silyloxy group. These groups may themselves be substituted by one or more substituents selected from the above substituents Z.

Among the above, $R^1$ preferably represents a hydrogen atom, an alkyl group (an alkyl group having preferably from 1 to 30 carbon atoms, more preferably from 1 to 20 carbon atoms, and particularly preferably from 1 to 10 carbon atoms, such as methyl, ethyl, iso-propyl, tert-butyl, n-octyl, n-decyl, or n-hexadecyl), or an aryl group (an aryl group having preferably from 6 to 30 carbon atoms, more preferably from 6 to 20 carbon atoms, and particularly preferably from 6 to 12 carbon atoms, such as phenyl, p-methylphenyl, naphthyl, or anthranyl). $R^1$ more preferably represents a hydrogen atom or an alkyl group.

One of $R^2$ to $R^5$ represents a single bond connected to W, and the others of $R^2$ to $R^5$ each independently represent preferably a hydrogen atom, an alkyl group (an alkyl group having preferably from 1 to 30 carbon atoms, more preferably from 1 to 20 carbon atoms, and particularly preferably from 1 to 10 carbon atoms, such as methyl, ethyl, iso-propyl, tert-butyl, n-octyl, n-decyl, or n-hexadecyl), an aryl group (an aryl group having preferably from 6 to 30 carbon atoms, more preferably from 6 to 20 carbon atoms, and particularly preferably from 6 to 12 carbon atoms, such as phenyl, p-methylphenyl, naphthyl, or anthranyl), an amino group (an amino group having preferably from 0 to 30 carbon atoms, more preferably from 0 to 20 carbon atoms, and particularly preferably from 0 to 10 carbon atoms, such as amino, methylamino, dimethylamino, diethylamino, dibenzylamino, diphenylamino, or ditolylamino), an alkoxy group (an alkoxy group having preferably from 1 to 30 carbon atoms, more preferably from 1 to 20 carbon atoms, and particularly preferably from 1 to 10 carbon atoms, such as methoxy, ethoxy, butoxy, or 2-ethylhexyloxy), an aryloxy group (an aryloxy group having preferably from 6 to 30 carbon atoms, more preferably from 6 to 20 carbon atoms, and particularly preferably from 6 to 12 carbon atoms, such as phenyloxy, 1-naphthyloxy, or 2-naphthyloxy), an acyl group (an acyl group having preferably from 1 to 30 carbon atoms, more preferably from 1 to 20 carbon atoms, and particularly preferably from 1 to 12 carbon atoms, such as acetyl, benzoyl, formyl, or pivaloyl), an alkoxycarbonyl group (an alkoxycarbonyl group having preferably from 2 to 30 carbon atoms, more preferably from 2 to 20 carbon atoms, and particularly preferably from 2 to 12 carbon atoms, such as methoxycarbonyl or ethoxycarbonyl), an aryloxycarbonyl group (an aryloxycarbonyl group having preferably from 7 to 30 carbon atoms, more preferably from 7 to 20 carbon atoms, and particularly preferably from 7 to 12 carbon atoms, such as phenyloxycarbonyl), an acyloxy group (an acyloxy group having preferably from 1 to 30 carbon atoms, more preferably from 1 to 20 carbon atoms, and particularly preferably from 1 to 10 carbon atoms, such as acetoxy or benzoyloxy), an acylamino group (an acylamino group having preferably from 1 to 30 carbon atoms, more preferably from 1 to 20 carbon atoms, and particularly preferably from 1 to 10 carbon atoms, such as acetylamino or benzoylamino), an alkoxycarbonylamino group (an alkoxycarbonylamino group having preferably from 2 to 30 carbon atoms, more preferably from 2 to 20 carbon atoms, and particularly preferably from 2 to 12 carbon atoms, such as methoxycarbonylamino), an aryloxycarbonylamino group (an aryloxycarbonylamino group having preferably from 7 to 30 carbon atoms, more preferably from 7 to 20 carbon atoms, and particularly preferably from 7 to 12 carbon atoms, such as phenyloxycarbonylamino), a sulfonylamino group (a sulfonylamino group having preferably from 1 to 30 carbon atoms, more preferably from 1 to 20 carbon atoms, and particularly preferably from 1 to 12 carbon atoms, such as methanesulfonylamino or benzenesulfonylamino), a carbamoyl group (a carbamoyl group having preferably from 1 to 30 carbon atoms, more preferably from 1 to 20 carbon atoms, and particularly preferably from 1 to 12 carbon atoms, such as carbamoyl, methylcarbamoyl, diethylcarbamoyl, or phenylcarbamoyl), a sulfonyl group (a sulfonyl group having preferably from 1 to 30 carbon atoms, more preferably from 1 to 20 carbon atoms, and particularly preferably from 1 to 12 carbon atoms, such as mesyl or tosyl), a hydroxyl group, a halogen atom (for example, a fluorine atom, a chlorine atom, a bromine atom, or an iodine atom; more preferably, a fluorine atom), a cyano group, a carboxyl group, a nitro group, or a heterocyclic group;

further more preferably a hydrogen atom, an alkyl group, an aryl group, an amino group, an alkoxy group, an aryloxy group, an acyl group, an acylamino group, a sulfonylamino group, a carbamoyl group, a sulfonyl group, a hydroxyl group, a halogen atom, or a cyano group, and still further preferably a hydrogen atom, an acyl group, a hydroxyl group, a halogen atom, or a cyano group.

In Formulae (1)-A and (2), J preferably represents *—CO—, *—CONR$^{10}$—, a phenylene group, or *—C$_6$H$_4$CO—, and more preferably *—C$_6$H$_4$CO—. R$^{10}$ represents a hydrogen atom, an alkyl group, an aryl group, or an aralkyl group, and preferably represents a hydrogen atom, an alkyl group, or an aryl group. Preferable definitions of the alkyl group and the aryl group are the same as the preferable definitions of the alkyl group and the aryl group described in the explanation of the substituents Z, respectively.

In Formulae (1)-A and (2), W represents a single bond or a divalent linking group.

Examples of the divalent linking group include an imino group, a liner, branched, or cyclic alkylene group (having preferably from 1 to 30 carbon atoms, more preferably from 1 to 12 carbon atoms, and further more preferably from 1 to 4 carbon atoms, examples of which include a methylene group, an ethylene group, a propylene group, a butylene group, a pentylene group, a hexylene group, an octylene group, and a decylene group), an aralkylene group (having preferably from 7 to 30 carbon atoms, and more preferably from 7 to 13 carbon atoms, examples of which include a benzylidene group and a cinnamylidene group), an arylene group (having preferably from 6 to 30 carbon atoms, and more preferably from 6 to 15 carbon atoms, examples of which include a phenylene group, a cumenylene group, a mesitylene group, a tolylene group, and a xylylene group), *—(CR$^{11}$R$^{12}$)$_n$NHCONH—, and *—(CR$^{11}$R$^{12}$)$_n$CONH—, in which * indicates a site connected to the main chain, and R$^{11}$ and R$^{12}$ each independently represent a hydrogen atom or a substituent, preferably a hydrogen atom, an alkyl group, a halogen atom, or a hydroxyl group, more preferably a hydrogen atom or an alkyl group, and further more preferably a hydrogen atom. When plural R$^{11}$'s and R$^{12}$'s are present, plural R$^{11}$'s may be the same as or different from each other, and plural R$^{12}$'s may be the same as or different from each other. Furthermore, n represents a positive integer, preferably an integer of from 1 to 10, and more preferably an integer of from 2 to 5. Among those described above, *—(CR$^{11}$R$^{12}$)$_n$NHCONH—, *—(CR$^{11}$R$^{12}$)$_n$CONH—, or an imino group is preferable, and an imino group is more preferable.

W preferably represents a single bond, an alkylene group, or an arylene group, and more preferably represents a single bond or an alkylene group. W is even more preferably a single bond. W may further have a substituent, and the definition and specifics of the substituent are the same as those of the substituents Z described above. W may represent a group formed from a combination of at least two of the divalent linking groups described above. It is preferable that W has an ether bond therein.

In Formula (1)-A, A$^1$ represents a heterocyclic group. The "heterocyclic group" or "heterocyclyl group" refers to a monovalent group obtained by removing one hydrogen atom from a heterocyclic compound.

The heterocyclic group represented by A$^1$ is preferably a heterocyclic group capable of forming a colorant (especially, a pigment). The presence of a heterocyclic group having a high affinity for a pigment due to a Van-der-Waals interaction provides the polymer with favorable adsorptivity to pigment, whereby a stable dispersion is obtained.

A heterocyclic compound for forming the heterocyclic group is preferably a compound having at least one hydrogen bonding group in a molecule thereof, and examples thereof include thiophene, furan, xanthene, pyrrole, imidazole, isoindoline, isoindolinone, benzimidazolone, indole, quinoline, carbazole, acridine, acridone, quinacridon, anthraquinone, phthalimide, quinaldine, and quinophthalone. Of these, benzimidazolone, indole, quinoline, carbazole, acridine, acridone, anthraquinone, and phthalimide are particularly preferable.

The heterocyclic group is particularly preferably a heterocyclic group that is similar to the pigment to be used. Specifically, it is particularly preferable to use at least one selected from acridone and anthraquinone when a quinacridon pigment is used. In such a case, adsorption between the water-insoluble polymer and the colorant is strong, and detachment of the polymer from the colorant is suppressed regardless of the kind or amount of solvent used as the ink solvent.

In Formula (2), Q$^1$ represents an atomic group necessary for forming a ring together with the carbon atoms (specifically, the two carbon atoms of —C=C—). The atomic group may consist of carbon, nitrogen, oxygen, silicon, phosphorus, and/or sulfur, preferably carbon, nitrogen, oxygen, and/or sulfur, more preferably carbon, nitrogen, and/or oxygen, and even more preferably carbon and/or nitrogen. Q$^1$ which is formed by the atomic group may be saturated or unsaturated. In a case in which Q$^1$ is capable of being substituted, Q$^1$ may have a substituent. In this case, the definition and specifics of the substituent are the same as the definition and specifics of the substituent Z above.

In Formula (2), examples of the cyclic structure group connected to W (a cyclic structure group constituted by the aryl group having $R^2$ to $R^5$ and $Q^1$) include a cyclic structure group which is represented by any one of the following Formulae (i) to (vi), and which may have a substituent. In Formulae (i) to (vi), the * sign represents a site connected to W. Among them, a cyclic structure group which is represented by the following Formula (i), (ii), or (iii), and which may have a substituent are preferable, and a cyclic structure group represented by the following Formula (i) which may have a substituent is more preferable.

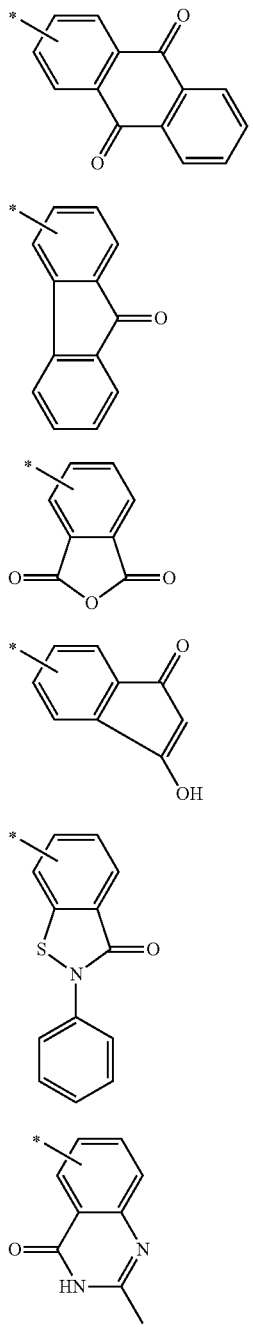

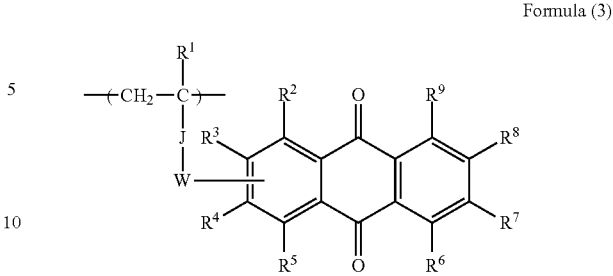

Formula (3)

In Formula (3), $R^6$ to $R^9$ each independently represent a hydrogen atom or a substituent. $R^1$ to $R^5$, J, and W have the same definitions and preferable definitions as $R^1$ to $R^5$, J, and W in Formula (2), respectively.

When any of $R^6$ to $R^9$ represents a substituent, examples of the substituent include those described in the explanation of the substituents Z. $R^6$ to $R^9$ each independently represent preferably a hydrogen atom, an alkyl group, an aryl group, an amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a carbamoyl group, a sulfonyl group, a hydroxyl group, a halogen atom, a cyano group, a carboxyl group, a nitro group, or a heterocyclic group; more preferably a hydrogen atom, an alkyl group, an aryl group, an amino group, an alkoxy group, an aryloxy group, an acyl group, an acylamino group, a sulfonylamino group, a carbamoyl group, a sulfonyl group, a hydroxyl group, a halogen atom, or a cyano group; furthermore preferably a hydrogen atom, an acyl group, a hydroxyl group, a halogen atom, or a cyano group; and particularly preferably a hydrogen atom.

In the repeating unit represented by Formula (3), the combination of substituents is preferably the following combination (a), (b), (c), or (d), more preferably a combination (b), (c), or (d), even more preferably combination (c) or (d), and particularly preferably combination (d).

Combination (a): J represents *—CO—, *—CONR$^{10}$—, a phenylene group, or *—C$_6$H$_4$CO—, in which R$^{10}$ represents a hydrogen atom, an alkyl group, or an aryl group. W represents a single bond, an imino group, an alkylene group, or an arylene group. $R^1$ represents a hydrogen atom, an alkyl group, or an aryl group. $R^2$ to $R^5$ each independently represent a single bond, a hydrogen atom, an alkyl group, an aryl group, an amino group, an alkoxy group, an aryloxy group, an acyl group, an alkoxycarbonyl group, an aryloxycarbonyl group, an acyloxy group, acylamino group, alkoxycarbonylamino group, an aryloxycarbonylamino group, a sulfonylamino group, a carbamoyl group, a sulfonyl group, a hydroxyl group, a halogen atom, a cyano group, a carboxyl group, a nitro group, or a heterocyclic group, provided that one of $R^2$ to $R^5$ represents a single bond connected to W. $R^6$ to $R^9$ each independently represent a hydrogen atom, an alkyl group, an aryl group, an amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a carbamoyl group, a sulfonyl group, a hydroxyl group, a halogen atom, a cyano group, a carboxyl group, a nitro group, or a heterocyclic group.

Combination (b): J represents *—C$_6$H$_4$CO—, *—CONR$^{10}$—, or a phenylene group, and R$^{10}$ represents a hydrogen atom or an alkyl group. W represents an imino The structural unit (repeating unit) represented by Formula (2) is preferably a repeating unit represented by the following Formula (3).

group, a single bond, or an arylene group. $R^1$ represents a hydrogen atom or an aryl group. $R^2$ to $R^5$ each independently represent a hydrogen atom, an alkyl group, an aryl group, an amino group, an alkoxy group, an aryloxy group, an acyl group, an acylamino group, a sulfonylamino group, a carbamoyl group, a sulfonyl group, a hydroxyl group, a halogen atom, or a cyano group, provided that one of $R^2$ to $R^5$ represents a single bond connected to W. $R^6$ to $R^9$ each independently represent a hydrogen atom, an alkyl group, an aryl group, an amino group, an alkoxy group, an aryloxy group, an acyl group, an acylamino group, a sulfonylamino group, a carbamoyl group, a sulfonyl group, a hydroxyl group, a halogen atom, or a cyano group.

Combination (c): J represents *—$C_6H_4CO$— or *—$CONR^{10}$—, and $R^{10}$ represents a hydrogen atom. W represents an imino group or a single bond. $R^1$ represents a hydrogen atom or an aryl group. $R^2$ to $R^5$ each independently represent a hydrogen atom, an acyl group, a hydroxyl group, a halogen atom, or a cyano group, provided that one of $R^2$ to $R^5$ represents a single bond connected to W. $R^6$ to $R^9$ each independently represent a hydrogen atom, an acyl group, a hydroxyl group, a halogen atom, or a cyano group.

Combination (d): J represents *—$C_6H_4CO$—. W represents an imino group. $R^1$ represents a hydrogen atom or an aryl group. $R^2$ to $R^5$ each independently represent a hydrogen atom, an acyl group, a hydroxyl group, a halogen atom, or a cyano group, provided that one of $R^2$ to $R^5$ represents a single bond connected to W. $R^6$ to $R^9$ each represent a hydrogen atom.

Specific examples of the repeating unit represented by Formula (1)-A include, but are not limited to, those shown below.

M-1
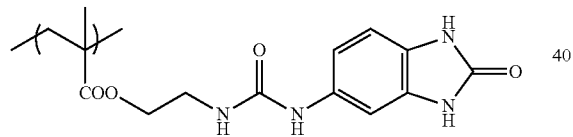

M-2
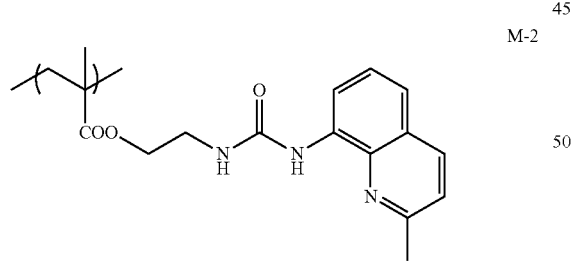

M-3
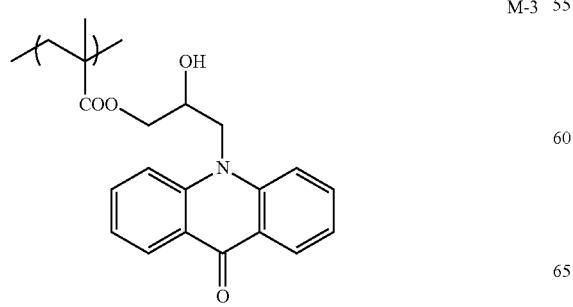

-continued

M-4
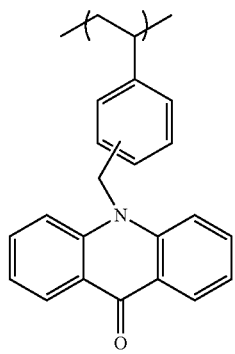

M-5
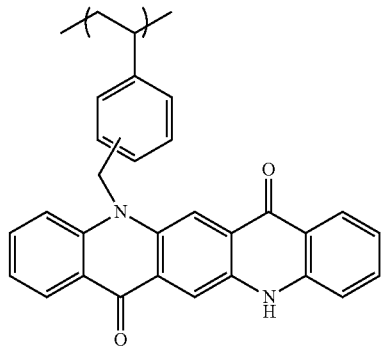

M-6
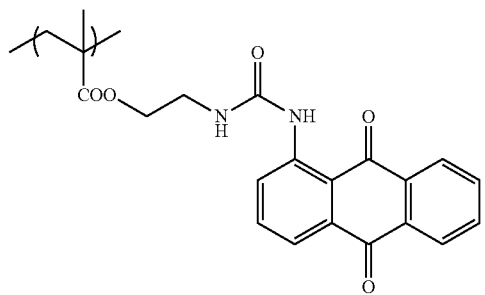

M-7
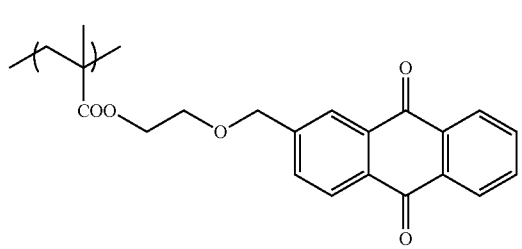

M-8
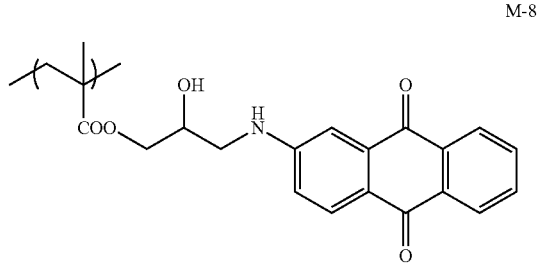

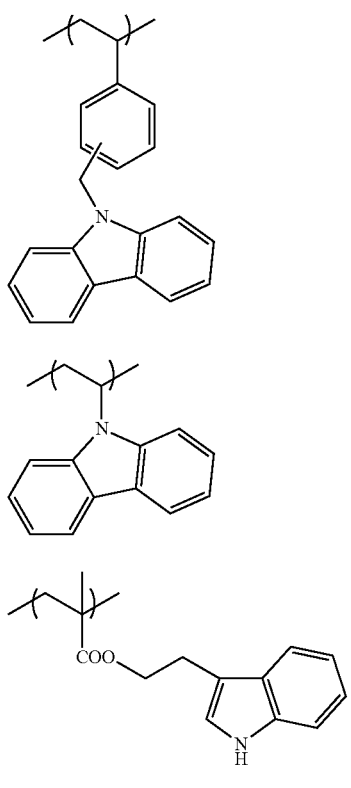
M-9
M-10
M-11
M-12
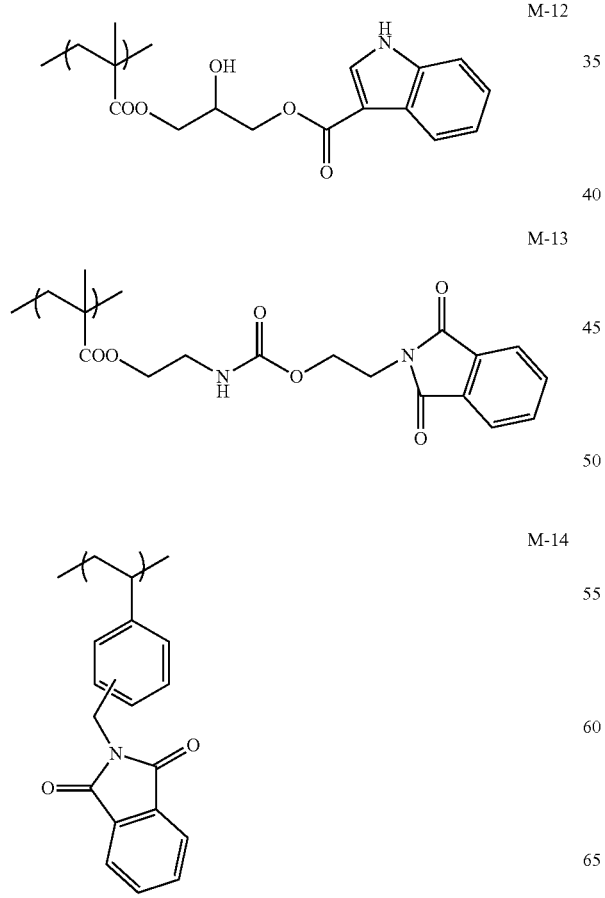
M-13
M-14
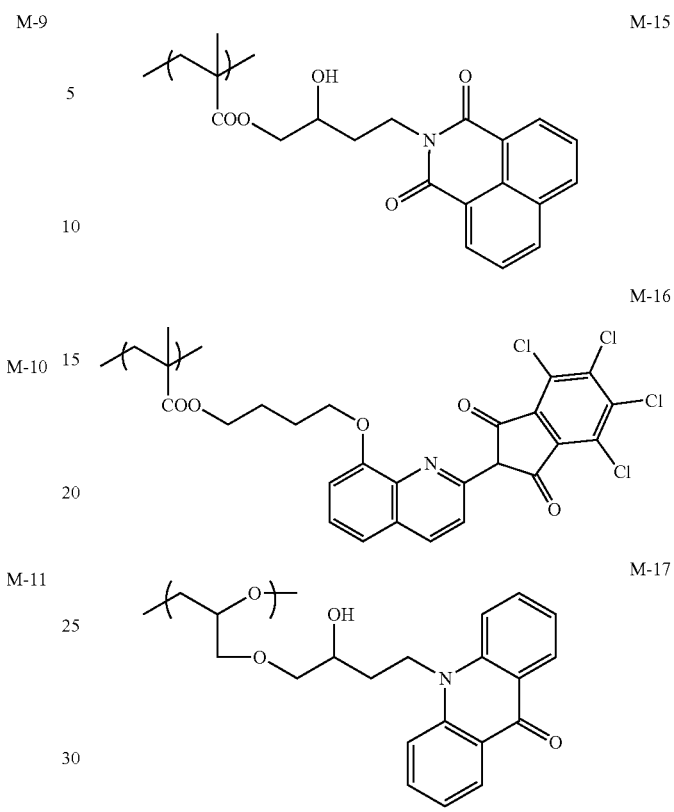
M-15
M-16
M-17
Specific examples of the repeating unit represented by Formula (2) include, but are not limited to, those shown below
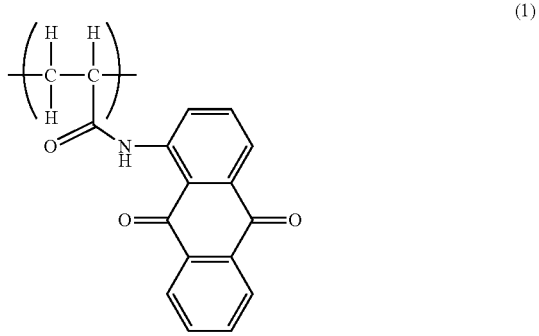
(1)
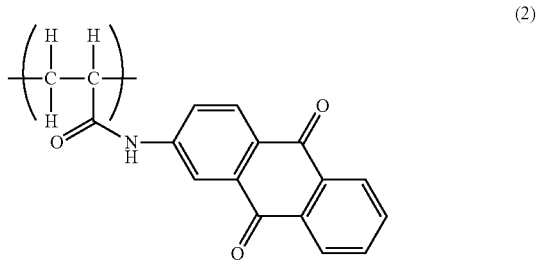
(2)

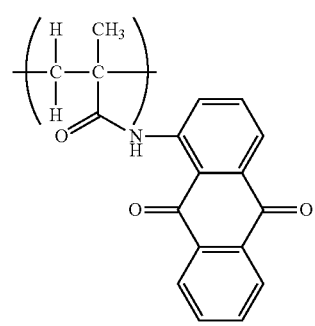
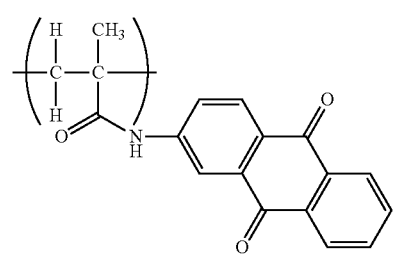
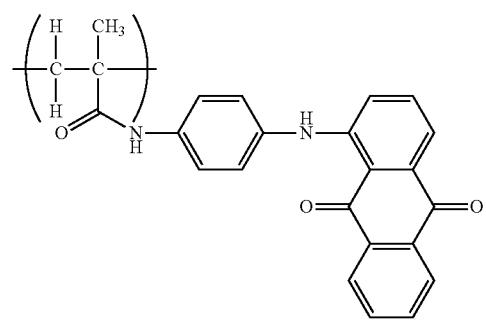
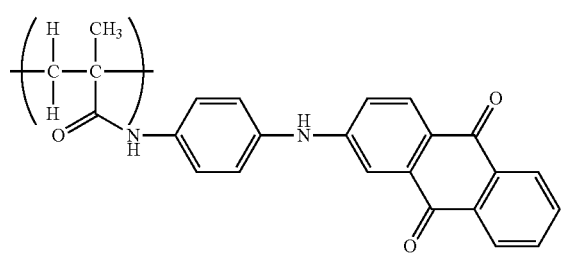
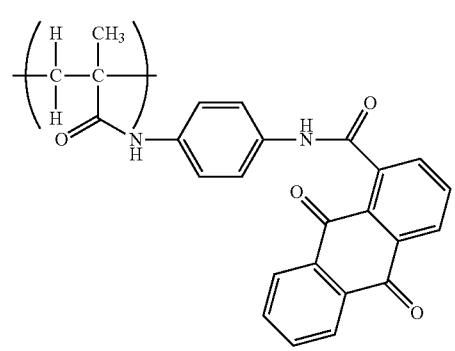

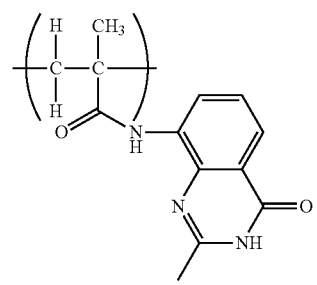

(13)

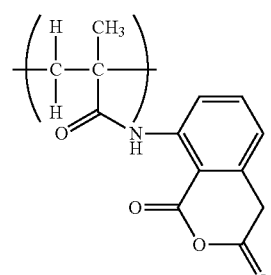

(14)

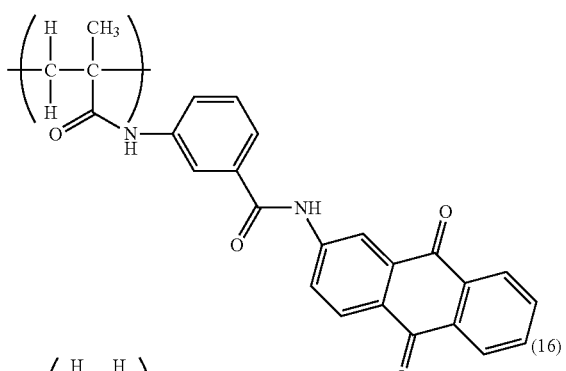

(15)

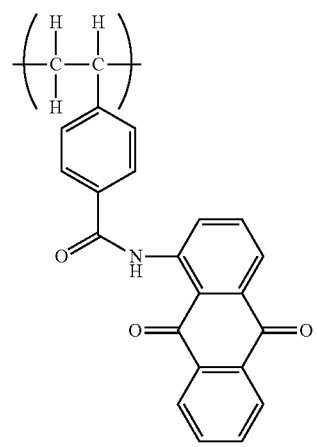

(16)

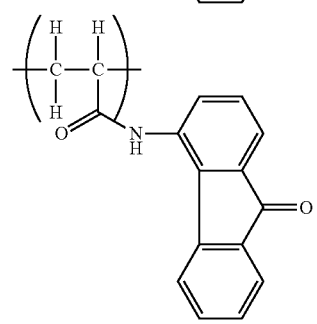

(17)

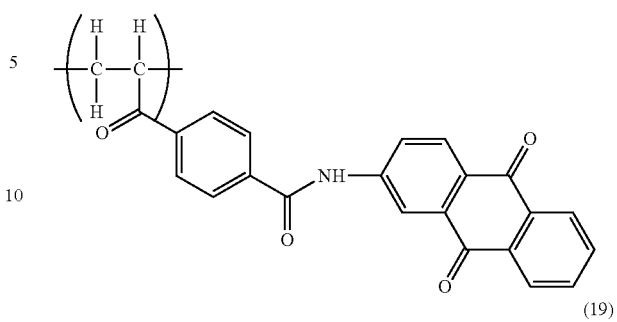

(18)

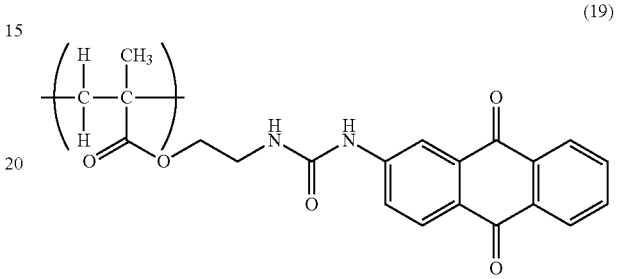

(19)

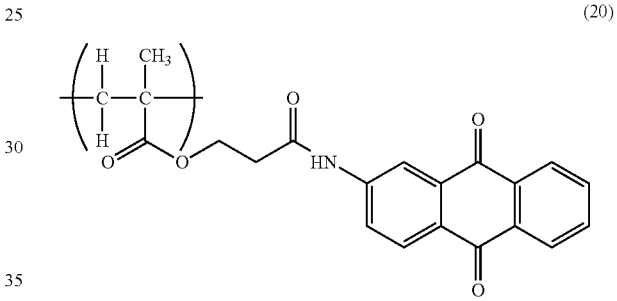

(20)

The (e) component is preferably an aromatic-ring-containing monomer, or a monomer capable of forming a heterocycle-containing repeating unit when used for formation of the water-insoluble polymer, from the viewpoints of improving the dispersibility of a colorant (especially, a pigment) and reducing the amount of free polymer. Among them, the (e) component is more preferably a monomer capable of forming a heterocycle-containing repeating unit when used for the formation of the water-insoluble polymer described above (this monomer is hereinafter referred to as "(e-1) component"), from the viewpoints of, for example, improving the dispersibility of a colorant (especially, a pigment) or reducing the amount of free polymer when used in the black ink composition of the present invention.

The content of the (e-1) component in the (e) component is preferably from 10% by mass to 100% by mass, and more preferably from 20% by mass to 80% by mass, with respect to the total mass of the (e) component, from the viewpoints of, for example, reducing the amount of free polymer, and improving print density and rubbing resistance.

The aromatic-ring-containing monomer is preferably a styrenic monomer, which is hereinafter referred to as "(e-2) component", and is more preferably styrene or 2-methylstyrene. The content of the (e-2) component in the (e) component is preferably from 10% by mass to 100% by mass, and more preferably from 20% by mass to 80% by mass, with respect to the total mass of the (e) component, from the viewpoints of, for example, improvement in the print density and rubbing resistance.

From the viewpoint of, for example, improvement in the colorant dispersibility, the aromatic-ring-containing monomer is preferable as the (e) component. In particular, an aryl ester of (meth)acrylic acid, which is hereinafter referred to as "(e-3) component", is preferable, and a (meth)acrylate having an arylalkyl group having from 7 to 22 carbon atoms, preferably from 7 to 18 carbon atoms, and more preferably from 7 to 12 carbon atoms, or a (meth)acrylate having an aryl group having from 6 to 22 carbon atoms, preferably from 6 to 18 carbon atoms, and more preferably from 6 to 12 carbon atoms, is more preferable. Preferable specific examples of such a monomer include benzyl (meth)acrylate and phenoxyethyl (meth)acrylate. The content of the (e-2) component in the (e) component is preferably from 10% by mass to 100% by mass, and more preferably from 20% by mass to 80% by mass, with respect to the total mass of the (e) component, from the viewpoints of improvement in the colorant dispersibility and the like.

The (e) components may be used alone, or in combination of two or more thereof. It is preferable to use a combination of the (e-1) component and the (e-2) component, a combination of the (e-2) component and the (e-3) component, or a combination of the (e-1) component and the (e-3) component. From the viewpoint of reducing free polymer, it is preferable to use a combination of the (e-1) component and the (e-2) component or a combination of the (e-2) component and the (e-3) component, and most preferable to use a combination of the (e-1) component and the (e-2) component.

In the present invention, it is preferable that the monomer mixture containing the above-described (c), (d), and (e) components further contains a hydroxyl group-containing monomer (f) (hereinafter also referred to as an "(f) component").

The (f) component increases dispersion stability. Examples of the (f) component include 2-hydroxyethyl (meth)acrylate, 3-hydroxypropyl (meth)acrylate, polyethylene glycol (n=2 to 30; n represents an average addition mol number of oxyalkylene groups, and the same applies hereinbelow) (meth)acrylate, propylene glycol (n=2 to 30) (meth)acrylate, and poly(ethylene glycol (n=1 to 15)-propylene glycol (n=1 to 15)) (meth)acrylate. Of these, 2-hydroxyethyl (meth)acrylate, polyethylene glycol monomethacrylate, and polypropylene glycol methacrylate are preferable.

The monomer mixture may include a monomer (g) represented by the following Formula (A). The monomer (g) is hereinafter sometimes referred to as "(g) component".

$$CH_2=C(R^3)COO(R^4O)_pR^5 \quad \text{Formula (A)}$$

In Formula (A), $R^3$ represents a hydrogen atom or an alkyl group having from 1 to 5 carbon atoms; $R^4$ represents a divalent hydrocarbon group which has 1 to 30 carbon atoms and which may have a hetero atom; $R^5$ represents a monovalent hydrocarbon group which has 1 to 30 carbon atoms and which may have a hetero atom; and p represents an average addition mol number and represents a number of from 1 to 60, preferably from 1 to 30.

The (g) component increases ejection stability of an ink composition, and exhibits excellent effects on preventing misdirection of ink droplets even in continuous printing, and the like.

Examples of the hetero atom which may be included in $R^4$ or $R^5$ in Formula (A) include a nitrogen atom, an oxygen atom, a halogen atom, and a sulfur atom.

Representative examples of the group represented by $R^4$ include an aromatic group having from 6 to 30 carbon atoms, a heterocyclic group having from 3 to 30 carbon atoms, and an alkylene group having from 1 to 30 carbon atoms, each of which may have a substituent. Representative examples of the group represented by $R^5$ include an aromatic group having from 6 to 30 carbon atoms, and a heterocyclic group having from 3 to 30 carbon atoms, each of which may have a substituent. $R^4$ may represent a combination of two or more of these groups, and, similarly, $R^5$ may represent a combination of two or more of these groups. Examples of the substituent include an aromatic group, a heterocyclic group, an alkyl group, a halogen atom, and an amino group.

Preferable examples of the group represented by $R^4$ include: a phenylene group that may have a substituent having from 1 to 24 carbon atoms; an aliphatic alkylene group having from 1 to 30 carbon atoms, and more preferably having from 1 to 20 carbon atoms; an alkylene group which has at least one aromatic ring bonded thereto and which has from 7 to 30 carbon atoms (including the carbon atoms of the at least one aromatic ring), and an alkylene group which has at least one heterocycle bonded thereto and which has from 4 to 30 carbon atoms (including the carbon atoms of the at least one heterocycle). Particularly preferable specific examples of the $R^4O$ group include an oxyethylene group, an oxy(iso)propylene group, an oxytetramethylene group, an oxyheptamethylene group, an oxyhexamethylene group, an oxyalkylene group which is composed of one or more types of oxyalkylene selected from the above, and which has from 2 to 7 carbon atoms, and an oxyphenylene group.

Specific examples of $R^5$ include a phenyl group, an aliphatic alkyl group having from 1 to 30 carbon atoms (preferably an aliphatic alkyl group which has from 1 to 20 carbon atoms and which may be branched), an aromatic-ring-containing alkyl group having from 7 to 30 carbon atoms, and a heterocycle-containing alkyl group having from 4 to 30 carbon atoms. Examples of more preferable $R^5$ include an alkyl group having from 1 to 12 carbon atoms, such as a methyl group, an ethyl group, an iso-propyl group, a propyl group, an iso-butyl group, a butyl group, an iso-pentyl group, a pentyl group, an iso-hexyl group, or a hexyl group; and a phenyl group.

Specific examples of the (g) component include methoxypolyethyleneglycol(p in the above Formula (A) being from 1 to 30) (meth)acrylate, methoxypolytetramethyleneglycol(p being from 1 to 30) (meth)acrylate, ethoxypolyethyleneglycol(p being from 1 to 30) (meth)acrylate, (iso) propoxypolyethyleneglycol(p being from 1 to 30) (meth) acrylate, butoxypolyethyleneglycol(p being from 1 to 30) (meth)acrylate, octoxypolyethyleneglycol(p being from 1 to 30) (meth)acrylate, methoxypolypropyleneglycol(p being from 1 to 30) (meth)acrylate, and methoxypoly(ethyleneglycol-co-propyleneglycol)(meth)acrylate (wherein p is from 1 to 30 and the number of ethyleneglycol units is from 1 to 29). From among the above, methoxypolyethyleneglycol(p being from 1 to 30) (meth)acrylate is preferable.

Specific examples of the (f) and (g) components include polyfunctional acrylate monomers (NK-ESTER) M-40G, 90G, and 230G (trade names, manufactured by Shin-Nakamura Chemical Co., Ltd.), and BLEMMER series products including PE-90, 200, and 350, PME-100, 200, 400, and 1000, PP-1000, PP-500, PP-800, AP-150, AP-400, AP-550, AP-800, 50PEP-300, 50POEP-800B, and 43PAPE-600B (trade names, manufactured by NOF CORPORATION).

With respect to each of the (a) to (g) components, the component may each be used singly, or in combination of two or more thereof.

The contents of the (c) to (e) components in a monomer mixture are as described below.

The content of (c) component is preferably from 1 to 50% by mass, more preferably from 2 to 40% by mass, and particularly preferably from 3 to 20% by mass, from the viewpoint of dispersion stability or the like of the water-insoluble polymer particle containing a colorant (especially, pigment) to be obtained.

The content of (d) component is preferably from 1 to 50% by mass, and more preferably from 5 to 40% by mass, from the viewpoint of dispersion stability or the like of the water-insoluble polymer particle containing a colorant (especially, pigment).

The content of (e) component is preferably from 5 to 98% by mass, and more preferably from 10 to 60% by mass, from the viewpoint of dispersion stability or the like of the water-insoluble polymer particle containing a colorant (especially, pigment).

A mass ratio of the content of (c) component to the total content of (d) component and (e) component ((c)/[(d)+(e)]) is preferably from 0.01 to 1, more preferably from 0.02 to 0.67, and further more preferably from 0.03 to 0.50, from the viewpoint of ejection property or the like of an ink composition to be obtained.

The content of (d) component is preferably from 5 to 40% by mass, and more preferably from 7 to 30% by mass, from the viewpoints of ejection property and dispersion stability.

The content of (e) component is preferably from 5 to 50% by mass, and more preferably from 10 to 40% by mass, from the viewpoints of ejection property, dispersion stability, and the like.

The total content of (c) component and (d) component is preferably from 6 to 60% by mass, and more preferably from 10 to 50% by mass, from the viewpoints of dispersion stability in water and the like.

The total content of (c) component and (e) component is preferably from 6 to 75% by mass, and more preferably from 13 to 50% by mass, from the viewpoints of dispersion stability in water, ejection property, and the like.

The total content of (c) component, (d) component, and (e) component is preferably from 6 to 60% by mass, and more preferably from 7 to 50% by mass, from the viewpoints of dispersion stability in water and ejection property.

When Polymer [2] has a salt-forming group derived from the salt-forming-group-containing monomer (c), polymer [2] may be used after neutralization with a neutralizer. The neutralizer for use may be an acid or a base, depending on the type of salt-forming group contained in the water-insoluble polymer. Examples of the neutralizer include: acids such as hydrochloric acid, acetic acid, propionic acid, phosphoric acid, sulfuric acid, lactic acid, succinic acid, glycolic acid, gluconic acid, and glyceric acid; and bases such as lithium hydroxide, sodium hydroxide, potassium hydroxide, ammonia, methylamine, dimethylamine, trimethylamine, ethylamine, diethylamine, triethylamine, triethanolamine, tributylamine, tetramethyl ammonium hydroxide, benzyl trimethyl ammonium hydroxide, choline hydroxide, and tetrabutyl ammonium hydroxide. The neutralization degree of the water-insoluble polymer is preferably from 10 to 200%, more preferably from 20 to 150%, and particularly preferably from 50 to 150%.

When the salt-forming group is an anionic group, the neutralization degree can be obtained according to the following equation:

When the salt-forming group is an anionic group, the neutralization degree is calculated from the following equation:

$$\text{neutralization degree (\%)} = \{[\text{mass of neutralizing agent (g)/equivalent weight of neutralizing agent}]/[\text{acid value of polymer (KOHmg/g)} \times \text{mass of polymer (g)}/(56 \times 1{,}000)]\} \times 100$$

When the salt-forming group is a cationic group, the neutralization degree is calculated from the following equation:

$$\text{neutralization degree (\%)} = \{[\text{mass of neutralizing agent (g)/equivalent weight of neutralizing agent}]/[\text{amine value of polymer (HCLmg/g)} \times \text{mass of polymer (g)}/(36.5 \times 1{,}000)]\} \times 100$$

The acid value or amine value may be obtained by calculation based on the types and ratios of structural unit contained in the water-insoluble vinyl polymer, or by titration after dissolving the polymer in an appropriate solvent (for example, methyl ethyl ketone).

The acid value of the water-insoluble resin in the invention is preferably from 30 mgKOH/g to 100 mgKOH/g, more preferably from 30 mgKOH/g to 85 mgKOH/g, and particularly preferably from 50 mgKOH/g to 85 mgKOH/g, from the viewpoints of pigment dispersibility and storage stability.

The acid value as used herein is defined as the mass (mg) of KOH necessary for completely neutralizing 1 g of the water-insoluble resin, and is determined by a method according to the method described in Japanese Industrial Standards (JIS) (JIS K0070 (1992), which is incorporated herein by reference).

The molecular weight of the water-insoluble resin in the invention, in terms of weight average molecular weight (Mw), is preferably 30,000 or more, more preferably from 30,000 to 150,000, still more preferably from 30,000 to 100,000, and particularly preferably from 30,000 to 80,000. When the molecular weight is 30,000 or more, steric repulsion effects as a dispersant can be improved, and the water-insoluble resin has higher tendency to be adsorbed on a pigment due to steric effects.

The number-average molecular weight (Mn) of the water-insoluble resin is preferably from about 1,000 to 100,000, and particularly preferably from about 3,000 to 50,000. A number-average molecular weight of the water-insoluble resin within the above range is preferable from the viewpoint of exerting a function as a coating film for a pigment or a function as a coating film for an ink composition. The polymer [1] is preferably used in the form of a salt of an alkali metal or a salt of an organic amine.

The molecular weight distribution (weight average molecular weight/number average molecular weight) of the water-insoluble resin in the invention is preferably in the range of from 1 to 6, and more preferably in the range of from 1 to 4. When the molecular weight distribution is within the above range, the dispersion stability and the ejection stability of the ink can be heightened.

Number average molecular weight and weight average molecular weight are measured with a gel permeation chromatography (GPC). HLC-8020GPC (trade name) manufactured by Tosoh Corporation is used as a GPC instrument. Three columns of TSKGEL SUPER MULTIPORE HZ-H (trade name, 4.6 mmID×15 cm) manufactured by Tosoh Corporation are used as the columns. THF (tetrahydrofuran) is used as an eluent. Molecular weight can be obtained by conversion using polystyrene as a standard substance.

The water-insoluble resin in the invention can be synthesized by various polymerization methods, such as solution polymerization, precipitation polymerization, suspension polymerization, bulk polymerization, and emulsion polymerization. The polymerization reaction can be performed using a known procedure, such as in a batch manner, a semi-continuous manner, or a continuous manner. The method of initiating polymerization may be, for example, a method using a radical initiator or a method of irradiating light or a radiation. Polymerization methods and polymerization initiation methods are described in, for example, Teiji Tsuruta, "*Kobunshi Gosei-Houhou* (Polymer Synthesis Method)", revised edition, (NIKKAN KOGYO SHINBUN LTD., 1971) and Takayuki Otsu and Masayoshi Kinoshita, "*Kobunshi-Gosei no Jikkenho* (Experimental Technique of Polymer Synthesis)", (Kagaku-dojin Publishing Company Inc., 1972), pp. 124 to 154.

Among the polymerization methods, a solution polymerization method in which a radical initiator is used is particularly preferable. Examples of a solvent used in the solution polymerization method include various organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, or 1-butanol. The solvents may be used alone, or in combination of two or more thereof. Alternatively, a mixture thereof with water may be used. The polymerization temperature should be adjusted in consideration of the molecular weight of the polymer to be produced, the kind of initiator, or the like. The polymerization temperature is usually from about 0 to 100° C., and it is preferable that polymerization is carried out at a temperature within a range from 50 to 100° C. The reaction pressure may be appropriately selected, and is usually from 1 to 100 kg/cm$^2$, and particularly preferably from about 1 to 30 kg/cm$^2$. The reaction time may be from about 5 hours to 30 hours, in general. The obtained resin may be subjected to purification such as re-precipitation.

The mass ratio between carbon black (CB) and water-insoluble resin (r) (CB:r) in the resin-coated CB is preferably in the range of from 100:25 to 100:140, and more preferably in the range of from 100:25 to 100:50. With respect to the ratio (CB:r), when the amount of water-insoluble resin is equal to or greater than a ratio of 100:25, dispersion stability and resistance against rubbing tend to improve. When the amount of water-insoluble resin is equal to or smaller than a ratio of 100:140, dispersion stability tends to improve.

The particle diameter (volume average diameter) of the dispersion of the resin-coated CB is preferably from 50 to 120 nm, more preferably from 60 to 100 nm, and still more preferably from 70 to 90 nm. When the particle diameter is 50 nm or more, deterioration of stability tends to be suppressed. When the particle diameter is 120 nm or less, ejection properties tend to improve, and occurrence of white dot defects in the recorded image tends to be suppressed. Therefore, the particle diameter range of from 50 nm to 120 nm is preferable.

The particle size distribution of the particle diameter is not particularly limited, and may be wide or monodispersed. A mixture of two or more of dispersions each having a monodispersed particle size distribution may be used.

The particle diameter of the resin-coated CB dispersion is a value measured by a dynamic light scattering method using a Nanotrac particle size distribution analyzer UPA-EX150 (trade name, manufactured by Nikkiso Co., Ltd.).

The resin-coated CB can be produced by a conventional physical or chemical method, using a water-insoluble resin, carbon black, and the like. For example, the resin-coated CB can be produced by the method described in JP-A No. 9-151342, JP-A No. 10-140065, JP-A No. 11-209672, JP-A No. 11-172180, JP-A No. 10-25440, or JP-A No. 11-43636. Specific examples of the production method include a phase inversion emulsification method and an acid precipitation method described in JP-A No. 9-151342 and JP-A No. 10-140065.

When the resin-coated CB is a particle obtained by coating carbon black with a water-insoluble resin, the resin-coated CB is preferably a carbon black coated with a water-insoluble resin by a phase inversion emulsification method, from the viewpoint of the dispersion stability.

The phase inversion emulsification method is basically a self-dispersing (phase inversion emulsification) method in which a mixed product of a resin having a self-dispersibility or solubility and a pigment is dispersed in water. The mixed product may further include the curing agent or polymer compound. The scope of the mixed product as used herein encompasses a state in which the components thereof are only mixed with each other without dissolving in each other, a state in which the components thereof are mixed with each other and dissolved in each other, and a state in which both of these states are present. An example of a specific production method by a "phase inversion emulsification" is a method disclosed in JP-A No. 10-140065.

Examples of specific production methods involving a phase inversion emulsification or an acid deposition method include methods disclosed in JP-A No. 9-151342 and JP-A No. 10-140065.

In the invention, the resin-coated CB included in the ink composition may be produced through a preparation step of preparing a dispersion of a resin-coated CB (pigment) by a method which includes the following steps (1) and (2) and which uses a water-insoluble resin. The black ink composition of the invention may be produced by forming an aqueous ink by using the dispersion of a resin-coated CB obtained in the preparation step, together with water and an organic solvent.

Step (1): a step in which a mixture including a water-insoluble resin, an organic solvent, a neutralizer, carbon black, and water is subjected to a dispersion treatment such as agitation, thereby obtaining a dispersion.

Step (2): a step in which the organic solvent is removed from the dispersion.

The agitation method is not particularly limited, and a generally-used mixing and agitation apparatus or a disperser such as an ultrasonic disperser, a high-pressure homogenizer, or a bead mill may be used, as necessary.

Preferable examples of the organic solvent include alcohol solvents, ketone solvents, and ether solvents. The specifics of thereof are described in the item of water-insoluble resin particles described below. The neutralizer is used in order to neutralize some or all of the dissociative groups of the polymer so as to allow the specific copolymer to get into a stable emulsion or dispersion state in water. The specifics of the neutralizer are described below.

In the process (2), the organic solvent is removed from the dispersion obtained through the process (1), by a common method such as distillation under reduced pressure, whereby phase inversion into an aqueous system occurs, and a dispersion of resin-coated pigment particles, each of which is composed of a pigment particle and a copolymer that covers the surface of the pigment particle, is obtained. The organic solvent has substantially been removed from the obtained aqueous dispersion, and the amount of residual organic solvent is preferably 0.2% by mass or less, and more preferably 0.1% by mass or less.

More specifically, the method includes, for example: (1) a step of mixing a copolymer having an anionic group or a solution obtained by dissolving the copolymer in an organic solvent, with a basic compound (i.e., neutralizing agent) for neutralization; (2) a step of mixing the resultant mixture with a pigment to produce a suspension, and dispersing the pigment using a disperser or the like to obtain a pigment dispersion; and (3) a step of removing the organic solvent by distillation or the like, thereby coating the pigment with the specific copolymer having an anionic group and dispersing the pigment in an aqueous medium, to obtain an aqueous dispersion.

More specifically, the disclosures of JP-A No. 11-209672 and JP-A No. 11-172180 may be referred to.

In the invention, the dispersion treatment may be carried out using a ball mill, a roll mill, a bead mill, a high-pressure homogenizer, a high-speed stirring dispersion apparatus, an ultrasonic homogenizer, or the like.

The content ratio of carbon black (excluding the water-insoluble resin covering the carbon black) in the black ink composition of the invention is from 1.0 to 2.0% by mass with respect to the total mass of the black ink composition. When the content ratio of carbon black is less than 1.0% by mass, the content of carbon black is too small, and a desired black density is not maintained. When the content ratio of carbon black exceeds 2.0% by mass, streak-shaped unevenness in image tends to be generated, and damage to a head nozzle surface during maintenance is not prevented.

Specifically, from the viewpoints of preventing generation of streak-shaped unevenness in an image and generation of damage to a head nozzle, the content ratio of carbon black is more preferably from 1.2 to 1.8% by mass, and particularly preferably from 1.3 to 1.7% by mass.

(Resin-coated Cyan Pigment)

The black ink composition of the invention further includes at least one cyan pigment at least a part of the surface of which is coated with a water-insoluble resin (which may be referred to as "resin-coated cyan pigment" hereinbelow). The resin-coated cyan pigment is a particle in which a cyan pigment is partially or entirely coated with a water-insoluble resin, and is included in a dispersed state in the ink composition.

—Cyan Pigment—

Examples of the cyan pigment include C. I. Pigment Blue 1, 2, 3, 15, 15:1, 15:2, 15:3, 15:34, 16, 17:1, 22, 25, 56, and 60, and C.I. Vat Blue 4, 60, and 63.

(Copper) phthalocyanine pigments are preferable, and C.I. Pigment Blue 15:3 is particularly preferable. These pigments may be used singly, or in mixture of two or more thereof at arbitrary proportions.

—Water-insoluble Resin—

Examples of the water-insoluble resin with which the cyan pigment is coated include the above-described examples of the water-insoluble resin with which the carbon black is coated. Specific examples thereof include [1] a polymer containing a repeating unit (a) represented by the above-mentioned Formula (1) and a repeating unit (b) having an ionic group (preferably, a repeating unit having a structural unit derived from an alkyl (meth)acrylate), and [2] a polymer containing a structural unit derived from a salt-forming group-containing monomer (c) and at least one structural unit derived from a styrene macromer (d) and/or a hydrophobic monomer (e), and preferable embodiments thereof are also the same as the preferable embodiments of these polymers described above.

The term "insoluble" as used in this context means that, when a polymer is mixed with an aqueous medium at 25° C., the amount of the polymer dissolved therein is 15% by mass or less with respect to the total polymer mixed in the aqueous medium. From the viewpoints of further improving rubbing resistance and preventing color transfer between media, the amount of the dissolved polymer is preferably 10% by mass or less with respect to the total polymer. The details of the polymers [1] and [2] are described above.

From the viewpoint of dispersion stability, the resin-coated cyan pigment are preferably prepared by coating a cyan pigment with a water-insoluble resin by a phase inversion emulsification method. The phase inversion emulsification method is as described above.

The content ratio of cyan pigment in the black ink composition of the invention is preferably from 1 to 50% by mass with respect to the CB. When the content ratio of cyan pigment is 1% by mass or higher, a color change (yellowing) caused by reduction in the amount of carbon black is compensated, and a desired color and a desired color density are maintained. When the content ratio of cyan pigment is 50% by mass or less, the amount of cyan pigment is not excessively high relative to carbon black, and a desired black hue can be obtained.

Specifically, from such viewpoints, the content ratio of cyan pigment is preferably from 10 to 45% by mass, and further more preferably from 20 to 40% by mass, with respect to the CB.

(Resin-coated Magenta Pigment)

The black ink composition of the invention further includes at least one magenta pigment at least a part of the surface of which is coated with a water-insoluble resin (which may be referred to as "resin-coated magenta pigment" hereinbelow). The resin-coated magenta pigment is a particle in which a magenta pigment is partially or entirely coated with a water-insoluble resin, and is included in a dispersed state in the ink composition.

—Magenta Pigment—

Examples of the magenta pigment include azo pigments, disazo pigments, azo lake pigments, quinacridone pigments, perylene pigments, and anthraquinone pigments.

Specific examples of preferable magenta pigment include C.I. Pigment Red 48, 57, 122, 184, and 188, and C.I. Pigment Violet 19. A quinacridon pigment is preferable, and C.I. Pigment Red 122 and C.I. Pigment Violet 19 are particularly preferable. The pigments may be used singly. Alternatively, a mixture of two or more of the above pigments at arbitrary proportions may be used, or a solid solution of two or more of the above pigments may be used.

—Water-insoluble Resin—

Similarly to the case of the cyan pigment, the specifics and examples of the water-insoluble resin with which the magenta pigment is coated are the same as the above-described specifics and examples of the water-insoluble resin with which the carbon black is coated.

Specific examples thereof include [1] a polymer containing a repeating unit (a) represented by the Formula (1) described above and a repeating unit (b) having an ionic group (preferably a repeating unit derived from an alkyl (meth)acrylate), and [2] a polymer containing a structural unit derived from a salt-forming group-containing monomer (c) and at least one structural unit derived from a styrene macromer (d) and/or a hydrophobic monomer (e), and preferable embodiments thereof are also the same as the preferable embodiments of these polymers described above.

The term "insoluble" as used in this context means that, when a polymer is mixed with an aqueous medium at 25° C., the amount of the polymer dissolved therein is 15% by mass or less with respect to the total polymer mixed in the aqueous medium. From the viewpoints of further improving rubbing resistance and preventing color transfer between media, the amount of the dissolved polymer is preferably 10% by mass or less with respect to the total polymer. The details of the polymers [1] and [2] are as described above.

The resin-coated magenta pigment is preferably a magenta pigment coated with a water-insoluble resin by a phase inversion emulsification method, from the viewpoint of dispersion stability. Details of the phase inversion emulsification method are as described above.

When the black ink composition of the invention contains a resin-coated magenta pigment, the content ratio of resin-coated magenta pigment in the black ink composition is preferably from 1 to 70% by mass with respect to the resin-coated CB. When the content ratio of resin-coated magenta pigment is 1% by mass or higher, a color change (yellowing) caused by reduction in the amount of carbon black is compensated, and a desired color and a desired color density are maintained. In addition, since the amount of carbon black can be reduced, significant effects with respect to prevention of generation of streak-shaped unevenness in an image and prevention of generation of nozzle damage during maintenance are exerted. Furthermore, use of the magenta pigment together with carbon black enables reduction in color visibility, whereby color transfer is effectively prevented. When the content ratio of resin-coated magenta pigment is 70% by mass or less, the amount of magenta pigment is not excessively high relative to carbon black, and a desired black hue can be obtained.

From such viewpoints, the content ratio of resin-coated magenta pigment is more preferably from 20 to 65% by mass from the viewpoint of preventing a color change in black hue when an intermediate tone is to be expressed, and further more preferably from 35 to 60% by mass from the viewpoints of preventing color transfer.

The water-insoluble resin used for the resin-coated CB, the water-insoluble resin used for the resin-coated cyan pigment, and the water-insoluble resin used for the resin-coated magenta pigment may be mutually different polymers which are respectively suitable for the respective pigment structures, or may be the same polymer.

(Resin-coated Yellow Pigment)

In a preferable embodiment, the black ink composition of the invention further includes at least one yellow pigment at least a part of the surface of which is coated with a water-insoluble resin (which may be referred to as "resin-coated yellow pigment" hereinbelow). The resin-coated yellow pigment is a particle in which a yellow pigment is partially or entirely coated with a water-insoluble resin, and is included in a dispersed state in the ink composition.

—Yellow Pigment—

Examples of the yellow pigment include C.I. Pigment Yellow 1, 2, 3, 4, 5, 6, 7, 10, 11, 12, 13, 14, 14C, 16, 17, 24, 34, 35, 37, 42, 53, 55, 65, 73, 74, 75, 81, 83, 93, 95, 97, 98, 100, 101, 104, 108, 109, 110, 114, 117, 120, 128, 129, 138, 150, 151, 153, 154, 155, and 180. The yellow pigment may be used singly, or in mixture of two or more thereof at arbitrary proportions, or in combination of a solid solution of two or more thereof.

—Water-insoluble Resin—

Examples of the water-insoluble resin with which the yellow pigment is coated include the above-described examples of the water-insoluble resin with which the carbon black is coated, similarly to the cases of the cyan pigment and magenta pigment.

Specific examples thereof include [1] a polymer containing a repeating unit (a) represented by the above-described Formula (1) and a repeating unit (b) having an ionic group (preferably a repeating unit having a structural unit derived from an alkyl (meth)acrylate), and [2] a polymer containing a structural unit derived from a salt-forming group-containing monomer (c) and at least one structural unit derived from a styrene macromer (d) and/or a hydrophobic monomer (e), and preferable embodiments thereof are also the same as the preferable embodiments of these polymers described above.

The term "insoluble" as used in this context means that, when a polymer is mixed with an aqueous medium at 25° C., the amount of the polymer dissolved therein is 15% by mass or less with respect to the total polymer mixed in the aqueous medium. From the viewpoints of further improving rubbing resistance and preventing color transfer between media, the amount of the dissolved polymer is preferably 10% by mass or less with respect to the total polymer. The details of the polymers [1] and [2] are described above.

The resin-coated yellow pigment is preferably a yellow pigment coated with a water-insoluble resin by a phase inversion emulsification method, from the viewpoint of dispersion stability. Details of the phase inversion emulsification method are as described above.

When the black ink composition of the invention includes a resin-coated yellow pigment, which is a preferable embodiment of the black ink composition of the invention, the content ratio of resin-coated yellow pigment in the black ink composition is preferably from 1 to 70% by mass with respect to the resin-coated CB. When the content ratio of resin-coated yellow pigment is 1% by mass or higher, a color change (yellowing) caused by reduction in the amount of carbon black is compensated, and a desired color and a desired color density are maintained. In addition, since the amount of carbon black is reduced, significant effects with respect to prevention of generation of streak-shaped unevenness in an image and prevention of generation of nozzle damage during maintenance are exerted. When the content ratio of resin-coated yellow pigment is 70% by mass or less, the amount of yellow pigment is not excessively high relative to carbon black, and a desired black hue can be obtained.

Specifically, from such viewpoints, the content ratio of resin-coated yellow pigment is more preferably from 20 to 65% by mass from the viewpoint of preventing color change in black hue when an intermediate tone is to be expressed, and further more preferably from 35 to 60% by mass from the viewpoints of preventing color transfer.

The water-insoluble resin used for the resin-coated CB, the water-insoluble resin used for the resin-coated cyan pigment, the water-insoluble resin used for the resin-coated magenta pigment and the water-insoluble resin used for the resin-coated yellow pigment may be mutually different polymers that are respectively suitable for the respective pigment structures, or may be the same polymer.

In each of the resin-coated cyan pigment particle, the resin-coated magenta pigment particle, and the resin-coated yellow pigment particle, the ratio of cyan pigment (cy), magenta pigment (mz), or yellow pigment (ye) to water-insoluble resin (r) (i.e., "cy:r", "mz:r", or "ye:r") is preferably from 100:25 by mass to 100:140 by mass, and more preferably from 100:25 by mass to 100:60 by mass. Regarding the ratio (i.e., "cy:r", "mz:r", or "ye:r") by mass, when the proportion of water-insoluble resin is 25 or more relative to 100 parts of pigment, the black ink composition obtained by mixing these pigments has excellent dispersion stability and excellent ejection stability. A proportion of water-insoluble resin of 140 or less relative to 100 parts of pigment is advantageous from the viewpoints of long-term ejection stability, and easiness in removal and/or cleaning of ink adhered to a nozzle member (i.e., excellent maintenance capability).

From the viewpoint of color hue, the ratio (i.e., "cb:(cy+mz+ye)") of the carbon black (cb) to the total amount (i.e., cy+mz+ye) of the cyan pigment (cy), magenta pigment (mz), and yellow pigment (ye), which are included in the black ink composition of the invention, is preferably from 100:40 to 100:90 by mass, more preferably from 100:50 to 100:80 by mass, and preferably further satisfies the following expression.

$$mz \geq cy > ye \text{ (in terms of mass)}$$

In this case, the ratio (i.e., "cy:mz") of the cyan pigment to the magenta pigment is preferably from 100:100 to 100:160 by mass, and more preferably from 100:120 to 100:140 by mass, from the viewpoints of obtaining a desired hue and suppressing variation of the hue.

The total amount (mass) of all pigments (excluding coating resins, the same applies hereinafter) included in the black ink composition of the invention is from 1.8 to 3.5% by mass with respect to the total amount (mass) of the black ink composition. When the total amount of all pigments is less than 1.8% by mass, a desired color density or hue may not be obtained. When the total amount of all pigments exceeds 3.5% by mass, streak-shaped unevenness in an image tends to appear, and generation of damage to a head nozzle portion during maintenance may not be avoided.

Specifically, from the viewpoints of further increasing effects with respect to prevention of generation of streak-shaped unevenness in an image and damage to a nozzle portion, the total amount of all pigments relative to the total amount of the black ink composition is preferably from 2.0 to 3.3% by mass, and more preferably from 2.2 to 3.0% by mass.

(Particles of Water-insoluble Resin)

The black ink composition according to the invention includes at least one type of particle of a water-insoluble resin. Inclusion of the water-insoluble resin particles, in addition to the inclusion of the above-described resins that cover the pigments, improves the fixability of the ink composition to the recording medium and the rubbing resistance of the image. Further, when the treatment liquid described below is used for image formation, the particles aggregate when contacting the treatment liquid or when contacting an area on which the treatment liquid has been applied and dried, as a result of which the viscosity of the ink composition increases; thus, the particles serves to fix the ink composition.

The "water-insoluble resin" refers to a polymer of which the dissolution amount when the polymer is dried at 105° C. for 2 hours and then dissolved in 100 g of water at 25° C. is 10 g or less. The dissolution amount is preferably 5 g or less, and more preferably 1 g or less, from the viewpoint of improving the continuous ejection properties and ejection stability of the ink. The dissolution amount is a dissolution amount when the polymer has been 100% neutralized with either sodium hydroxide or acetic acid depending on the type of salt-forming groups of the water-insoluble polymer.

The water-insoluble resin particles may be particles of a resin of which examples include thermoplastic, thermosetting, or modified, acryl-based, epoxy-based, polyurethane-based, polyether-based, polyamide-based, unsaturated polyester-based, phenol-based, silicone-based, or fluorine-containing resins; polyvinyl-based resins, such as vinyl chloride, vinyl acetate, polyvinyl alcohol, and polyvinyl butyral; polyester-based resins, such as alkyd resins and phthalic acid resins; amino-based materials, such as melamine resins, melamine-formaldehyde resins, aminonalkyd co-condensate resins, and urea resins; and co-polymers or mixtures thereof. Among them, anionic acryl-based resins can be obtained by polymerizing, for example, an acrylic monomer having an anionic group (anionic group-containing acrylic monomer) and, optionally, one or more other monomers that can be copolymerized with the anionic group-containing acrylic monomer in a solvent. Examples of the anionic group-containing acrylic monomer include acrylic monomers having at least one selected from the group consisting of a carboxyl group, a sulfonic acid group, and a phosphonic acid group. Among them, preferable examples of the anionic group-containing acrylic monomer include acrylic monomers having a carboxyl group (for example, acrylic acid, methacrylic acid, crotonic acid, ethacrylic acid, propylacrylic acid, isopropylacrylic acid, itaconic acid, and fumaric acid), and more preferable examples of the anionic group-containing acrylic monomers include acrylic acid and methacrylic acid.

The water-insoluble resin particles are preferably self-dispersing resin particles from the viewpoints of ejection stability and the liquid stability (particularly, dispersion stability) of the system containing the pigment. The self-dispersing resin refers to a water-insoluble polymer that can get into a dispersed state in an aqueous medium due to functional groups (particularly, acidic groups or salts thereof) of the polymer itself, when dispersed by a phase inversion emulsification method in the absence of surfactant.

The term "dispersed state" as used in this context includes an emulsified state (i.e., emulsion) in which the water-insoluble polymer is dispersed in a liquid state in the aqueous medium, and a dispersed state (i.e., suspension) in which the water-insoluble polymer is dispersed in a solid state in the aqueous medium.

From the viewpoint of ink fixing property when the self-dispersing resin is included in the ink composition, the self-dispersing resin is preferably a self-dispersing resin that takes a dispersed state in which the water-insoluble polymer is dispersed in a solid state.

The method of preparing an emulsified or dispersed state of the self-dispersing resin, e.g., an aqueous dispersion of the self-dispersing resin, may be a phase inversion emulsification method. The phase inversion emulsification method may be, for example, a method including: dissolving or dispersing a self-dispersing resin in a solvent (such as a water-soluble organic solvent); thereafter pouring the resultant into water without adding a surfactant; agitating and mixing the resultant in a state in which the salt-forming groups (such as acidic groups) that the self-dispersing resin has are neutralized; and removing the solvent, thereby obtaining an aqueous dispersion in the emulsified or dispersed state.

The following procedure can be used to determine whether a water-insoluble polymer is a self-dispersing resin as mentioned herein: 30 g of a water-insoluble polymer is dissolved in 70 g of an organic solvent (such as methyl ethyl ketone) to form a solution, the solution is mixed with 200 g of water and a neutralizer that can neutralize the salt-forming groups of the water-insoluble polymer to a degree of 100% (the neutralizer being sodium hydroxide if the salt-forming groups are anionic, or acetic acid if the salt-forming groups are cationic), the mixture is stirred (apparatus: an stirring apparatus having a stirring blade, rotation rate: 200 rpm, 30 minutes, 25° C.), and the organic solvent is removed from the mixture liquid. If a stable emulsification or dispersion state of the water-insoluble polymer in the mixture liquid is maintained for at least one week at 25° C. after the removal of the organic solvent from the mixture liquid, and occurrence of precipitation is not confirmed by visual observation for at least one week at 25° C. after the removal of the organic solvent, the water-insoluble polymer is considered to be a self-dispersing resin.

The stability of an emulsification or dispersion state of the self-dispersing resin can be confirmed also by an accelerated test of precipitation using centrifugation. In the accelerated test of precipitation using centrifugation, the stability can be evaluated by, for example, adjusting the aqueous dispersion of polymer particles obtained by the above method to a solids concentration of 25% by mass, performing centrifugation at 12,000 rpm for 1 hour, and measuring the solids concentration of the supernatant after centrifugation.

When the ratio of the solids concentration after centrifugation to the solids concentration before centrifugation is large (i.e., is nearly 1), precipitation of polymer particles due to centrifugation does not occur, that is, the aqueous dispersion of polymer particle is relatively more stable. In the invention, the ratio in solids concentration before and after centrifugation is preferably 0.8 or higher, more preferably 0.9 or higher, and particularly preferably 0.95 or higher.

In the self-dispersing resin, the content of water-soluble components that exhibit water solubility when the self-dispersing resin is made into a dispersed state is preferably 10% by mass or less, more preferably 8% by mass or less, and further more preferably 6% by mass or less. When the content of the water-soluble component is 10% by mass or less, swelling of polymer particles and fusion of polymer particles are effectively suppressed, and relatively more stable dispersed state is maintained; furthermore, an increase in the viscosity of the aqueous ink composition is prevented, and ejection stability is more favorable, for example, in the case of employing the aqueous ink composition in an inkjet method.

The term "water-soluble component" as used herein refers to a compound which is included in the self-dispersing resin, and which dissolves in water when the self-dispersing resin is made into a dispersed state. The water-soluble component is a water-soluble compound which is generated as a by-product or incorporated during the production of the self-dispersing resin.

The main chain of the water-insoluble resin is not particularly limited, and examples thereof include vinyl polymers and condensation polymers (such as epoxy resins, polyester, polyurethane, polyamide, cellulose, polyether, polyurea, polyimide, and polycarbonate). Vinyl polymers are particularly preferable.

Preferable examples of the vinyl polymer and monomers for forming the vinyl polymer include those described in JP-A No. 2001-181549 and JP-A No. 2002-88294. Another example of the vinyl polymer is a vinyl polymer having a dissociative group at a terminal of the polymer chain that has been introduced by radical polymerization of a vinyl monomer using a chain transfer agent, a polymerization initiator, or an iniferter, each of which has a dissociative group (or a substituent that can be derivatized into a dissociative group), or by ion polymerization using a compound having a dissociative group (or a substituent that can be derivatized into a dissociative group) as either an initiator or a terminator.

Preferable examples of the condensation polymer and monomers for forming the condensation polymer include those disclosed in JP-A No. 2001-247787.

The particles of the self-dispersing resin preferably include a water-insoluble polymer that includes a hydrophilic structural unit and a structural unit derived from an aromatic-group-containing monomer or a cyclic-aliphatic-group-containing monomer, from the viewpoint of self-dispersibility.

The hydrophilic structural unit is not particularly limited as long as the hydrophilic structural unit is derived from a monomer containing a hydrophilic group. The self-dispersing resin may include a structural unit derived from only one type of hydrophilic-group-containing monomer, or may include structural units derived from two or more types of hydrophilic-group-containing monomer. The hydrophilic group is not particularly limited, and may be a dissociative group or a nonionic hydrophilic group.

The hydrophilic group is preferably a dissociative group, and more preferably an anionic dissociative group, from the viewpoints of promoting self-dispersion and the stability of the emulsified or dispersed state formed. Examples of the dissociative group include a carboxyl group, a phosphoric acid group, and a sulfonic acid group, and a carboxyl group is particularly preferable from the viewpoints of fixing property of the ink composition obtained.

The hydrophilic-group-containing monomer is preferably a monomer containing a dissociative group, and more preferably a dissociative-group-containing monomer containing a dissociative group and an ethylenic unsaturated bond, from the viewpoints of self-dispersibility and aggregation properties. The dissociative-group-containing monomer may be, for example, an unsaturated carboxylic acid monomer, an unsaturated sulfonic acid monomer, or an unsaturated phosphoric acid monomer.

Examples of the unsaturated carboxylic acid monomer include acrylic acid, methacrylic acid, crotonic acid, itaconic acid, maleic acid, fumaric acid, citraconic acid, and 2-methacryloyloxymethylsuccinic acid.

Specific examples of the unsaturated sulfonic acid monomer include styrenesulfonic acid, 2-acrylamide-2-methylpropanesulfonic acid, 3-sulfopropyl (meth)acrylate, and a bis-(3-sulfopropyl)-itaconate ester.

Specific examples of unsaturated phosphoric acid monomer include vinylphosphonic acid, vinyl phosphate, bis(methacryloxyethyl)phosphate, diphenyl-2-acryloyloxyethyl phosphate, diphenyl-2-methacryloyloxyethyl phosphate, and dibutyl-2-acryloyloxyethyl phosphate.

Among the dissociative group-containing monomers, unsaturated carboxylic acid monomers are preferable from the viewpoints of dispersion stability and ejection stability, and acrylic monomers are more preferable, and acrylic acid and methacrylic acid are particularly preferable.

The particles of the self-dispersing resin preferably include a polymer having a carboxyl group, and more preferably include a polymer having a carboxyl group and an acid value of from 25 to 100 mgKOH/g, from the viewpoints of self-dispersibility and the aggregation speed when contacting the treatment liquid during image formation using the treatment liquid. The acid value is more preferably from 30 to 90 mgKOH/g, and particularly preferably from 35 to 65 mgKOH/g, from the viewpoints of self-dispersibility and the aggregation speed when contacting the treatment liquid. When the acid value is 25 mgKOH/g or higher, the stability of self-dispersing properties is improved. When the acid value is 100 mgKOH/g or lower, aggregation properties are improved.

The aromatic-group-containing monomer is not particularly limited as long as the monomer is a compound having an aromatic group and a polymerizable group. The aromatic group may be derived from an aromatic hydrocarbon or derived from an aromatic heterocycle. In the invention, the aromatic group is preferably an aromatic group derived from an aromatic hydrocarbon from the viewpoint of particle shape stability in an aqueous medium.

The polymerizable group may be a condensation-polymerizable group or an addition-polymerizable group. In the invention, from the viewpoint of particle shape stability in an aqueous medium, an addition-polymerizable group is preferable, and a group containing an ethylenically unsaturated bond is more preferable.

The aromatic-group-containing monomer in the invention is preferably a monomer having an ethylenic unsaturated bond and an aromatic group derived from an aromatic hydrocarbon. The aromatic-group-containing monomer may be used singly, or in combination of two or more thereof.

Examples of the aromatic-group-containing monomer include phenoxyethyl(meth)acrylate, benzyl (meth)acrylate, phenyl (meth)acrylate, and styrene-containing monomers. Aromatic-group-containing (meth)acrylate monomers are preferable, at least one selected from phenoxyethyl(meth)acrylate, benzyl (meth)acrylate, or phenyl (meth)acrylate is more preferable, and phenoxyethyl (meth)acrylate, or benzyl (meth)acrylate is still more preferable, from the viewpoints of the hydrophilicity/hydrophobicity balance of the polymer chain and ink fixability.

The term "(meth)acrylate" as used herein refers to acrylate or methacrylate.

The cyclic-aliphatic-group-containing monomer is preferably a monomer having an ethylenic unsaturated bond and a cyclic aliphatic group derived from a cyclic aliphatic hydrocarbon, and more preferably a cyclic-aliphatic-group-containing (meth)acrylate monomer (hereinafter sometimes referred to as "alicyclic (meth)acrylate").

The alicyclic (meth)acrylate refers to a compound which contains a structural moiety derived from (meth)acrylic acid and a structural moiety derived from an alcohol, in which the structural moiety derived from an alcohol has a structure containing at least one substituted or unsubstituted alicyclic hydrocarbon group (i.e., cyclic aliphatic group). The alicyclic hydrocarbon group may be a structural moiety derived from an alcohol itself, or may be bound to the structural moiety derived from a hydroxyl group of an alcohol via a linking group.

The alicyclic hydrocarbon group may be, without particular limitation, any alicyclic hydrocarbon group that contains a cyclic non-aromatic hydrocarbon group, and examples thereof include a monocyclic hydrocarbon group, a bicyclic hydrocarbon group and a polycyclic hydrocarbon group that is tri- or higher-cyclic. Examples of the alicyclic hydrocarbon group include: a cycloalkyl group such as a cyclopentyl group or a cyclohexyl group; a cycloalkenyl group; a bicyclohexyl group; a norbornyl group; an isobornyl group; a dicyclopentanyl group; a dicyclopentenyl group; an adamantyl group; a decahydronaphthalenyl group; a perhydrofluorenyl group; a tricycle $[5.2.1.0^{2,6}]$decanyl group; and bicyclo[4.3.0] nonane.

The alicyclic hydrocarbon group may itself have a substituent. Examples of the substituent include an alkyl group, an alkenyl group, an aryl group, an aralkyl group, an alkoxy group, a hydroxyl group, a primary amino group, a secondary amino group, a tertiary amino group, an alkylcarbonyl group, an arylcarbonyl group, and a cyano group. The alicyclic hydrocarbon group may form a condensed ring.

The alicyclic hydrocarbon group used in the invention preferably has an alicyclic hydrocarbon moiety having from 5 to 20 carbon atoms from the viewpoints of viscosity and solubility.

Specific examples of alicyclic (meth)acrylates are described below, but the invention is not limited thereto.

Examples of alicyclic (meth)acrylates that are monocyclic include cycloalkyl(meth)acrylates containing a cycloalkyl group having from 3 to 10 carbon atoms, such as cyclopropyl (meth)acrylate, cyclobutyl (meth)acrylate, cyclopentyl (meth)acrylate, cyclohexyl (meth)acrylate, cycloheptyl (meth)acrylate, cyclooctyl (meth)acrylate, cyclononyl (meth)acrylate, and cyclodecyl (meth)acrylate.

Examples of alicyclic (meth)acrylates that are bicyclic include isobornyl (meth)acrylate and norbornyl (meth)acrylate.

Examples of alicyclic (meth)acrylates that are tricyclic include adamanthyl (meth)acrylate, dicyclopentanyl (meth)acrylate, and dicyclopentenyloxyethyl (meth)acrylate.

These alicyclic (meth)acrylates may be used singly, or in combination of two or more thereof.

From among the above, the alicyclic (meth)acrylate is preferably at least one selected from a bicyclic (meth)acrylate or a polycyclic (meth)acrylate that is tri- or higher-cyclic, and more preferably at least one of isobornyl (meth)acrylate, adamantyl (meth)acrylate, or dicyclopentanyl (meth)acrylate, from the viewpoints of the dispersion stability of the self-dispersing resin particles, fixability, and blocking resistance.

The self-dispersing resin is preferably an acrylic resin including a structural unit derived from a (meth)acrylate monomer, and more preferably an acrylic resin including a structural unit derived from an aromatic-group-containing (meth)acrylate monomer or an alicyclic (meth)acrylate. The self-dispersing resin still more preferably includes a structural unit derived from an aromatic-group-containing (meth)acrylate monomer or an alicyclic (meth)acrylate, at a content of from 10% by mass to 95% by mass with respect to the entire mass of the resin. When the content of the structural unit derived from an aromatic-group-containing (meth)acrylate monomer or an alicyclic (meth)acrylate is from 10% by mass to 95% by mass with respect to the entire mass of the resin, the stability of the self-emulsification or the dispersed state is improved, and an increase in the ink viscosity can be further suppressed.

From the viewpoints of stability of self-dispersed state, stabilization of a particle shape in an aqueous medium due to hydrophobic interaction between aromatic rings, and reduction in the amount of water-soluble components through hydrophobization of the particles to an appropriate degree, the content of a structural unit derived from an aromatic-group-containing (meth)acrylate monomer or an alicyclic (meth)acrylate is more preferably from 15 to 90% by mass, further more preferably from 15 to 80% by mass, and particularly preferably from 25 to 70% by mass.

The self-dispersing resin may include a structural unit derived from an aromatic-group-containing monomer or a cyclic-aliphatic-group-containing monomer (preferably, an alicyclic (meth)acrylate), and a structural unit derived from a dissociative-group-containing monomer. The self-dispersing resin may further include at least one other structural unit (additional structural unit), as necessary.

The monomer for forming the additional structural unit is not particularly limited as long as the monomer is copolymerizable with the aromatic-group-containing monomer and the dissociative-group-containing monomer. In particular, the monomer is preferably an alkyl-group-containing monomer from the viewpoints of the flexibility of the polymer skeleton and the ease of the control of the glass transition temperature (Tg) of the polymer.

Examples of the alkyl-group-containing monomer include (meth)acrylate monomers including alkyl (meth)acrylates such as methyl (meth)acrylate, ethyl (meth)acrylate, isopropyl (meth)acrylate, n-propyl (meth)acrylate, n-butyl (meth)acrylate, isobutyl (meth)acrylate, t-butyl (meth)acrylate, hexyl (meth)acrylate, and ethylhexyl (meth)acrylate; ethylenically unsaturated monomers having a hydroxyl group, such as hydroxymethyl (meth)acrylate, 2-hydroxyethyl (meth)acrylate, 2-hydroxypropyl (meth)acrylate, 4-hydroxybutyl (meth)acrylate, hydroxypentyl (meth)acrylate, and hydroxyhexyl (meth)acrylate; and dialkylamino alkyl (meth)acrylates such as dimethylaminoethyl (meth)acrylate; and (meth)acrylamide monomers including N-hydoxyalkyl (meth)acrylamides such as N-hydroxymethyl (meth)acrylamide, N-hydroxyethyl (meth)acrylamide, and N-hydroxybutyl (meth)acrylamide; and N-alkoxyalkyl (meth)acrylamides such as N-methoxymethyl (meth)acrylamide, N-ethoxymethyl (meth)acrylamide, N-n-butoxymethyl (meth)acrylamide, N-isobutoxymethyl (meth)acrylamide, N-methoxyethyl (meth)acrylamide, N-ethoxyethyl (meth)acrylamide, N-n-butoxyethyl (meth)acrylamide, and N-isobutoxyethyl (meth)acrylamide.

The molecular weight of the water-insoluble polymer that forms the self-dispersing resin particles, in terms of weight average molecular weight, is preferably from 3,000 to 200,000, and more preferably from 5,000 to 150,000, and still more preferably from 10,000 to 100,000. A weight average molecular weight of 3,000 or more effectively reduces the amount of water-soluble components. A weight average molecular weight of 200,000 or less enhances the stability of self-dispersed state.

The weight average molecular weight is measured by gel permeation chromatography (GPC). Details of GPC are as described above.

The water-insoluble polymer that forms the self-dispersing resin particles preferably includes a structural unit derived from an aromatic-group-containing (meth)acrylate monomer (preferably a structural unit derived from phenoxyethyl (meth)acrylate and/or a structural unit derived from benzyl (meth)acrylate) or a structural unit derived from a cyclic-aliphatic-group-containing monomer (preferably an alicyclic (meth)acrylate), at a copolymerization ratio of from 15 to 80% by mass relative to the entire mass of the water-insoluble polymer, from the viewpoint of hydrophilicity/hydrophobicity control of the polymer.

From the viewpoint of controlling the hydrophobicity of the polymer, it is preferable that the water-insoluble polymer contains a structural unit derived from an aromatic group-containing (meth)acrylate monomer or an alicyclic (meth)acrylate, at a copolymerization ratio of from 15 to 80% by mass, a structural unit derived from a carboxyl group-containing monomer, and a structural unit derived from an alkyl group-containing monomer (preferably a structural unit derived from an alkyl ester of (meth)acrylic acid). It is more preferable that the water-insoluble polymer contains a structural unit derived from phenoxyethyl (meth)acrylate and/or a structural unit derived from benzyl (meth)acrylate, and/or a structural unit derived from isobornyl (meth)acrylate and/or a structural unit derived from adamanthyl (meth)acrylate and/or a structural unit derived from dicyclopentanyl (meth)acrylate, at a copolymerization ratio of from 15 to 80% by mass; a structural unit derived from a carboxyl group-containing monomer; and a structural unit derived from an alkyl group-containing monomer (preferably a structural unit derived from a C1-C4 alkyl ester of (meth)acrylic acid). Further, the water-insoluble polymer preferably has an acid value of from 25 mgKOH/g to 100 mgKOH/g and a weight average molecular weight of from 3,000 to 200,000, and more preferably has an acid value of from 30 mgKOH/g to 90 mgKOH/g and a weight average molecular weight of from 5,000 to 150,000.

Specific examples of the water-insoluble resin for forming the water-insoluble resin particles are described below. However, the water-insoluble resin for forming the water-insoluble resin particles in the invention is not limited thereto. The ratios in the parentheses represent mass ratios between copolymerization components.

B-01: Phenoxyethyl acrylate/methyl methacrylate/acrylic acid copolymer (50/45/5)

B-02: Phenoxyethyl acrylate/benzyl methacrylate/isobutyl methacrylate/methacrylic acid copolymer (30/35/29/6)

B-03: Phenoxyethyl methacrylate/isobutyl methacrylate/methacrylic acid copolymer (50/44/6)

B-04: Phenoxyethyl acrylate/methyl methacrylate/ethyl acrylate/acrylic acid copolymer (30/55/10/5)

B-05: Benzyl methacrylate/isobutyl methacrylate/methacrylic acid copolymer (35/59/6)

B-06: Styrene/phenoxyethyl acrylate/methyl methacrylate/acrylic acid copolymer (10/50/35/5)

B-07: Benzyl acrylate/methyl methacrylate/acrylic acid copolymer (55/40/5)

B-08: Phenoxyethyl methacrylate/benzyl acrylate/methacrylic acid copolymer (45/47/8)

B-09: Styrene/Phenoxyethyl acrylate/butyl methacrylate/acrylic acid copolymer (5/48/40/7)

B-10: Benzyl methacrylate/isobutyl methacrylate/cyclohexyl methacrylate/methacrylic acid (35/30/30/5)

B-11: Phenoxyethyl acrylate/methyl methacrylate/butyl acrylate/methacrylic acid copolymer (12/50/30/8)

B-12: Benzyl acrylate/isobutyl methacrylate/acrylic acid copolymer (93/2/5)

B-13: Styrene/phenoxyethyl methacrylate/butyl acrylate/acrylic acid copolymer (50/5/20/25)

B-14: Styrene/butyl acrylate/acrylic acid copolymer (62/35/3)

B-15: Methyl methacrylate/phenoxyethyl acrylate/acrylic acid copolymer (45/51/4)

B-16: Methyl methacrylate/phenoxyethyl acrylate/acrylic acid copolymer (45/49/6)

B-17: Methyl methacrylate/phenoxyethyl acrylate/acrylic acid copolymer (45/48/7)

B-18: Methyl methacrylate/phenoxyethyl acrylate/acrylic acid copolymer (45/47/8)

B-19: Methyl methacrylate/phenoxyethyl acrylate/acrylic acid copolymer (45/45/10)

B-21: Methyl methacrylate/isobornyl methacrylate/methacrylic acid copolymer (20/72/8, glass transition temperature: 180° C., I/O value: 0.44)

B-22: Methyl methacrylate/isobornyl methacrylate/methacrylic acid copolymer (40/52/8, glass transition temperature: 160° C., I/O value: 0.50)

B-23: Methyl methacrylate/isobornyl methacrylate/dicyclopentanyl methacrylate/methacrylic acid copolymer (20/62/10/8, glass transition temperature: 170° C., I/O value: 0.44)

B-24: Methyl methacrylate/dicyclopentanyl methacrylate/methacrylic acid copolymer (20/72/8, glass transition temperature: 160° C., I/O value: 0.47)

The particles of the water-insoluble resin are preferably particles of a styrene-acrylic resin, urethane resin, or a mixture thereof.

Examples of the styrene-acrylic resin include the acrylic resins which contains styrene as a copolymerization component, and which are described above in the explanation of the self-dispersing resin particles, and preferable embodiments thereof are also the same as in the explanation of the self-dispersing resin particles. Specific examples thereof include, but are not limited to, compounds B-06, B-09, B-13, and B-14 shown above.

The water-insoluble resin particles in the invention are preferably the urethane resin particles, from the viewpoint of improving continuous ejection property and ejection stability of the ink composition. Since urethane resins are less vulnerable to deterioration by photolysis than acrylic polymers, an image formed using an ink composition containing a urethane resin has excellent light fastness.

The urethane resin particle is preferably a particle containing at least one urethane resin selected from the urethane resins represented by UP-1 to UP-4 shown below.

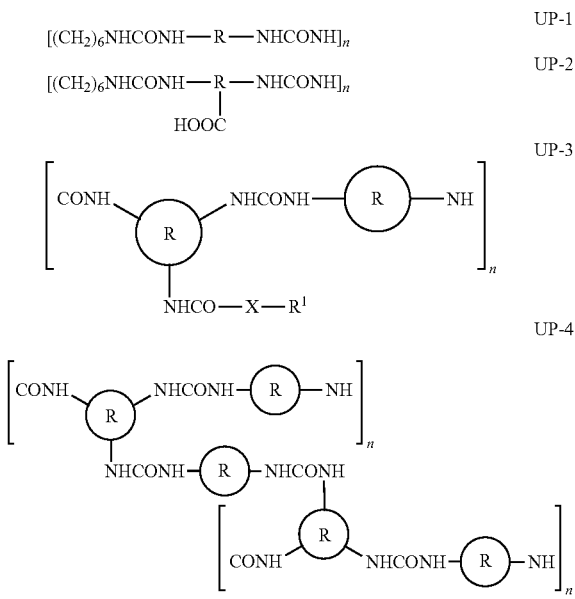

In UP-1 to UP-4, R represents an aliphatic group or an aromatic group. $R^1$ represents $-(CH_2)_m-COOH$ or $-(CH_2CH_2O)_p-CH_3$; m represents an integer of from 1 to 10, p represents an integer of from 1 to 100, X represents NH or O, and n represents a positive integer.

Each of the urethane resins represented by UP-1 to UP-4 preferably includes a crosslink bond in the resin. The presence of a crosslink bond improves the stability of the urethane resin particles against shearing. Each of the urethane resins represented by UP-1 to UP-4 preferably includes an acidic group from the viewpoint of improving the stability of the urethane resin particles.

Methods for producing the urethane resins represented by UP-1 to UP-4 and preferable embodiments of the urethane resins are not particularly limited, and a preferable exemplary method is the production method described in JP-A No. 2006-241457. Specifically, the production method described in JP-A No. 2006-141457 includes preparing an emulsion containing an isocyanate compound and an anionic surfactant, adding a bifunctional, trifunctional, or polyfunctional reactive agent to the emulsion, and agitating the emulsion to generate a urethane resin.

From the viewpoint of aggregation speed, it is preferable that the water-insoluble resin includes a polymer that has been synthesized in an organic solvent, that the polymer has a carboxyl group, that some or all of the carboxyl groups of the polymer (which has an acid value of preferably from 25 to 100, more preferably from 30 to 90, and still more preferably from 35 to 65) have been neutralized, and that the polymer is prepared in the form of a polymer dispersion of which the continuous phase is water. In other words, the preparation of the water-insoluble resin particles preferably includes a process of synthesizing a polymer in an organic solvent, and a dispersing process of forming an aqueous dispersion of the polymer of which some or all of the carboxyl groups thereof have been neutralized.

The dispersing process preferably includes the following sub-processes (1) and (2).

Sub-process (1): a process of agitating a mixture containing the polymer (water-insoluble polymer), an organic solvent, a neutralizer, and an aqueous medium.

Sub-process (2): a process of removing the organic solvent from the mixture.

The sub-process (1) is preferably treatment in which the polymer (water-insoluble polymer) is dissolved in the organic solvent, and then the neutralizer and the aqueous medium are gradually added thereto, and mixed and agitated to form a dispersion. When a neutralizer and an aqueous medium are added to a water-insoluble polymer solution in which a water-insoluble polymer is dissolved in an organic solvent as in the above sub-process, self-dispersing resin particles of which the diameter is highly stable during storage can be obtained without requiring a strong shearing force. The method of agitating the mixture is not particularly limited, and a generally-used mixing and agitation apparatus, and/or a disperser such as an ultrasonic disperser or a high-pressure homogenizer, may be used, as necessary.

Preferable examples of the organic solvent include alcohol solvents, ketone solvents, and ether solvents. Examples of alcohol solvents include isopropyl alcohol, n-butanol, t-butanol, and ethanol. Examples of ketone solvents include acetone, methyl ethyl ketone, diethyl ketone, and methyl isobutyl ketone. Examples of ether solvents include dibutyl ether and dioxane. Among the above solvents, ketone solvents such as methyl ethyl ketone and alcohol solvents such as isopropyl alcohol are preferable. It is also preferable to use isopropyl alcohol and methyl ethyl ketone in combination, in order to make milder the polarity change from an oil phase to an aqueous phase at the time of phase inversion. Combined use of the solvents makes it possible to obtain self-dispersing resin particles having a very small particle diameter that are free from aggregation precipitation or adhesion between the particles and that have high dispersion stability. This is thought to be caused by milder polarity change at the time of phase inversion from the oil phase to the aqueous phase.

The neutralizer is used to neutralize some or all of the dissociative groups of the polymer so as to allow the polymer to get into a stable emulsion or dispersion state in water. When the water-insoluble resin particles have anionic dissociative groups (such as carboxyl groups) as dissociative groups, the neutralizer to be used may be a basic compound such as an organic amine compound, ammonia, or an alkali metal hydroxide. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethyl-ethanolamine, 2-dimethylamino-2-methyl-1- propanol, 2-amino-2-methyl-1-propanol, N-methyldiethanolamine, N-ethyldiethanolamine, monoisopropanolamine, diisopropanolamine, and triisopropanolamine. Examples of the alkali metal hydroxide include lithium hydroxide, sodium hydroxide, and potassium hydroxide. Among them, sodium hydroxide, potassium hydroxide, triethylamine, and triethanolamine are preferable from the viewpoint of stabilization of the dispersion of the self-dispersing resin particles according to the invention in water.

The amount of the basic compound to be used is preferably from 5 to 120% by mol, more preferably from 10 to 110% by mol, and still more preferably from 15 to 100% by mol, with respect to 100% by mol of the dissociative group. When the amount of the basic compound is 5% by mol or more, an effect of stabilizing the dispersion of the particles in water can be exerted. When the amount of basic compound is 120% by mol or less, an effect of reducing water-soluble components can be exerted.

In the sub-process (2), the organic solvent is removed from the dispersion obtained through the sub-process (1), by a common method such as distillation under reduced pressure, whereby phase inversion into an aqueous system occurs and an aqueous dispersion of the self-dispersing resin particles is obtained. The organic solvent has substantially been removed from the obtained aqueous dispersion, and the amount of residual organic solvent is preferably 0.2% by mass or less, and more preferably 0.1% by mass or less.

The average particle diameter of the self-dispersing resin particles in terms of volume average particle diameter is preferably in the range of from 10 to 400 nm, more preferably from 10 to 200 nm, and still more preferably from 10 nm to 100 nm. When the volume average particle diameter is 10 nm or more, suitability for production is improved. When the average particle diameter is 400 nm or less, storage stability is improved.

The particle size distribution of the self-dispersing resin particles is not particularly limited, and may be wide or monodispersed. In an embodiment, a mixture of two or more types of water-insoluble particles is used.

The average particle diameter and particle size distribution of the self-dispersing resin particles is obtained by measuring a volume average particle diameter thereof by a dynamic light scattering method using a Nanotrac particle size distribution analyzer UPA-EX150 (trade name, manufactured by Nikkiso Co., Ltd.).

The glass transition temperature (Tg) of the water-insoluble resin particles is preferably 100° C. or higher, and more preferably 130° C. or higher, from the viewpoints of maintenance durability and ejection property after maintenance. The upper limit of Tg is not particularly limited, but is preferably 190° C.

In a preferable embodiment, the black ink composition includes the water-insoluble resin particles in an amount larger than the total amount (mass) of all coated pigments (including the mass of coating resins, the same applies hereinafter) included in the ink composition. Since the amount of resin particles is large relative to the amount of coated pigments, and the relative amounts of the pigments, including carbon black, in the black ink composition (in the solids content of the black ink composition) are reduced, an image with suppressed streak-shaped unevenness is easily obtained, and generation of damage to a nozzle surface during maintenance is mitigated.

In particular, the ratio of the content of water-insoluble resin particles relative to the total amount of coated pigments (i.e., amount of water-insoluble resin particles/total amount of coated pigments (including the amount of coating resins)) is preferably in the range of from 1.0 to 5.0, and more preferably in the range of from 1.2 to 4.0.

The content of the water-insoluble resin particles in the black ink composition is preferably from 0.5 to 10% by mass, more preferably from 1 to 9% by mass, and further more preferably from 3 to 9% by mass, with respect to the total amount (mass) of the black ink composition. When the content of water-insoluble resin particles is 0.5% by mass or higher, the amounts of pigments are relatively low, whereby an image in which generation of streak-shaped unevenness is suppressed may easily be formed, and damage during maintenance is effectively suppressed. A content of water-insoluble resin particles of 10% by mass or less is advantageous from the viewpoint of long-term ejection stability.

(Solid Humectant)

The black ink composition of the invention preferably further contains at least one solid humectant. The humectant refers to a water-soluble compound which is solid at 25° C. and has water retention ability.

Examples of the solid humectant include urea, urea derivatives, pyrrolidone derivatives, alkyl glycines or glycylbetaines represented by Formula 1 shown below, and sugars. The solid humectant may be used singly, or in combination of two or more thereof.

Examples of urea derivatives include compounds obtained by substituting a hydrogen atom on at least one nitrogen atom of urea with at least one alkyl group or alkanol, thiourea, and compounds obtained by substituting at least one hydrogen atom on at least one nitrogen atom of thiourea with at least one alkyl group or alkanol. Specific examples thereof include N-methylurea, N,N-dimethylurea, thiourea, ethylene urea, hydroxyethyl urea, hydroxybutyl urea, ethylene thiourea, and diethyl thiourea.

Examples of pyrrolidone derivatives include compounds obtained by substituting the hydrogen atom on the nitrogen atom of pyrrolidone with an alkyl group or an alkanol. Specific examples thereof include 2-methylpyrrolidone, N-methylpyrrolidone, N-octylpyrrolidone, N-laurylpyrrolidone, and β-hydroxyethylpyrrolidone.

Examples of alkyl glycines include compounds represented by Formula 1 shown below. In Formula 1, $R_1$ and $R_2$ each independently represent a linear or branched alkyl group having from 1 to 5 carbon atoms, and M represents a hydrogen atom, an alkali metal atom, or an alkaline earth metal atom.

$$R_1R_2NCH_2COOM \qquad \text{Formula 1}$$

Examples of alkyl glycines include N-methylglycine, N,N-dimethylglycine, N,N,N-trimethylglycine, N-ethyl-N-methylglycine, N,N-diethylglycine, N-isopropyl-N-methylglycine, N-isopropyl-N-ethylglycine, N,N-diisopropylglycine, N,N-dibutylglycine, N-butyl-N-methylglycine, and N-butyl-N-ethylglycine. Of these, N,N,N-trimethylglycine is preferable from the viewpoints of achieving less foaming of the ink, high ejection stability, and excellent maintenance performance.

Examples of sugars include monosaccharides, disaccharides, oligosaccharides (including trisaccharides and tetrasaccharides), and polysaccharides. Specific examples thereof include glucose, mannose, fructose, ribose, xylose, arabinose, galactose, aldonic acid, glucitol (sorbitol), maltose, cellobiose, lactose, sucrose, trehalose, and maltotriose.

Herein, polysaccharides refer to sugars in a broad sense, and include various substances present in the nature, such as alginic acid, α-cyclodextrine, and cellulose.

Examples of derivatives of sugars include reducing sugars (such as sugar alcohols) and oxidized sugars (such as aldonic acid, uronic acid, amino acid, or thiosugar) of the above-mentioned sugars. Sugar alcohols are particularly preferably, and, among them, maltitol, sorbitol, and xylitol are preferable Examples of sugar derivatives further include hyaluronic acid and hyaluronic acid salt, and a commercially-available sodium hyaluronate 1% aqueous solution (molecular weight=350,000) may be used as a hyaluronic acid salt.

Since the urea, the urea derivatives, the pyrrolidone derivatives, and the sugars have high hydrogen bonding ability, these substances exert excellent effects in terms of prevention of drying of an ink; further use of these substances enable easy cleaning and removal even when an ink containing particles of a highly hydrophobic polymer, such as a water-insoluble resin, is tightly adhered to a nozzle. The reason thereof is not clear, it is presumed that a salt-forming group included in the water-insoluble resin and the solid humectant interact with each other through hydrogen bonding, as a result of which the tightly adhered ink becomes easily re-dispersible. Furthermore, it is presumed that the hydrogen bonding interaction between a salt-forming group included in the water-insoluble resin and the solid humectant contributes to the prevention of foaming of an ink.

Similarly, use of an alkyl glycine or glycylbetaine represented by Formula 1 enables easy cleaning and removal even when an ink containing particles of a highly hydrophobic polymer, such as a water-insoluble resin in the invention, is tightly adhered onto a nozzle. It is presumed that salting out occurs during the processes of drying and concentration of an ink, which leads to aggregation of water-insoluble polymer particles, as a result of which the water-insoluble polymer tightly adheres onto a nozzle member. It is presumed that use of the alkyl glycine or the glycylbetaine suppresses the tight adhesion of the water-insoluble polymer onto a nozzle member, by interfering with the above process.

From the viewpoints of a high moisture retention ability and easiness in removal of ink residues, it is preferable to use at least one selected from the group consisting of urea, a urea derivative, an alkyl glycine or glycylbetaine represented by Formula 1, maltitol, sorbitol, and xylitol, and it is more preferable to use at least one selected from the group consisting of urea and a urea derivative.

In particular, since urea and urea derivatives have high hydrotropic properties, they work as an aid that improves the cleaning property (i.e., re-dispersibility) of a water-insoluble resin. Therefore, urea and urea derivatives are preferably used.

The content of solid humectant in the black ink composition is preferably from 5 to 30% by mass, more preferably from 5 to 20% by mass, and particularly preferably from 5 to 10% by mass, with respect to the total mass of the ink composition from the viewpoint of removability (cleaning property) of ink residues.

In the black ink composition, the ratio of the content of solid humectant to the total amount of water-insoluble resin and all pigments (i.e., mass of solid humectant/total mass of water-insoluble resin and pigments) is preferably 0.01 or higher, more preferably in the range of from 0.1 to 3.0, and most preferably in the range of from 0.5 to 2.0.

(Water)

The ink composition according to the invention may include water. The content of water is not particularly limited, and is preferably from 10 to 99% by mass, more preferably from 30 to 80% by mass, and still more preferably from 50 to 70% by mass.

(Other Components)

In addition to the above components, the ink composition according to the invention may further include other components, such as additives, as necessary. Examples of other components include known additives such as anti-fading agents, emulsion stabilizers, penetration promoters, ultraviolet absorbers, preservatives, antifungal agents, pH adjusters, surface tension adjusters, defoaming agents, viscosity adjustment agents, dispersants, dispersion stabilizers, anti-rust agents, and chelating agents. These various additives may be directly added after the preparation of the ink composition, or may be added during the preparation of the ink composition. Specific examples of the additives include the additives described as other additives in paragraphs [0153] to [0162] of JP-A No. 2007-100071.

Examples of surface tension adjusters include nonionic surfactants, cationic surfactants, anionic surfactants, and betaine surfactants. The content of surface tension adjuster is preferably a content that adjusts the surface tension of the ink composition to be from 20 to 60 mN/m, more preferably from 20 to 45 mN/m, and still more preferably from 25 mN/m to 40 mN/m, in order to achieve favorable droplet ejection by an inkjet method. The surface tension of the ink composition can be measured at 25° C. using, for example, a plate method.

In regard to specific examples of surfactants, preferable hydrocarbon surfactants include: anionic surfactants such as fatty acid salts, alkyl sulfate ester salts, alkyl benzenesulfonates, alkyl naphthalenesulfonates, dialkyl sulfosuccinates, alkyl phosphate ester salts, naphthalenesulfonic acid-formalin condensates, and polyoxyethylene alkyl sulfate ester salts; and nonionic surfactants such as polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkylamines, glycerin fatty acid esters, and oxyethylene-oxypropylene block copolymers. Further, SURFYNOLS (trade name, manufactured by Air Products and Chemicals, Inc.) and OLFINE E1010 (trade name, manufactured by Nisshin Chemical Industry Co., Ltd.), which are acetylene polyoxyethylene oxide surfactants, are preferably used. Moreover, amine oxide amphoteric surfactants such as N,N-dimethyl-N-alkylamine oxide are also preferable. Further, surfactants described in pages 37 to 38 of JP-A No. 59-157636, and Research Disclosure No. 308119 (1989) are also usable. Use of fluorine (fluorinated alkyl) surfactants or silicone surfactants, such as those described in JP-A Nos. 2003-322926, 2004-325707, and 2004-309806, improves rubbing resistance.

The surface tension adjuster may be used as an anti-foamer, and may be a fluorine-containing compound, a silicone compound, or a chelate agent of which a representative example is EDTA.

When an ink is applied by an inkjet method, from the viewpoint of ink droplet ejection stability and coagulation speed, the viscosity of the black ink composition according to the invention is preferably in the range of from 1 to 30 mPa·s, more preferably in the range of from 1 to 20 mPa·s, still more preferably in the range of from 2 to 15 mPa·s, and particularly preferably in the range of from 2 to 10 mPa·s. The viscosity of the ink composition can be measured at 20° C. using, for example, a Brookfield viscometer.

It is preferable that the black ink composition of the invention has a pH of from 7.5 to 10 from the viewpoints of ink stability and aggregation speed. The pH is measured at 25° C. using a generally-used pH analyzer.

In the image forming method according to the invention, image formation is preferably carried out using an ink set that includes the ink composition (and, optionally, ink compositions having other colors, as necessary) and a treatment liquid capable of causing formation of an aggregate when contacting the ink composition. The ink set according to the invention can be used in the form of an ink cartridge that integrally accommodates the ink composition(s) and treatment liquid(s) or ink cartridges that independently accommodate the ink composition(s) and treatment liquid(s). The use of the ink cartridge is preferable from the viewpoint of, for example, convenience in handling. Ink cartridges configured to contain an ink set are known in the relevant technical field, and ink cartridge can be prepared by appropriately using known methods.

<Ink Set>

The ink set of the invention includes the black ink composition of the invention, and a treatment liquid containing an aggregation component capable of causing formation of an aggregate when contacting the treatment liquid. Since the ink set of the invention includes the black ink composition described above, a black image or an image of intermediate tone (for example, gray) with less yellow tinge is obtained, the generation of streak-shaped unevenness and hue unevenness is suppressed, and the generation of damage to a head nozzle during maintenance is prevented even when he image is formed, for example, in a single-pass manner at a high speed; as a result, a high-quality achromatic image that does not exhibit a substantial color change for a long period of time is obtained.

Details of the ink composition are as described above.

The treatment liquid used in the invention is an aqueous composition capable of causing formation of an aggregate when contacting the black ink composition. Specifically, the treatment liquid includes at least an aggregation component which, when mixed with the black ink composition, can aggregate dispersed particles such as coloring particles (such as pigment particles and water-insoluble resin particles) included in the black ink composition, thereby forming an aggregate. The treatment liquid may further include other components, if necessary. By using the treatment liquid together with the ink composition, image formation by an inkjet method is carried out at a high speed, generation of streak-shaped unevenness or the like is suppressed, and an image with a high resolution is obtained even when high-speed image formation is carried out.

The treatment liquid includes at least one aggregation component capable of forming an aggregate when contacting the ink composition. As a result of the treatment liquid mixing with the ink composition ejected by an inkjet method, the aggregation of pigment and the like which have been stably dispersed in the ink composition is promoted.

Examples of the treatment liquid include a liquid composition capable of forming an aggregate by changing the pH of the ink composition. Here, the pH (25° C.) of the treatment liquid is preferably from 1 to 6, more preferably from 1.2 to 5, and still more preferably from 1.5 to 4, from the viewpoint of the coagulation speed of the ink composition. In this case, the pH (25° C.) of the ink composition used in the ink application process is preferably from 7.5 to 9.5 (more preferably from 8.0 to 9.0).

In particular, it is preferable that the ink composition has a pH of 7.5 or more at 25° C., and that the treatment liquid has a pH of from 3 to 5 at 25° C., from the viewpoints of improvement of image density and resolution, and achievement of high-speed inkjet recording.

The aggregation component may be used singly, or in combination of two or more thereof.

The treatment liquid may be configured to include at least one acidic compound as an aggregation component. Examples of the acidic compound include a compound having a phosphoric acid group, a phosphonic acid group, a phosphinic acid group, a sulfuric acid group, a sulfonic acid group, a sulfinic acid group, or a carboxyl group, or a salt thereof (for example, a polyvalent metal salt). Among them, a compound having a phosphoric acid group or a carboxyl group is preferable, and a compound having a carboxyl group is more preferable, from the viewpoint of the coagulation speed of the ink composition.

The compound having a carboxyl group is preferably selected from polyacrylic acid, acetic acid, glycolic acid, malonic acid, malic acid, maleic acid, ascorbic acid, succinic acid, glutaric acid, fumaric acid, citric acid, tartaric acid, lactic acid, pyrrolidone carboxylic acid, pyrone carboxylic acid, pyrrole carboxylic acid, furan carboxylic acid, pyridine carboxylic acid, coumalic acid, thiophene carboxylic acid, nicotinic acid, or a derivative of any of these compounds or a salt (such as a polyvalent metal salt) of any of these compounds. These compounds may be used singly, or in combination of two or more thereof.

The treatment liquid in the invention may further include an aqueous solvent (such as water) in addition to the acidic compound.

The content of acidic compound in the treatment liquid is preferably from 5 to 95% by mass, and more preferably from 10 to 80% by mass, with respect to the total mass of the treatment liquid from the viewpoint of aggregation effect.

A preferable example of the treatment liquid that improves high-speed coagulation properties may be a treatment liquid that contains a polyvalent metal salt or polyallylamine. Examples of the polyvalent metal salt include salts of alkali earth metals (such as magnesium and calcium) belonging to Group 2 of the Periodic Table, salts of transition metals (such as lanthanum) belonging to Group 3 of the Periodic Table, salts of metals (such as aluminum) of Group 13 of the Periodic Table, and salts of lanthanides (such as neodymium). Further examples of aggregation components include polyallylamine and polyallylamine derivatives. Carboxylic acid salts (such as formic acid salts, acetic acid salts, and benzoic acid salts), nitric acid salts, chloride salts, and thiocyanic acid salts are suitable as metal salts. In particular, a calcium or magnesium salt of a carboxylic acid (such as formic acid, acetic acid, or benzoic acid), a calcium or magnesium salt of nitric acid, calcium chloride, magnesium chloride, and a calcium or magnesium salt of thiocyanic acid, are preferable.

The content of metal salt in the treatment liquid is preferably from 1 to 10% by mass, more preferably from 1.5 to 7% by mass, and still more preferably from 2 to 6% by mass, with respect to the entire mass of the treatment liquid.

The viscosity of the treatment liquid is preferably in the range of from 1 to 30 mPa·s, more preferably in the range of from 1 to 20 mPa·s, still more preferably from 2 to 15 mPa·s, and particularly preferably from 2 to 10 mPa·s, from the viewpoint of the coagulation speed of the ink composition. The viscosity is measured under a condition of 20° C. using a VISCOMETER TV-22 (trade name, manufactured by TOKI SANGYO CO., LTD).

The treatment liquid has a surface tension of preferably from 20 to 60 mN/m, more preferably from 20 to 45 mN/m, and further more preferably from 25 to 45 mN/m, from the viewpoint of aggregation speed of the ink composition. The surface tension is measured using an automatic surface tensiometer CBVP-Z (trade name, manufactured by Kyowa Interface Science Co., Ltd.) at 25° C.

<Image Forming Method>

The image forming method according to the invention includes: an ink application process of applying the above-described black ink composition according to the invention onto a recording medium by an inkjet method; and a treatment liquid application process of applying, onto the recording medium, a treatment liquid containing an aggregation component capable of causing formation of an aggregate when contacting the black ink composition. The image forming method according to the invention may further include other processes, such as a heating fixing process of fixing, by heating, the ink image formed by the application of the ink composition onto the recording medium, as necessary.

Since the black ink composition described above is used, an achromatic image with a high quality and less yellow tinge, and in which generation of streak-shaped unevenness is suppressed is obtained for a long period of time, while damage to a head nozzle surface during maintenance is suppressed.

—Treatment Liquid Application Process—

In the treatment liquid application process, a treatment liquid containing an aggregation component capable of causing formation of an aggregate when contacting the ink composition is applied onto a recording medium. The specifics of the treatment liquid used in the present process, such as the components of the treatment liquid and preferable embodiments thereof, are as described above.

The application of the treatment liquid can be performed employing a known method such as a coating method, an inkjet method, or a dipping method. The coating method may be a known coating method using, for example, a bar coater, an extrusion die coater, an air doctor coater, a blade coater, a rod coater, a knife coater, a squeeze coater, or a reverse roll coater. The specifics of the inkjet method are the same as in the ink application process described below.

The treatment liquid application process may be conducted either before or after the ink application process described below. In the invention, an embodiment in which the ink application process is conducted after the treatment liquid application process is preferable. That is, an embodiment in which the treatment liquid for aggregating a colorant (preferably, a pigment) in the ink composition is applied onto a recording medium in advance of the application of the ink composition, and then the ink composition is applied so as to contact the treatment liquid that has been applied onto the recording medium, thereby forming an image, is preferable. This embodiment allows image formation to be carried out at higher speeds, and an image having high density and high resolution can be obtained even when high-speed recording is performed.

The amount of the treatment liquid to be applied is not particularly limited as long as the treatment liquid is capable of coagulating the ink composition. The amount of the treatment liquid to be applied is preferably an amount such that the amount of aggregation components applied is 0.1 g/m$^2$ or larger. In particular, the amount of the treatment liquid to be applied is more preferably an amount such that the amount of aggregation components applied is from 0.1 to 1.0 g/m$^2$, and more preferably from 0.2 to 0.8 g/m$^2$. When the amount of aggregation components applied is 0.1 g/m$^2$ or more, the aggregation reaction proceeds favorably. When the amount of aggregation components applied is 1.0 g/m$^2$ or less, gloss is not excessively high, and thus the amount is preferable.

In the invention, it is preferable that the ink application process is conducted after the treatment liquid application process, and that a heating and drying process of drying the treatment liquid on the recording medium by heating is further conducted during a period from after the application of the treatment liquid onto the recording medium to the application of the ink composition. Drying of the treatment liquid by heating performed in advance of the ink application process realizes favorable ink spotting properties such as bleed prevention, and realizes recording of a visible image having excellent color density and excellent hue.

The drying by heating may be conducted by using a known heating means such as a heater, a blowing means utilizing air blow such as a dryer, or a combination thereof. The heating may be performed according to, for example, a method of applying heat, by using a heater or the like, from a side of the recording medium opposite to the face applied with the treatment liquid, a method of blowing warm or hot air to the face of the recording medium applied with the treatment liquid, or a method of heating by using an infrared heater. Alternatively, two or more of these methods may be combined and used for the heating.

—Ink Application Process—

In the ink application process, the above-described ink composition is applied onto a recording medium by an inkjet method, to form a black image. The specifics of the ink composition used in the present process, such as the specifics of the components and preferable embodiments, are as described above.

The inkjet method is not particularly limited, and may be any known method such as a charge-control method in which ink is ejected by electrostatic attraction force, a piezo-inkjet method in which ink is ejected using a piezoelectric device that generates a mechanical deformation when a voltage is applied, an acoustic inkjet method in which ink is ejected using a radiation pressure generated by irradiation of ink with acoustic beams that have been converted from electric signals, and a thermal inkjet method in which ink is ejected using a pressure generated by formation of bubbles caused by heating of ink (BUBBLEJET, registered trademark).

Specific methods of the inkjet method include a method in which a large number of small-volume droplets of an ink having a low concentration, which is referred to as a photoink, are ejected, a method in which plural inks having different concentrations and substantially the same hue are used so as to improve the image quality, and a method in which a colorless and clear ink is used.

A piezoelectric inkjet method is suitable for use as the inkjet method in the invention. The combination of the black ink composition of the invention or the ink set including the black ink composition with the piezoelectric inkjet method improves the continuous ejection property and ejection stability of an ink.

In the piezoelectric inkjet method, the distortion mode of a piezoelectric element may be any one of a bending mode, a longitudinal mode, or a sheer mode. The configuration of the piezoelectric element and the structure of the piezo head are not particularly limited, and any one of known techniques may be used.

The ink nozzles and other members used for recording by an inkjet method are not particularly limited, and may be selected, as appropriate, in accordance with the purpose.

The inkjet method to be employed may be a shuttle system in which recording is carried out while a short serial head is moved in the width direction of a recording medium, or a line system in which a line head at which recording elements are arranged so as to correspond to the entire length of one side of the recording medium. In the line system, an image can be recorded on the entire surface of a recording medium by simply moving the recording medium in the direction perpendicular to the direction in which the recording elements are arranged. In addition, since only the recording medium is moved, recording at a recording speed higher than that in the shuttle system can be achieved.

The liquid droplet volume of the ink ejected from the inkjet head is preferably from 0.2 to 10 pl (pico-liter), and more preferably from 0.4 to 5 pl. The maximum total ejection amount of ink during image recording is preferably in the range of from 10 to 36 ml/m$^2$, and more preferably in the range of from 15 to 30 ml/m$^2$.

—Heating and Fixing Process—

In the invention, it is preferable that a heating and fixing process of fixing the ink composition on the recording medium by heating is carried out after the ink application process. In the heating and fixing process, the recorded image formed by the application of the treatment liquid and the ink composition is fixed to the recording medium by heating. By conducting the heating and fixing treatment, the image is fixed onto the recording medium, and the rubbing resistance of the image can be further improved. Therefore, the image forming method according to the invention preferably includes the heating and fixing process.

The heating is preferably carried out at a temperature that is equal to or higher than the minimum film-forming temperature (MFT) of the water-insoluble resin particles in the image. Heating to the MFT or higher transforms the particles into a film, thereby strengthening the image.

When pressure is applied together with heat, the pressure to be applied is preferably from 0.1 to 3.0 MPa, more preferably from 0.1 to 1.0 MPa, and further more preferably from 0.1 to 0.5 MPa, from the viewpoint of surface smoothing.

The method of heating is not particularly limited, and preferable examples thereof include a noncontact drying method, such as a method of heating with a heat generator such as a NICHROME wire heater, a method of supplying warm or hot air, or a method of heating with a halogen lamp, an infrared lamp, or the like. The method of applying heat and pressure is not particularly limited, and preferable examples thereof include a contact heating and fixing method, such as a method of pressing a hot plate against an image-formed surface of the recording medium, a method in which a heat-pressurization apparatus is used to pass the recording medium through a pressure contact portion, wherein the heat-pressurization apparatus may have a pair of heat-pressurization rollers or a pair of heat-pressurization belts, or may have a heat-pressurization belt disposed at the image-recorded surface side of the recording medium and a support roller disposed at the opposite side of the recording medium. The pressure contact portion is thus formed between the pair of rollers or between the pair of heat-pressurization belts or between the heat-pressurization belt and the support roller.

When heat and pressure are applied, the nip time is preferably from 1 msec to 10 sec, more preferably from 2 msec to 1 sec, and still more preferably from 4 msec to 100 msec. The nip width is preferably from 0.1 mm to 100 mm, more preferably from 0.5 mm to 50 mm, and still more preferably from 1 mm to 10 mm.

The heat-pressurization roller may be a metal roller made of metal, or a roller having a metal core of which the outer surface is covered with a coating layer made of an elastic material and, optionally, a surface layer (also referred to as a release layer). The metal core in the latter case may be, for example, a cylindrical body made of iron, aluminum, or SUS (stainless steel). It is preferable that at least a part of the surface of the metal core is coated with a coating layer. The coating layer is preferably formed by a silicone resin or fluororesin, each of which has release properties. It is preferable that a heat generator is placed in the interior of the metal core of one of the heat-pressurization rollers. Heating treatment and pressure application treatment may be performed simultaneously by passing the recording medium between the rollers. In an embodiment, the recording medium is heated by being nipped between two heating rollers, if necessary. Preferable examples of the heat generator include a halogen lamp heater, a ceramic heater, and a NICHROME wire.

The belt substrate for forming the heat-pressurization belt for use in the heat-pressurization apparatus is preferably a seamless electroformed nickel, and the thickness of the substrate is preferably from 10 μm to 100 μm. Examples of the material of the belt substrate include aluminum, iron, and polyethylene, as well as nickel. When a silicone resin layer or a fluororesin layer is provided, the thickness of the layer formed by the resin is preferably from 1 μm to 50 μm, and more preferably from 10 μm to 30 μm.

In order to obtain pressure (nip pressure) within the above range, elastic members that exhibit tension, such as a spring, may be selected and disposed at both ends of a roller (for example, a heat-pressurization roller), such that a desired nip pressure can be obtained in consideration of the nip gap.

When the heat-pressurization rollers or heat-pressurization belts are used, the conveyance speed of the recording medium is preferably from 200 mm/sec to 700 mm/sec, more preferably from 300 mm/sec to 650 mm/sec, and still more preferably from 400 mm/sec to 600 mm/sec.

—Recording Medium—

In the image forming method according to the invention, the recording medium on which an image is to be formed is not particularly limited, and may be coated paper used for general offset printing and the like, or paper specialized for inkjet recording.

The coated paper is paper obtained by applying a coating material onto a surface of high-quality paper or acid-free paper, which is cellulose-based and generally not surface-treated, to form a coating layer. The coated paper may be a commercially available product. Specific examples thereof include high-quality papers (A) such as PRINCE WOOD FREE (trade name) manufactured by Oji Paper Co., Ltd., SHIRAOI (trade name) manufactured by Nippon Paper Industries Co., Ltd., and New NPI jo-shitsu (New NPI high-quality; trade name) manufactured by Nippon Paper Industries Co., Ltd.; Bitokoshi (very light weight coated papers) such as EVER LIGHT COATED (trade name) manufactured by Oji Paper Co., Ltd. and AURORA S (trade name) manufactured by Nippon Paper Industries Co., Ltd.; lightweight coat papers (A3) such as TOPKOTE (L) (trade name) manufactured by Oji Paper Co., Ltd. and AURORA L (trade name) manufactured by Nippon Paper Industries Co., Ltd.; coat papers (A2, B2) such as TOPKOTE PLUS (trade name) manufactured by Oji Paper Co., Ltd. and AURORA COAT (trade name) manufactured by Nippon Paper Industries Co., Ltd.; and art papers (A1) such as 2/SIDE GOLDEN CASK GLOSS (trade name) manufactured by Oji Paper Co., Ltd. and TOKUBISHI ART (trade name) manufactured by Mitsubishi Paper Mills Ltd.

The coated paper is a material which absorbs ink only slowly. However, in the invention, even when such a material is used, an image in which generation of image transfer between recording media is suppressed and which has excellent rubbing resistance, is recorded at a high speed. Therefore, use of a coated paper is preferable.

EXAMPLES

Hereinafter, the present invention will be specifically described with reference to Examples, but the present invention is not limited to these Examples, and encompasses any other embodiments that do not depart from the spirit of the invention. Unless stated otherwise, "part(s)" represents part(s) by mass.

Synthesis Example

Synthesis of Water-Insoluble Polymer 1

88 g of methyl ethyl ketone was added to a 1000 mL three-necked flask equipped with a stirrer and a condenser tube, and was heated to 72° C. under a nitrogen atmosphere. To this, a solution obtained by dissolving 0.86 g of dimethyl-2,2'-azobisisobutyrate, 60 g of benzyl methacrylate, 10 g of methacrylic acid, and 30 g of methyl methacrylate in 50 g of methyl ethyl ketone was added dropwise over 3 hours. After the addition was completed, the mixture was reacted for one more hour, and then a solution obtained by dissolving 0.40 g of dimethyl-2,2'-azobisisobutyrate in 2 g of methyl ethyl ketone was added thereto. The temperature was raised to 80° C., and the mixture was heated for 4 hours. The resulting reaction liquid was reprecipitated twice in an excess amount of hexane, and the separated resin was dried to obtain 96 g of a water-insoluble polymer 1.

The composition of the polymer obtained was confirmed by $^1$H-NMR, and the weight average molecular weight (Mw) thereof as determined by GPC was 43,300. The acid value of the polymer was measured by the method according to JIS K0070 (1992), and was found to be 64.6 mgKOH/g.

(Preparation of Resin-Coated Carbon Black Dispersion A)

The components in the formulation described below were mixed, and the resulting mixture was subjected to dispersion for a period of from 3 hours to 6 hours using a bead mill with zirconia beads having a diameter of 0.1 mm. Subsequently, from the resulting dispersion, the methyl ethyl ketone was removed under reduced pressure at 55° C., and, further, a portion of water was removed, to prepare a resin-coated carbon black dispersion A having a carbon black concentration of 15.0% by mass.

<Formulation of Resin-Coated Carbon Black Dispersion A>

| | |
|---|---|
| Carbon black (NIPEX180-IQ, trade name, manufactured by Evonik-Degussa GmbH) | 10.0 parts |
| Water-insoluble polymer 1 (water-insoluble resin) | 5.5 parts |
| Methyl ethyl ketone (organic solvent) | 30.5 parts |
| 1 mol/l NaOH aqueous solution (neutralizer agent) | 7.7 parts |
| Ion-exchange water | 96.3 parts |

(Preparation of Carbon Black Dispersion B)

5 parts of a styrene-acrylic acid copolymer (JONCRYL 678 (trade name) manufactured by BASF Japan Ltd., having a molecular weight of 8,500 and an acid value of 215 mgKOH/g) as a water-soluble dispersant, 2.0 parts of dimethylaminoethanol, and 78.0 parts of ion exchanged water were mixed by stirring at 70° C. to obtain a solution. Subsequently, to this solution, 15 parts of carbon black (NIPEX180-IQ (trade name) manufactured by Evonik Degussa Japan Co., Ltd.) were added and premixed. Thereafter, the resulting mixture was dispersed using a sand grinder filled with 0.5 mm zirconia beads at a volume ratio of 50%, to prepare a carbon black dispersion B having a carbon black content of 15% by mass.

(Preparation of Resin-Coated Cyan Pigment Dispersion A)

Preparation of a resin-coated cyan pigment dispersion A was conducted in the same manner as the preparation of resin-coated carbon black dispersion A, except that the formulation used in the preparation of the resin-coated carbon black dispersion A was changed to the following formulation. As a result, a resin-coated cyan pigment dispersion A having a cyan pigment concentration of 15% by mass was obtained.

<Formulation of Resin-Coated Cyan Pigment Dispersion A>

| | |
|---|---|
| PB 15/3 pigment powder (phthalocyanine blue A220, trade name, manufactured by Dainichiseika Color & Chemicals Mfg. Co., Ltd.) | 10.0 parts |
| Water-insoluble polymer 1 (water-insoluble resin) | 4.0 parts |
| Methyl ethyl ketone (organic solvent) | 30.5 parts |
| 1 mol/1 NaOH aqueous solution (neutralizer agent) | 5.6 parts |
| Ion-exchange water | 98.7 parts |

(Preparation of Cyan Pigment Dispersion B)

Preparation of a cyan pigment dispersion B was conducted in the same manner as the preparation of the carbon black dispersion B, except that the carbon black in the preparation of the carbon black dispersion B was changed to PB 15:3 pigment powder (PHTHALOCYANINE BLUE A220 (trade name) manufactured by Dainichiseika Color & Chemicals Mfg. Co., Ltd.). As a result, a cyan pigment dispersion B having a cyan pigment content of 15% by mass was obtained.

(Preparation of Resin-Coated Magenta Pigment Dispersion A)

Preparation of a resin-coated magenta pigment dispersion A was conducted in the same manner as the preparation of the resin-coated cyan pigment dispersion A, except that the formulation used in the preparation of the resin-coated cyan pigment dispersion A was changed to the following formulation. As a result, a resin-coated magenta pigment dispersion A having a magenta pigment concentration of 15% by mass was obtained.

<Formulation of Resin-Coated Magenta Pigment Dispersion A>

| | |
|---|---|
| PR122 pigment powder (CROMOPHTAL JET MAGENTA DMQ, trade name, manufactured by BASFJapanLtd.) | 10.0 parts |
| Water-insoluble polymer 1 (water-insoluble resin) | 3.0 parts |
| Methyl ethyl ketone (organic solvent) | 30.5 parts |
| 1 mol/1 NaOH aqueous solution (neutralizer agent) | 4.2 parts |
| Ion-exchange water | 102.3 parts |

(Preparation of Magenta Pigment Dispersion B)

Preparation of a magenta pigment dispersion B was conducted in the same manner as the preparation of the cyan pigment dispersion B, except that the PB 15:3 pigment powder used in the preparation of the cyan pigment dispersion B was changed to PR 122 pigment powder (trade name: CROMOPHTAL JET MAGENTA DMQ, manufactured by BASF Japan Ltd.). As a result, a magenta pigment dispersion B having a magenta pigment content of 15% by mass was obtained.

(Preparation of Resin-Coated Yellow Pigment Dispersion A)

Preparation of a resin-coated yellow pigment dispersion A was conducted in the same manner as the preparation of the resin-coated cyan pigment dispersion A, except that the formulation used in the preparation of the resin-coated cyan pigment dispersion A was changed to the following formulation. As a result, a resin-coated yellow pigment dispersion A having a yellow pigment concentration of 15% by mass was obtained.

<Formulation of Resin-Coated Yellow Pigment Dispersion A>

| | |
|---|---|
| PY74 pigment powder (trade name: HANSA BRILLIANT YELLOW 5GX03, manufactured by Clariant) | 10.0 parts |
| Water-insoluble polymer 1 (water-insoluble resin) | 4.3 parts |
| Methyl ethyl ketone (organic solvent) | 30.5 parts |
| 1 mol/l NaOH aqueous solution (neutralizer agent) | 6.0 parts |
| Ion-exchange water | 99.2 parts |

(Preparation of Yellow Pigment Dispersion B)

Preparation of a yellow pigment dispersion B was conducted in the same manner as the preparation of the resin-coated cyan pigment dispersion B, except that the PB 15:3 pigment powder used in the preparation of the resin-coated cyan pigment dispersion B was changed to PY74 pigment powder (tradename: HANSA BRILLIANT YELLOW 5GX03, manufactured by Clariant). As a result, a resin-coated yellow pigment dispersion B having a yellow pigment concentration of 15% by mass was obtained.

(Preparation of Aqueous Dispersion of Self-dispersing Polymer C-1)

First, 540.0 g of methyl ethyl ketone was put into a 2 L-three necked flask equipped with a mechanical stirrer, a thermometer, a reflux condenser, and a nitrogen gas-introducing pipe, and was heated to 75° C. While the temperature in the reaction vessel was maintained at 75° C., a mixed solution of 108 g of methyl methacrylate, 388.8 g of isobornyl methacrylate, 43.2 g of methacrylic acid, 108 g of methyl ethyl ketone, and 2.16 g of V-601 (trade name, manufactured by Wako Pure Chemical Industries Ltd.) was added dropwise at a constant speed such that the dropwise addition was completed in 2 hours. After completion of the addition, a solution containing 1.08 g or V-601 and 15.0 g of methyl ethyl ketone was added thereto, followed by stirring at 75° C. for 2 hours. Thereafter, a solution containing 0.54 g or V-601 and 15.0 g of methyl ethyl ketone was further added thereto, followed by stirring at 75° C. for 2 hours. The reaction solution was heated to 85° C. and stirred for 2 hours, thereby obtaining a resin solution containing a methyl methacrylate/isobornyl methacrylate/methacrylic acid copolymer (=20/72/8 [mass ratio]).

The copolymer obtained had a weight average molecular weight (Mw) of 61,000 and an acid value of 52.1 mgKOH/g. The weight average molecular weight was measured by gel permeation chromatography (GPC), and is expressed in terms of a polystyrene-equivalent value. In GPC, HLC-8020GC (trade name, manufactured by Tosoh Corporation) was used, and TSKgel Super HZM-H, TSKgel Super HZ4000, and TSKgel Super HZ200 (trade names, manufactured by Tosoh Corporation) were used as columns, and tetrahydrofuran (THF) was used as an eluting solvent. The acid value was measured in accordance with the method of JIS K0700 (1992).

Subsequently, 588.2 g of the resin solution was weighed out, 165 g of isopropanol and 120.8 ml of an aqueous 1 mol/L sodium hydroxide solution were added thereto, and the temperature in the reaction vessel was increased to 80° C. Next, 718 g of distilled water was added dropwise at a speed of 20 ml/min to form a water dispersion. Thereafter, solvent was distilled off by maintaining the temperature in the reaction vessel at 80° C. for 2 hours, at 85° C. for 2 hours, and at 90° C. for 2 hours under atmospheric pressure. Then, the pressure in the reaction vessel was reduced to distill off isopropanol, methyl ethyl ketone, and distilled water, thereby obtaining an aqueous dispersion of a self-dispersing polymer C-1 (resin particles) having a solids content of 26.0% by mass.

—Preparation of Aqueous Dispersions of Self-dispersing Polymers C-2 and C-3—

An aqueous dispersion of a self-dispersing polymer C-2 and an aqueous dispersion of a self-dispersing polymer C-3 were prepared in the same manner as the preparation of the aqueous dispersion of the self-dispersing polymer C-1, except that the kinds and ratios of monomers used in the preparation of the aqueous dispersion of the self-dispersing polymer C-1 were changed as described below.

Self-dispersing polymer C-2: methyl methacrylate/dicyclopentanyl methacrylate/methoxy polyethylene glycol methacrylate (n=2)/methacrylic acid copolymer (=54/35/5/6 [mass ratio])

The copolymer obtained as a result of the preparation had a weight average molecular weight (Mw) of 60,000 and an acid value of 39.1 mgKOH/g. The solids content of the aqueous dispersion was 25% by mass.

Self-dispersing polymer C-3: n-butyl methacrylate/cyclohexyl methacrylate/styrene/acrylic acid copolymer (=30/55/10/5 [mass ratio])

The copolymer obtained as a result of the preparation had a weight average molecular weight (Mw) of 58,000 and an acid value of 38.9 mgKOH/g. The solids content of the aqueous dispersion was 25% by mass.

Actually measured values of glass transition temperatures of the self-dispersing polymers C-1 to C-3 (measured Tg) are shown in Table 1 below. The measured Tg was obtained by the following method.

<Measured Tg>

First, an amount of the aqueous dispersion of resin particles corresponding to a solids amount of 0.5 g was dried under a reduced pressure at 50° C. for 4 hours, thereby obtaining a polymer solid. The polymer solid obtained was used as a sample for measurement of Tg using a differential scanning calorimeter (DSC) EXSTAR 6220 (trade name, manufactured by SII Nano Technology Inc.). The measurement was carried out as follows: 5 mg of the sample was put in an aluminum pan, the aluminum pan was tightly sealed, and the sample was subjected to temperature changes under a nitrogen atmosphere according to the temperature profile described below. Then, a temperature corresponding to the peak top of DDSC in the second temperature increase in the observed data was used as a measured Tg.

30° C.→−50° C. (cooling at 50° C./min)
−50° C.→120° C. (heating at 20° C./min)
120° C.→−50° C. (cooling at 50° C./min)
−50° C.→120° C. (heating at 20° C./min)

TABLE 1

| Aqueous Dispersion of Self-dispersing Polymer | Tg [° C.] |
|---|---|
| C-1 | 180 |
| C-2 | 100 |
| C-3 | 86 |

The thus-obtained aqueous dispersions of the self-dispersing polymers were used for preparing inks having the formulations shown in Table 2, and the inks were subjected to filtration using a membrane filter ($\phi$=0.2 μm), thereby producing Inks A to V. The addition amounts of respective components shown in Table 2 are amounts (mass %) relative to the total amount of the ink.

TABLE 2

|  | Ink A Invention | Ink B Invention | Ink C Invention | Ink D Invention | Ink E Invention |
|---|---|---|---|---|---|
| Carbon black dispersion A (dispersed using water-insoluble polymer) | 10.0 | 8.0 | 6.7 | 13.3 | 13.3 |
| CAB-O-JE300 (self-dispersing carbon black) |  |  |  |  |  |
| Carbon black dispersion B (dispersed using water-insoluble polymer) |  |  |  |  |  |
| Cyan pigment dispersion A (dispersed using water-insoluble polymer) | 3.3 | 2.8 | 2.3 | 3.3 | 2.8 |
| Cyan pigment dispersion B (dispersed using water-insoluble polymer) |  |  |  |  |  |
| Magenta pigment dispersion A (dispersed using water-insoluble polymer) | 4.6 | 3.7 | 2.8 | 4.6 | 3.1 |
| Magenta pigment dispersion B (dispersed using water-insoluble polymer) |  |  |  |  |  |
| Yellow pigment dispersion A (dispersed using water-insoluble polymer) |  |  |  |  |  |
| Yellow pigment dispersion B (dispersed using water-insoluble polymer) |  |  |  |  |  |
| SANNIX GP250 (NEWPOL GP250, Sanyo Chemical Industries) | 8.0 | 8.0 | 8.0 | 8.0 | 8.0 |
| Tripropylene glycol monomethyl ether | 3.0 | 3.0 | 3.0 | 3.0 | 3.0 |
| Dipropylene glycol | 5.0 | 5.0 | 5.0 | 5.0 | 5.0 |
| OLFIN E1010 | 1.0 | 1.0 | 1.0 | 1.0 | 1.0 |
| JONCRYL 586 (water-soluble) |  |  |  |  |  |
| Aqueous dispersion of self-dispersing polymer C-1 (water-insoluble polymer; Tg = 180° C.) | 28.0 | 32.0 | 32.0 |  | 24.0 |
| Aqueous dispersion of self-dispersing polymer C-2 (water-insoluble polymer; Tg = 100° C.) |  |  |  | 20.0 |  |
| Aqueous dispersion of self-dispersing polymer C-3 (water-insoluble polymer; Tg = 86° C.) |  |  |  |  |  |
| Urea | 5.0 | 5.0 | 5.0 | 5.0 | 5.0 |
| Carnauba wax | 6.7 | 6.7 | 6.7 | 6.7 | 6.7 |
| Ion-exchange water | 25.4 | 24.8 | 27.6 | 30.1 | 28.1 |
| Total | 100.0 | 100.0 | 100.0 | 100.0 | 100.0 |

|  | Ink F Invention | Ink G Invention | Ink H Invention | Ink I Invention | Ink J Invention |
|---|---|---|---|---|---|
| Carbon black dispersion A (dispersed using water-insoluble polymer) | 10.0 | 10.0 | 8.0 | 6.7 | 8.7 |
| CAB-O-JE300 (self-dispersing carbon black) |  |  |  |  |  |
| Carbon black dispersion B (dispersed using water-insoluble polymer) |  |  |  |  |  |
| Cyan pigment dispersion A (dispersed using water-insoluble polymer) | 2.7 | 2.0 | 3.9 | 3.3 | 3.5 |
| Cyan pigment dispersion B (dispersed using water-insoluble polymer) |  |  |  |  |  |
| Magenta pigment dispersion A (dispersed using water-insoluble polymer) | 2.7 | 2.7 | 6.1 | 1.7 | 4.8 |
| Magenta pigment dispersion B (dispersed using water-insoluble polymer) |  |  |  |  |  |
| Yellow pigment dispersion A (dispersed using water-insoluble polymer) |  |  |  |  | 1.0 |
| Yellow pigment dispersion B (dispersed using water-insoluble polymer) |  |  |  |  |  |
| SANNIX GP250 (NEWPOL GP250, Sanyo Chemical Industries) | 8.0 | 8.0 | 8.0 | 8.0 | 8.0 |
| Tripropylene glycol monomethyl ether | 3.0 | 3.0 | 3.0 | 3.0 | 3.0 |
| Dipropylene glycol | 5.0 | 5.0 | 5.0 | 5.0 | 5.0 |
| OLFIN E1010 | 1.0 | 1.0 | 1.0 | 1.0 | 1.0 |
| JONCRYL 586 (water-soluble) |  |  |  |  |  |
| Aqueous dispersion of self-dispersing polymer C-1 (water-insoluble polymer; Tg = 180° C.) | 32.0 | 32.0 | 32.0 | 32.0 |  |
| Aqueous dispersion of self-dispersing polymer C-2 (water-insoluble polymer; Tg = 100° C.) |  |  |  |  | 32.0 |
| Aqueous dispersion of self-dispersing polymer C-3 (water-insoluble polymer; Tg = 86° C.) |  |  |  |  |  |

TABLE 2-continued

| | | | | | |
|---|---|---|---|---|---|
| Urea | 5.0 | 5.0 | 5.0 | 5.0 | 5.0 |
| Carnauba wax | 6.7 | 6.7 | 6.7 | 6.7 | 6.7 |
| Ion-exchange water | 24.0 | 24.7 | 21.4 | 27.7 | 21.3 |
| Total | 100.0 | 100.0 | 100.0 | 100.0 | 100.0 |

| | Ink K Invention | Ink L Comparative | Ink M Comparative | Ink N Comparative |
|---|---|---|---|---|
| Carbon black dispersion A (dispersed using water-insoluble polymer) | 13.3 | 13.3 | 5.3 | 15.3 |
| CAB-O-JE300 (self-dispersing carbon black) | | | | |
| Carbon black dispersion B (dispersed using water-insoluble polymer) | | | | |
| Cyan pigment dispersion A (dispersed using water-insoluble polymer) | 3.3 | | 2.7 | 3.7 |
| Cyan pigment dispersion B (dispersed using water-insoluble polymer) | | | | |
| Magenta pigment dispersion A (dispersed using water-insoluble polymer) | 4.6 | | 3.3 | 4.9 |
| Magenta pigment dispersion B (dispersed using water-insoluble polymer) | | | | |
| Yellow pigment dispersion A (dispersed using water-insoluble polymer) | | | | |
| Yellow pigment dispersion B (dispersed using water-insoluble polymer) | | | | |
| SANNIX GP250 (NEWPOL GP250, Sanyo Chemical Industries) | 8.0 | 8.0 | 8.0 | 8.0 |
| Tripropylene glycol monomethyl ether | 3.0 | 3.0 | 3.0 | 3.0 |
| Dipropylene glycol | 5.0 | 5.0 | 5.0 | 5.0 |
| OLFIN E1010 | 1.0 | 1.0 | 1.0 | 1.0 |
| JONCRYL 586 (water-soluble) | | | | |
| Aqueous dispersion of self-dispersing polymer C-1 (water-insoluble polymer; Tg = 180° C.) | | | 34.0 | |
| Aqueous dispersion of self-dispersing polymer C-2 (water-insoluble polymer; Tg = 100° C.) | | | | 32.0 |
| Aqueous dispersion of self-dispersing polymer C-3 (water-insoluble polymer; Tg = 86° C.) | 32.0 | 32.0 | | |
| Urea | 5.0 | 5.0 | 5.0 | 5.0 |
| Carnauba wax | 6.7 | 6.7 | 6.7 | 6.7 |
| Ion-exchange water | 18.1 | 26.0 | 26.0 | 15.5 |
| Total | 100.0 | 100.0 | 100.0 | 100.0 |

| | Ink O Comparative | Ink P Comparative | Ink Q Comparative |
|---|---|---|---|
| Carbon black dispersion A (dispersed using water-insoluble polymer) | | | |
| CAB-O-JE300 (self-dispersing carbon black) | 5.3 | 16.7 | 6.7 |
| Carbon black dispersion B (dispersed using water-insoluble polymer) | | | |
| Cyan pigment dispersion A (dispersed using water-insoluble polymer) | 3.3 | 1.3 | 1.7 |
| Cyan pigment dispersion B (dispersed using water-insoluble polymer) | | | |
| Magenta pigment dispersion A (dispersed using water-insoluble polymer) | 4.0 | 1.7 | 2.5 |
| Magenta pigment dispersion B (dispersed using water-insoluble polymer) | | | |
| Yellow pigment dispersion A (dispersed using water-insoluble polymer) | | | |
| Yellow pigment dispersion B (dispersed using water-insoluble polymer) | | | |
| SANNIX GP250 (NEWPOL GP250, Sanyo Chemical Industries) | 8.0 | 8.0 | 8.0 |
| Tripropylene glycol monomethyl ether | 3.0 | 3.0 | 3.0 |
| Dipropylene glycol | 5.0 | 5.0 | 5.0 |
| OLFIN E1010 | 1.0 | 1.0 | 1.0 |
| JONCRYL 586 (water-soluble) | | | |

TABLE 2-continued

| | | | |
|---|---|---|---|
| Aqueous dispersion of self-dispersing polymer C-1 (water-insoluble polymer; Tg = 180° C.) | 32.0 | 32.0 | 32.0 |
| Aqueous dispersion of self-dispersing polymer C-2 (water-insoluble polymer; Tg = 100° C.) | | | |
| Aqueous dispersion of self-dispersing polymer C-3 (water-insoluble polymer; Tg = 86° C.) | | | |
| Urea | 5.0 | 5.0 | 5.0 |
| Carnauba wax | 6.7 | 6.7 | 6.7 |
| Ion-exchange water | 24.7 | 17.7 | 26.5 |
| Total | 100.0 | 100.0 | 100.0 |

| | Ink R Comparative | Ink S Comparative | Ink T Comparative |
|---|---|---|---|
| Carbon black dispersion A (dispersed using water-insoluble polymer) | 13.3 | | |
| CAB-O-JE300 (self-dispersing carbon black) | | 10.0 | |
| Carbon black dispersion B (dispersed using water-insoluble polymer) | | | 10.0 |
| Cyan pigment dispersion A (dispersed using water-insoluble polymer) | 4.7 | 3.3 | |
| Cyan pigment dispersion B (dispersed using water-insoluble polymer) | | | 3.3 |
| Magenta pigment dispersion A (dispersed using water-insoluble polymer) | 6.0 | 4.6 | |
| Magenta pigment dispersion B (dispersed using water-insoluble polymer) | | | 4.6 |
| Yellow pigment dispersion A (dispersed using water-insoluble polymer) | | | |
| Yellow pigment dispersion B (dispersed using water-insoluble polymer) | | | |
| SANNIX GP250 (NEWPOL GP250, Sanyo Chemical Industries) | 8.0 | 8.0 | 8.0 |
| Tripropylene glycol monomethyl ether | 3.0 | 3.0 | 3.0 |
| Dipropylene glycol | 5.0 | 5.0 | 5.0 |
| OLFIN E1010 | 1.0 | 1.0 | 1.0 |
| JONCRYL 586 (water-soluble) | | | |
| Aqueous dispersion of self-dispersing polymer C-1 (water-insoluble polymer; Tg = 180° C.) | 32.0 | 32.0 | 32.0 |
| Aqueous dispersion of self-dispersing polymer C-2 (water-insoluble polymer; Tg = 100° C.) | | | |
| Aqueous dispersion of self-dispersing polymer C-3 (water-insoluble polymer; Tg = 86° C.) | | | |
| Urea | 5.0 | 5.0 | 5.0 |
| Carnauba wax | 6.7 | 6.7 | 6.7 |
| Ion-exchange water | 13.3 | 21.4 | 21.4 |
| Total | 100.0 | 100.0 | 100.0 |

| | Ink U Comparative | Ink V Comparative |
|---|---|---|
| Carbon black dispersion A (dispersed using water-insoluble polymer) | 10.0 | 10.0 |
| CAB-O-JE300 (self-dispersing carbon black) | | |
| Carbon black dispersion B (dispersed using water-insoluble polymer) | | |
| Cyan pigment dispersion A (dispersed using water-insoluble polymer) | 3.3 | 3.3 |
| Cyan pigment dispersion B (dispersed using water-insoluble polymer) | | |
| Magenta pigment dispersion A (dispersed using water-insoluble polymer) | 4.6 | 4.6 |
| Magenta pigment dispersion B (dispersed using water-insoluble polymer) | | |
| Yellow pigment dispersion A (dispersed using water-insoluble polymer) | | |
| Yellow pigment dispersion B (dispersed using water-insoluble polymer) | | |
| SANNIX GP250 (NEWPOL GP250, Sanyo Chemical Industries) | 8.0 | 8.0 |
| Tripropylene glycol monomethyl ether | 3.0 | 3.0 |
| Dipropylene glycol | 5.0 | 5.0 |
| OLFIN E1010 | 1.0 | 1.0 |
| JONCRYL 586 (water-soluble) | | 16.7 |
| Aqueous dispersion of self-dispersing polymer C-1 (water-insoluble polymer; Tg = 180° C.) | | |

TABLE 2-continued

| | | |
|---|---:|---:|
| Aqueous dispersion of self-dispersing polymer C-2 (water-insoluble polymer; Tg = 100° C.) | | |
| Aqueous dispersion of self-dispersing polymer C-3 (water-insoluble polymer; Tg = 86° C.) | | |
| Urea | 5.0 | 5.0 |
| Carnauba wax | 6.7 | 6.7 |
| Ion-exchange water | 53.4 | 36.7 |
| Total | 100.0 | 100.0 |

Details of the components shown in Table 2 are as described below.

CAB-O-JET300: self-dispersing carbon black (solids concentration: 15% by mass, manufactured by Cabot Corporation)

OLFIN E1010: nonionic surfactant, manufactured by Nissin Chemical Industry Co., Ltd.

JONCRYL 586: water-soluble polymer (solids concentration: 30% by mass, manufactured by Johnson Polymer)

Carnauba wax: CELLOSOL 524, manufactured by Chukyo Yushi Co., Ltd.

(Preparation of Treatment Liquid)

Ingredients were mixed to form the following formulation, thereby preparing a treatment liquid. In regard to the physical properties of the treatment liquid, the treatment liquid had a viscosity of 2.6 mPa·s, a surface tension of 37.3 mN/m, and a pH of 1.6. The surface tension was measured using an automatic surface tensiometer CBVP-Z (trade name, manufactured by Kyowa Interface Science Co., Ltd.) at 25° C. The viscosity was measured using a viscometer TV-22 (trade name, manufactured by Toki Sangyo Co., Ltd.) at 20° C. The pH was measured at 25° C.

<Formulation>

| | |
|---|---|
| Malonic acid (manufactured by Wako Pure Chemical Industries Co., Ltd.) | 15.0% by mass |
| Diethylene glycol monomethyl ether (manufactured by Wako Pure Chemical Industries Co., Ltd.) | 20.0% by mass |
| Sodium N-oleyl-N-methyl taurine | 1.0% by mass |
| Ion-exchange water | 64.0% by mass |

<Image Recording and Evaluation>
—1. Image Recording—

A printer for evaluation equipped with a print head GELJET GX5000 (trade name, manufactured by Ricoh Co., Ltd., full-line head) was prepared, and storage tanks connected to the print head were filled with the inks A to N, respectively. Further, "TOKUBISHI ART DOUBLE-SIDED N" (trade name, manufactured by Mitsubishi Paper Mills, Ltd.: water absorption coefficient Ka=0.21 mL/m$^2$·ms$^{1/2}$) as a recording medium was prepared.

Subsequently, the TOKUBISHI ART DOUBLE-SIDED N was fixed on a stage that was movable at 500 mm/sec in a predetermined linear direction that would become a vertical scanning direction at the time of recording. Then, the treatment liquid was applied thereto using a wire bar coater in an amount of 2.0 g/m$^2$, and dried at 50° C. for 2 seconds immediately after drying. Next, a GELJET GX500 printer head was positioned such that the direction of the line head was inclined at an angle of 75.7° with respect to the direction (horizontal scanning direction) perpendicular to the movement direction (vertical scanning direction) of the stage on the same plane. While the recording medium was moved in the vertical scanning direction at a constant speed, a solid image was printed in a line printing manner under the conditions of and ink droplet amount of 2.8 pL, an ejection frequency of 24 kHz, a resolution of 1200 dpi×1200 dpi, and a moving speed of the stage of 50 mm/s. Immediately after printing, the ink was dried at 60° C. for 3 seconds, and the recording medium was passed between a pair of fixation rollers heated at 60° C. so as to conduct fixation treatment at a nip pressure of 0.25 MPa with a nip width of 4 mm, as a result of which an image sample was obtained.

Next, image samples were produced under the conditions in which the moving speed of the stage was changed from 50 mm/s to 100 mm/s or 250 mm/s, and the ejection frequency was changed so as to maintain the same droplet amount as that described above.

The fixation rollers were configured by a heating roller composed of a metal cylinder which is made of stainless steel (SUS), and which has a halogen lump therein, and a silicone resin that covers the surface of the metal cylinder, and a counter roller that is in pressure contact with the heating roller.

—2. Evaluation—
(1) Maintenance Durability Test

The inks shown in Table 2 were used in the test. Each ink was ejected from a head nozzle until the amount of the ink that had been ejected became an ink amount corresponding to continuously image printing on 1,000 sheets. Thereafter, a cleaning liquid was applied to the surface of the head nozzle, and ink stains as well as the cleaning liquid were removed off using a wiping cloth (TORAYSEE MK cloth, trade name, manufactured by Toray Industries Inc.) After this operation was repeated 3,000 times, the head surface was observed under a microscope, and evaluated in accordance with the following evaluation criteria.

<Evaluation Criteria>
A: Almost no scratch was observed.
B: Scratches were slightly observed, but the extent of scratches was practically tolerable.
C: Scratches were observed, and the extent of scratches was practically intolerable
D: Scratches were remarkable.

(2) Ejection Property Test

The ejection property test described below was performed before and after the maintenance durability test using the inks shown in Table 2.

In the ejection property test, a line image of 75×24,000 dpi was printed at an ejection frequency of 12 kHz. In the image recording, "KASSAI SHASHIN-SHIAGE Pro" (trade name, manufactured by Fuji Film Corporation) was used as a recording medium, application of the treatment liquid and the subsequent drying were not carried out, and the recorded medium was not passed between the fixation rollers. Next, the central value of the lines was measured using a dot analyzer DA-6000 (trade name, manufactured by Oji Scientific Instruments), a standard deviation a of the positional deviation of each line was calculated, and the ejection property was evaluated in accordance with the following evaluation criteria.

<Evaluation Criteria>

A: σ was less than 2 μm, which indicates an excellent ejection property.

B: σ was from 2 μm to less than 5 μm, which indicates a practically tolerable ejection property.

C: σ was from 5 μm to less than 7 μm, which indicates a practically intolerable ejection property.

D: σ was 7 μm or more.

(3) Streak-Shaped Unevenness in Image

100% solid images of 1200 dpi×1200 dpi were formed using the inks shown in Table 2, and were visually evaluated in accordance with the following evaluation criteria.

<Evaluation Criteria>

A: Almost no streak-shaped unevenness was observed in the image.

B: Slight streak-shaped unevenness was observed in the image, and the degree of the unevenness was practically tolerable.

C: Streak-shaped unevenness was observed in the image, and the degree of the unevenness was practically intolerable.

D: Streak-shaped unevenness was remarkable.

(4) Color Deviation of Image

First, solid gray images having a resolution of 1200 dpi×1200 dpi and having densities ranging from 10% to 100% at an increment of 10% were formed using each of the inks shown in Table 2, and L*a*b* values ($L^*_1$, $a^*_1$, $b^*_1$) of each gray image was measured using a SPECTRO EYE (trade name, manufactured by X-rite). L*a*b* values ($L^*_2$, $a^*_2$, $b^*_2$) in a non-image region (recording medium) was also measured. Based on the measured values, the color difference (ΔEab) between the gray image and the non-image region was calculated, and was evaluated in accordance with the following evaluation criteria. The (ΔEab) was calculated according to the following expression.

$$\Delta Eab = \{(a^*_1 - a^*_2)^2 + (b^*_1 - b^*_2)^2\}^{1/2}$$

<Evaluation Criteria>

A: ΔEab was smaller than 3, which indicates little color deviation, and favorable result with respect to suppression of color deviation.

B: ΔEab was in a range of from 3 to 4, which indicates practically tolerable color deviation.

C: ΔEab was in a range of from 5 to 7, which indicates practically intolerable color deviation.

D: ΔEab was larger than 7, which indicates significantly large color deviation.

(5) Image Density

100% solid images of 1200 dpi×1200 dpi were formed using the inks shown in Table 2. The image density (Dv: Visual Density) of each image was measured using a SPECTRO EYE (trade name, manufactured by X-rite), and evaluated in accordance with the following evaluation criteria.

<Evaluation Criteria>

A: Dv was larger than 1.8, which indicates a favorable result with respect to image density.

B: Dv was in a range from 1.5 to 1.8, which indicates a practically tolerable result with respect to image density.

C: Dv was smaller than 1.5, which indicates a practically intolerable result with respect to image density.

TABLE 3

| Ink | Content ratio of carbon black (*1) | Total amount of pigments (*2) | Total amount of coated pigments (*3) | Water-insoluble resin (*4) | Water-insoluble resin/total amount of coated pigments | Remarks |
| --- | --- | --- | --- | --- | --- | --- |
| A | 1.5% | 2.7% | 3.9% | 7.0% | 1.78 | Invention |
| B | 1.2% | 2.2% | 3.2% | 8.0% | 2.52 | Invention |
| C | 1.0% | 1.8% | 2.6% | 8.0% | 3.11 | Invention |
| D | 2.0% | 3.2% | 4.7% | 5.0% | 1.06 | Invention |
| E | 2.0% | 2.9% | 4.3% | 6.0% | 1.40 | Invention |
| F | 1.5% | 2.3% | 3.4% | 8.0% | 2.35 | Invention |
| G | 1.5% | 2.2% | 3.3% | 8.0% | 2.45 | Invention |
| H | 1.2% | 2.7% | 3.9% | 8.0% | 2.08 | Invention |
| I | 1.0% | 1.8% | 2.6% | 8.0% | 3.11 | Invention |
| J | 1.3% | 2.7% | 3.9% | 8.0% | 2.05 | Invention |
| K | 2.0% | 3.2% | 4.7% | 8.0% | 1.70 | Invention |
| L | 2.0% | 2.0% | 3.1% | 8.0% | 2.58 | Comparative |
| M | 0.8% | 1.7% | 2.5% | 8.5% | 3.47 | Comparative |
| N | 2.3% | 3.6% | 5.3% | 8.0% | 1.51 | Comparative |
| O | 0.8% | 1.9% | 2.7% | 8.0% | 2.94 | Comparative |
| P | 2.5% | 3.0% | 4.5% | 8.0% | 1.79 | Comparative |
| Q | 1.0% | 1.6% | 2.4% | 8.0% | 3.36 | Comparative |
| R | 2.0% | 3.6% | 5.3% | 8.0% | 1.52 | Comparative |
| S | 1.5% | 2.7% | 1.6% | 8.0% | 5.01 | Comparative |
| T | 1.5% | 2.7% | — | 8.0% | — | Comparative |
| U | 1.5% | 2.7% | 3.9% | — | — | Comparative |
| V | 1.5% | 2.7% | 3.9% | — | — | Comparative |

(*1): Content ratio of carbon black (excluding coating resin) relative to the total amount of ink [mass %]

(*2): Ratio of pigments (excluding coating resins) relative to the total amount of ink [mass %]

(*3): Ratio of coated pigments (including coating resins) relative to the total amount of ink [mass %]

(*4): Ratio of water-insoluble resin (excluding coating resins) relative to the total amount of ink [mass %]

TABLE 4

| Ink | Maintenance durability | Ejection property Before maintenance | After maintenance | Streak-shaped unevenness | Color deviation | Image density | Remarks |
|---|---|---|---|---|---|---|---|
| A | A | A | A | A | A | A | Invention |
| B | A | A | A | A | A | A | Invention |
| C | A | A | A | A | A | B | Invention |
| D | A | A | A | A | A | A | Invention |
| E | A | A | B | A | B | A | Invention |
| F | A | A | A | A | B | A | Invention |
| G | A | A | A | A | B | A | Invention |
| H | A | A | A | A | B | A | Invention |
| I | A | A | A | A | B | B | Invention |
| J | A | A | A | A | A | A | Invention |
| K | A | A | B | A | A | A | Invention |
| L | C | A | C | B | D | A | Comparative |
| M | A | A | A | A | C | C | Comparative |
| N | C | A | C | C | C | A | Comparative |
| O | A | A | A | A | D | C | Comparative |
| P | C | A | C | C | D | A | Comparative |
| Q | A | A | A | B | C | C | Comparative |
| R | B | A | B | B | B | A | Comparative |
| S | B | A | B | C | B | A | Comparative |
| T | C | A | C | C | B | A | Comparative |
| U | C | B | D | D | B | A | Comparative |
| V | C | C | D | D | B | A | Comparative |

As shown in Table 4, according to the invention, gray images with suppressed little yellow tinge were obtained, the generation of streak-shaped unevenness in the formed images was suppressed, and excellent image quality was achieved. Furthermore, the generation of scratches which otherwise tends to be generated on a head surface during a wiping operation for maintenance was prevented.

In contrast, in Comparative Examples, the gray images had yellow tinge, and streak-shaped unevenness was generated in images, which indicate that the image quality was significantly inferior as compared to the Examples according to the invention. Furthermore, scratches were observed on a head surface after maintenance, which indicates low durability when the black ink is used.

What is claimed is:

1. A black ink composition, comprising:
   carbon black and a first water-insoluble resin that covers at least a part of a surface of the carbon black;
   a cyan pigment and a second water-insoluble resin that covers at least a part of a surface of the cyan pigment;
   a magenta pigment and a third water-insoluble resin that covers at least a part of a surface of the magenta pigment;
   water-insoluble resin particles; and
   water,
   wherein a content ratio of the carbon black is from 1.0 to 2.0% by mass with respect to a total mass of the composition, and a total amount of pigments is from 1.8 to 3.5% by mass with respect to the total mass of the composition, and
   wherein the water-insoluble resin particles comprise a water-insoluble polymer that comprises a hydrophilic structural unit and a structural unit derived from a cyclic aliphatic group-containing monomer.

2. The black ink composition according to claim 1, wherein a content of the water-insoluble resin particles is larger than a total amount of pigments, whose surfaces are at least partially coated with water-insoluble resins, and the water-insoluble resins that at least partially coat the surfaces of the pigments.

3. The black ink composition according to claim 2, wherein a ratio of the content of the water-insoluble resin particles to the total amount of pigments, whose surfaces are at least partially coated with water-insoluble resins, and the water-insoluble resins that at least partially coat the surfaces of the pigments, is more than 1.0 but not more than 4.0.

4. The black ink composition according to claim 1, wherein the water-insoluble resin particles have a Tg of 100° C. or higher.

5. The black ink composition according to claim 1, further comprising a solid humectant.

6. The black ink composition according to claim 5, wherein the humectant is selected from urea, a urea derivative, or a mixture thereof.

7. The black ink composition according to claim 1, further comprising a yellow pigment and a fourth water-insoluble resin that covers at least a part of a surface of the yellow pigment.

8. An ink set, comprising:
   the black ink composition according to claim 1; and
   a treatment liquid comprising an aggregation component which is capable of causing formation of an aggregate when contacting the black ink composition.

9. An image forming method, comprising:
   applying the black ink composition according to claim 1 to a recording medium by an inkjet method; and
   applying a treatment liquid to the recording medium, the treatment liquid comprising an aggregation component which is capable of causing formation of an aggregate when contacting the black ink composition.

10. The image forming method according to claim 9, wherein the applying of the black ink composition comprises applying the black ink composition by a piezoelectric inkjet method.

11. The image forming method according to claim 10, further comprising heating an image formed through the applying of the black ink composition and the applying of the treatment liquid, to fix the image on the recording medium.

12. The black ink composition according to claim 1, wherein the water-insoluble polymer comprises the structural unit derived from a cyclic aliphatic group-containing monomer at a copolymerization ratio of from 15% by mass to 80% by mass relative to the entire mass of the water-insoluble polymer.

13. The black ink composition according to claim 1, wherein the water-insoluble polymer comprises a polymer having a carboxyl group and an acid value of from 30 mgKOH/g to 90 mgKOH/g.

14. The black ink composition according to claim 1, wherein the first water-insoluble resin, the second water-insoluble resin, and the third water-insoluble resin are the same polymer.

* * * * *